(12) United States Patent
Shen et al.

(10) Patent No.: US 7,107,511 B2
(45) Date of Patent: Sep. 12, 2006

(54) **LOW DENSITY PARITY CHECK (LDPC) CODE DECODER USING MIN\*, MIN\*\*, MAX\* OR MAX\*\* AND THEIR RESPECTIVE INVERSES**

(75) Inventors: Ba-Zhong Shen, Irvine, CA (US); Kelly Brian Cameron, Irvine, CA (US); Hau Thien Tran, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 203 days.

(21) Appl. No.: 10/369,168

(22) Filed: Feb. 19, 2003

(65) Prior Publication Data

US 2004/0034827 A1 Feb. 19, 2004

Related U.S. Application Data

(60) Provisional application No. 60/403,847, filed on Aug. 15, 2002, provisional application No. 60/408,978, filed on Sep. 6, 2002, and provisional application No. 60/427,979, filed on Nov. 20, 2002.

(51) Int. Cl.
*H03M 13/00* (2006.01)

(52) U.S. Cl. ...................................... 714/794
(58) Field of Classification Search ................. 714/794, 714/795, 796, 791; 375/262, 265, 341
See application file for complete search history.

(56) References Cited

U.S. PATENT DOCUMENTS

| | | | |
|---|---|---|---|
| 3,542,756 A | 11/1970 | Gallager | |
| 3,665,396 A | 5/1972 | Forney, Jr. | |
| 4,295,218 A | 10/1981 | Tanner | |
| 6,430,233 B1 | 8/2002 | Dillon et al. | |
| 6,473,010 B1 | 10/2002 | Vityaev et al. | |
| 6,567,465 B1 | 5/2003 | Goldstein et al. | |
| 6,633,856 B1 | 10/2003 | Richardson et al. | |
| 6,725,409 B1 * | 4/2004 | Wolf | 714/755 |
| 2003/0002603 A1 * | 1/2003 | Worm et al. | 375/341 |
| 2003/0104788 A1 | 6/2003 | Kim | |
| 2004/0005019 A1 * | 1/2004 | Smith et al. | 375/341 |

OTHER PUBLICATIONS

Gallager, R.G., Low density parity check codes, 1962, IRE Trans. on Info. Theory, p. 21–28.*

Hagenauer et al., Iterative decoding of binary block and convolutional codes, Mar. 1996, IEEE Trans. on Info. Theory, vol. 42, No. 2, p. 426445.*

Mittelholzer et al., reduced complexity decoding of low density parity check codes for generalized parital response channels, Mar. 2001, IEEE Trans on Magnetics, vol. 37, No. 2, p. 721–778.*

(Continued)

*Primary Examiner*—Shelly A Chase
(74) *Attorney, Agent, or Firm*—Garlick Harrison & Markison LLP; Shayne X. Short

(57) ABSTRACT

Low Density Parity Check (LDPC) code decoder using min\*, min\*\*, max\* or max\*\* and their respective inverses. For the first time, min\* processing is demonstrated for use in decoding LDPC-coded signals. In addition, max\*, min\*\*, or max\*\* (and their respective inverses) may also be employed when performing calculations that are required to perform decoding of signals coded using LDPC code. These new parameters may be employed to provide for much improved decoding processing for LDPC codes when that decoding involves the determination of a minimal and/or maximal value, or a minimal and/or maximal log corrected value, from among a number of possible values. The total number of processing steps employed within the decoding of an LDPC-coded signal is significantly reduced be employing the min\*, max\*, min\*\*, or max\*\* (and their respective inverses) decoding processing described herein.

138 Claims, 29 Drawing Sheets min* (min*+ and min*-) or max* (max*+ and max*-) check node processing functionality

OTHER PUBLICATIONS

Robertson et al., a comparison of optiam and suboptimal MAP decoding algorithms operating in the Log Domain, 1995, IEEE, p. 1009–1013.*

Andrew J. Viterbi, an intutive justification and a simplified implementation of the MAP decoder for convolutional codes, Feb. 1998, IEEE Journal on selected areas in Comm., vol. 16, No. 2, p. 260–264.*

Xiao et al., efficient implementations of the sum–product algorithm for decoding LDPC, 2001, IEEE, p. 1036–1036E.*

Seog et al., State–parallel MAP module design for Turbo decoding of 3GPP, Apr. 2002–Journal of the Korean Physical Society, vol. 40, No. 4, p. 677–685.*

* cited by examiner

High Definition Television (HDTV) communication system 200 cellular communication system 300 cellular communication system 400 microwave communication system 500 point-to-point radio communication system 600 uni-directional communication system 700 one to many communication system 900 fiber-optic communication system

Low Density Parity Check (LDPC) code bipartite graph

Low Density Parity Check (LDPC) code Log-Likelihood Ratio (LLR) decoding functionality straightforward check node processing functionality Low Density Parity Check (LDPC) code forward/backward decoding functionality Low Density Parity Check (LDPC) code Log-Likelihood Ratio (LLR) decoding method Fig. 19 min* (min*+ and min*-) or max* (max*+ and max*-) check node processing method Low Density Parity Check (LDPC) code forward/backward decoding method straightforward min functional block intermediate result sharing min functional block min functional block employing min- and min+ processing min functional block employing min- and min+ processing (7 input embodiment)

intermediate result sharing min processing method min- and min**+ processing method

LOW DENSITY PARITY CHECK (LDPC) CODE DECODER USING MIN*, MIN**, MAX* OR MAX** AND THEIR RESPECTIVE INVERSES

CROSS REFERENCE TO RELATED PATENTS/PATENT APPLICATIONS

The present U.S. Utility patent application claims priority pursuant to 35 U.S.C. § 119(e) to the following U.S. Provisional Patent Applications which are hereby incorporated herein by reference in their entirety and made part of the present U.S. Utility patent application for all purposes:

1. U.S. Provisional Application Ser. No. 60/403,847, entitled "Inverse of function of min*: min*- (inverse function of max*: max*-)," filed Aug. 15, 2002, pending.

2. U.S. Provisional Application Ser. No. 60/408,978, entitled "Low Density Parity Check (LDPC) Code Decoder using min*, min*-, min, and/or min-," filed Sep. 6, 2002, pending.

3. U.S. Provisional Application Ser. No. 60/427,979, "Single stage implementation of min*, max*, min and/or max to perform state metric calculation in SISO decoder," filed Nov. 20, 2002, pending.

The present U.S. Utility patent application also claims priority pursuant to 35 U.S.C. § 120 to the following U.S. Utility patent application which is hereby incorporated herein by reference in its entirety and made part of the present U.S. Utility patent application for all purposes:

1. U.S. Utility patent application Ser. No. 10/335,702, entitled "Single stage implementation of min*, max*, min and/or max to perform state metric calculation in SISO decoder," filed Jan. 2, 2003, pending.

2. U.S. Utility patent application Ser. No. 10/347,732, entitled "Inverse function of min*: min*- (inverse function of max*: max*-)," filed Jan. 21, 2003, pending.

The following U.S. Utility patent applications are hereby incorporated herein by reference in their entirety and made part of the present U.S. Utility patent application for all purposes:

1. U.S. Utility patent application Ser. No. 09/952,309, entitled "METHOD AND APPARATUS FOR PERFORMING CALCULATIONS FOR FORWARD (ALPHA) AND REVERSE (BETA) METRICS IN A MAP DECODER," filed Sep. 12, 2001, pending.

2. U.S. Utility patent application Ser. No. 09/952,210, entitled "METHOD AND APPARATUS FOR MIN* CALCULATION IN A MAP DECODER," filed Sep. 12, 2001, pending.

BACKGROUND OF THE INVENTION

1. Technical Field of the Invention

The invention relates generally to communication systems; and, more particularly, it relates to decoders within communication systems that are employed to decode signals that have been coded using Low Density Parity Check (LDPC) code.

2. Description of Related Art

Data communication systems have been under continual development for many years. One such type of communication system that has been of significant interest lately is a communication system that employs turbo codes. Another type of communication system that has also received interest is a communication system that employs Low Density Parity Check (LDPC) code. LDPC codes are oftentimes referred to in a variety of ways. For example, iterative soft decoding of LDPC codes may be implemented in a number of ways including based on the Belief Propagation (BP) algorithm, the Sum-Product (SP) algorithm, and/or the Message-Passing (MP) algorithm; the MP algorithm is sometimes referred to as a Sum Product/Belief Propagation combined algorithm. While there has been a significant amount of interest and effort directed towards these types of LDPC codes, regardless of which particular manner of iterative decoding algorithm is being employed in the specific case (3 of which are enumerated above: BP, SP, and MP), there still is ample room for improvement in the implementation and processing to be performed within a device to complete such decoding. For example, there are a variety of relatively complex and numerically burdensome calculations, data management and processing that must be performed to effectuate the accurate decoding of an LDPC coded signal.

A primary directive in these areas of development has been to try continually to lower the error floor within a communication system. The ideal goal has been to try to reach Shannon's limit in a communication channel. Shannon's limit may be viewed as being the data rate that is used in a communication channel, having a particular signal to noise ratio (SNR), that will achieve error free transmission through the channel. In other words, the Shannon limit is the theoretical bound for channel capacity for a given modulation and code rate.

LDPC code has been shown to provide for excellent decoding performance that can approach the Shannon limit in some cases. For example, some LDPC decoders have been shown to come within 0.3 dB from the theoretical Shannon limit. While this example was achieved using an irregular LDPC code of a length of one million, it nevertheless demonstrates the very promising application of LDPC codes within communication systems.

In performing calculations when decoding a received signal, it is common for decoders to operate in the natural log (ln) domain; LDPC decoders also fall in to this category. By operating within the natural log domain, this converts all multiplications to additions, divisions to subtractions, and eliminates exponentials entirely, without affecting BER performance.

One somewhat difficult calculation is the natural log (ln) domain includes calculating the sum of exponentials as shown below:

$$\ln(e^a+e^b+e^c+\ldots)$$

This calculation can be significantly reduced in complexity using the Jacobian formula shown below:

$$\max^*(a,b)=\ln(e^a+e^b)=\max(a,b)+\ln(1+e^{-|a-b|})$$

This calculation is oftentimes referred to as being a max* calculation or max* operation. It is noted that the Jacobian formula simplification of the equation shown above presents the max* operation of only two variables, a and b. This calculation may be repeated over and over when trying to calculate a longer sum of exponentials. For example, to calculate $\ln(e^a+e^b+e^c)$, the following two max* operations may be performed:

$$\max^*(a,b)=\ln(e^a+e^b)=\max(a,b)+\ln(1+e^{-|a-b|})=x$$

$$\max^*(a,b,c)=\max^*(x,c)=\ln(e^x+e^c)=\max(x,c)+\ln(1+e^{-|x-c|})$$

While there has a been a great deal of development within the context of LDPC code, the extensive processing and computations required to perform decoding therein can be extremely burdensome—this one example above of the calculating the sum of exponentials illustrates the potentially complex and burdensome calculations needed when performing decoding. Sometimes the processing requirements are so burdensome that they simply prohibit their implementation within systems having very tight design budgets.

There have been some non-optimal approaches to deal with the burdensome calculations required to do such burdensome calculations. For example, in performing this basic max* operation, some decoders simply exclude the logarithmic correction factor of $\ln(1+e^{-|a-b|})$ altogether and use only the max(a,b) result which may be implemented within a single instruction within a digital signal processor (DSP). However, this will inherently introduce some degradation in decoder performance. Most of the common approaches that seek to provide some computational improvements either cut corners in terms of computational accuracy, or they do not provide a sufficient reduction in computational complexity to justify their integration. One of the prohibiting factors concerning the implementation of many LDPC codes is oftentimes the inherent computational complexity coupled with the significant amount of memory required therein.

There still exists a need in the art to provide for more efficient solutions when making calculations, such as max*, within decoders that operate within the logarithmic domain.

BRIEF SUMMARY OF THE INVENTION

Various aspects of the invention can be found in a decoder that may be implemented within a communication receiver. In one embodiment, the decoder includes a Low Density Parity Check (LDPC) code Log-Likelihood Ratio (LLR) decoder that is operable to decode a bit within a signal. The decoder is operable to perform iterative decoding processing. The decoder has a number of functional blocks including an initialization functional block, a check node processing functional block, a variable node processing functional block, and a variable bit estimation functional block.

The initialization functional block computes a Log-Likelihood Ratio (LLR) of a channel metric and assigns the LLR of the channel metric to an initial variable node extrinsic information value. The check node processing functional block computes a check node extrinsic information value using the initial variable node extrinsic information value by employing min* processing, min** processing, max* processing, or max** processing (including their respective inverses). The variable node processing functional block computes a variable node extrinsic information value using the LLR of the channel metric and the check node extrinsic information value. Ultimately, the variable bit estimation functional block estimates a value of the bit within the signal using the variable node extrinsic information value.

By employing min* processing, min** processing, max* processing, or max** processing to perform the check node processing (including their respective inverses), a decoder implemented according to the invention may decode an LDPC coded signal using a significantly fewer number of computational operations. For example, more than an order of magnitude reduction of computational operations may be achieved in certain embodiments when decoding an LDPC coded signal.

In some embodiments, the check node processing functional block identifies a number of check node edges before computing the check node extrinsic information value. In addition, the variable node processing functional block may identify a number of variable node edges before computing the variable node extrinsic information value.

Within embodiments employing min* processing, the min* processing employed by the check node processing functional block may be further broken down to perform min*+ processing using variable node extrinsic information values thereby generating an intermediate variable A. The check node processing functional block may be implemented to perform the min*+ processing in either one of a parallel min*+ implementation or a single stage min*+ implementation.

Moreover, the min* processing employed by the check node processing functional block may also be broken down to include min*− processing using the intermediate variable A and a variable node extrinsic information value of the variable node extrinsic information values. However, the min*− processing is performed at any time using only 2 inputs, so a single stage implementation would not be effectual. However, if desired, a design may be implemented that includes a number of min*− processing functional blocks so that all of the possible min*− check values may be calculated simultaneously (as in a parallel architecture); alternatively, a single min*− processing functional block may calculate all of these possible min*− check values sequentially (as in a serial architecture).

In alternative embodiments employing min processing, the min processing employed by the check node processing functional block may be broken down and performed by min+ processing using variable node extrinsic information values thereby generating an intermediate variable A. The check node processing functional block may perform the min+ processing in either a parallel min+ implementation or a single stage min+ implementation. The min processing employed by the check node processing functional block may also be broken down and performed with min− processing using the intermediate variable A and a variable node extrinsic information value of the variable node extrinsic information values. Similar to the min*− processing described above, the min− processing is performed at any time using only 2 inputs, so a single stage implementation would not be effectual. However, if desired, a design may be implemented that includes a number of min− processing functional blocks so that all of the possible min**− check values may be calculated simultaneously (as in a parallel architecture); alternatively, a single min*− processing functional block may calculate all of these possible min**− check values sequentially (as in a serial architecture).

Similarly, these various aspects may be achieved in a design that employs max* processing (including max*+ processing and max*− processing) or max processing (including max+ processing and max**− processing) without departing from the scope and spirit of the invention. These embodiments may analogously be implemented using the parallel or single stage implementations for max*+ processing and max**+ processing, while implementing the parallel or serial architecture for max*− processing and max**− processing.

The decoder may be implemented within any number of devices including a satellite receiver, a High Definition Television (HDTV) set top box receiver, a base station receiver, a mobile receiver, a receiver, a mobile unit, a transceiver, an advanced modulation satellite receiver, and/or a Dense Wavelength Division Multiplexing (DWDM) line card. Moreover, when the decoder is implemented within a communication receiver, the communication receiver may be included within a wide number of communication systems including a satellite communication system, a High Definition Television (HDTV) communication system, a cellular communication system, a microwave communication system, a point-to-point communication system, a uni-directional communication system, a bi-directional communication system, a one to many communication system, and/or a fiber-optic communication system.

Other aspects of the invention may be found in a forward/backward Low Density Parity Check (LDPC) code decoder that is operable to decode a bit within a signal. This decoder includes a number of functional blocks including an initialization functional block, a forward and backward check node processing functional block, an extrinsic information value calculation functional block, and a variable bit estimation functional block. The initialization functional block computes a logarithmic metric value of the signal. The forward and backward check node processing functional block employs min* processing or max* processing to calculate forward metric values (alphas) and backward metric values (betas) using an initial number of variable node extrinsic information values. The extrinsic information value calculation functional block employs min* processing or max* processing to calculate check node extrinsic values using the forward metric values (alphas) and the backward metric values (betas). In addition, the extrinsic information value calculation functional block also employs min* processing or max* processing to calculate variable node extrinsic values using the logarithmic metric value of the signal and the check node extrinsic values. The extrinsic information value calculation functional block also sums a variable node extrinsic value and a check node extrinsic value. This sum, that is generated by the by the extrinsic information value calculation functional block, may be fed back to the forward and backward check node processing functional block when performing iterative decoding. The variable bit estimation functional block estimates a value of the bit within the signal using the sum generated by the extrinsic information value calculation functional block.

Similar to the embodiment of the LDPC code LLR decoder described above, the BP LDPC code decoder capitalizes on the efficiency provided by the min* processing or max* processing to perform decoding processing. A decoder implemented according to the invention may decode a received signal using a significantly fewer number of computational operations when compare to prior art approaches.

In addition, various aspects of the invention can be found in a decoder that may be implemented within a communication receiver to perform any one of the min*, max*, min, or max processing described herein. For example, two embodiments of the invention include decoders that min processing or max processing. An example of the min processing type decoding is briefly described here and in more detail below while it is also understood that analogous functionality may be extended to perform max processing as well.

In one embodiment, a decoder is operable to perform min processing by employing min− and min+ processing. The decoder includes a min+ functional block that performs min+ processing on min inputs thereby generating an intermediate variable. The decoder also includes a min− functional block that performs min− processing on each of the min inputs and the intermediate variable thereby generating min outputs.

In certain embodiments, the min+ processing and the min− processing is performed on two elements at a time.

These two elements may be two of the min inputs. Alternatively, these two elements may include one of the min inputs and the intermediate variable itself. The min+ functional block is operable to perform all of its processing using a number of processes that is less than the total number of min inputs. In addition, the min− functional block is operable to perform all of its processing using a number of processes that is equal to the total number of min inputs. The min+ process and the min− process are inverse functions of one another. The decoder may also be arranged such that it is operable to perform straightforward min processing and/or intermediate result sharing min processing on the min inputs. In this way, the decoder may be operable to perform other decoding processing that is less optimal than the min processing that employs both min− and min+ processing.

It is also noted that the various aspects of the invention may be implemented in method operation as well without departing from the scope and spirit of the invention.

DETAILED DESCRIPTION OF THE INVENTION

The decoding process of the invention may properly be described as being performed within a variety of communication systems that employ Low Density Parity Check (LDPC) coding. Decoding an LDPC-coded signal involves calculations that are used to identify a minimum (or maximum) value or a minimum (or maximum) log corrected value from among a number of possible values during decoding. The invention involves decoding by performing calculations including min*, max*, min, or max (and the respective inverse) to identify an appropriate selection of a value from among a number of possible values.

FIGS. 1–11 illustrate a number of communication system context embodiments where the decoding processing of the invention may be implemented.

Figure 1:
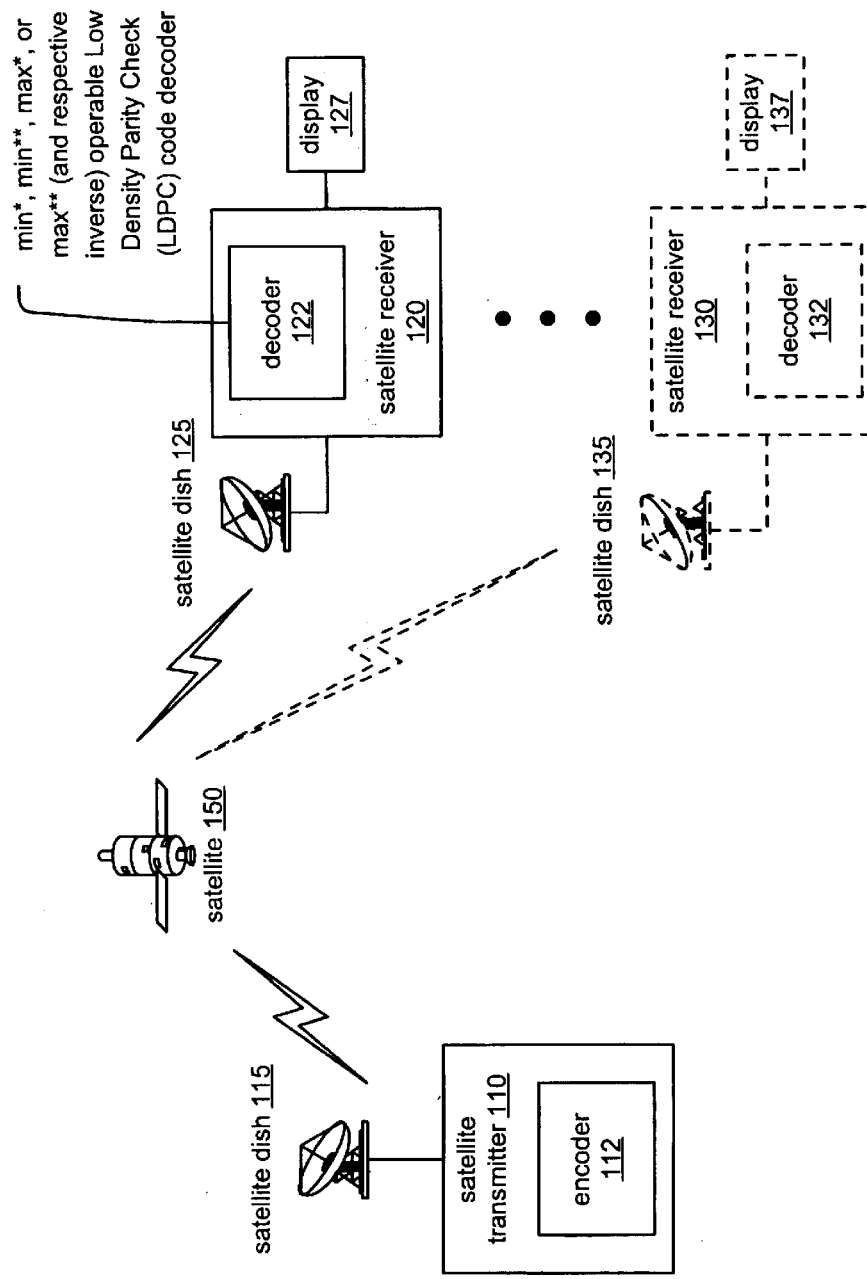
FIG. 1 is a system diagram illustrating an embodiment of a satellite communication system that is built according to the invention.

FIG. 1 is a system diagram illustrating an embodiment of a satellite communication system 100 that is built according to the invention. A satellite transmitter 110 includes an encoder 112. The encoder 112 is one of several possible embodiments that employ an LDPC code whose decoding involves calculating a minimal or maximal value parameter to decode a received signal. The encoder 112 is operable to encode data, using the LDPC code, that is to be transmitted by the satellite transmitter 110. The satellite transmitter 110 is communicatively coupled to a satellite dish 115 that is operable to communicate with a satellite 150. The satellite transmitter 110 may also be communicatively coupled to a wired network. This wired network may include any number of networks including the Internet, proprietary networks, and other wired networks. The satellite transmitter 110 employs the satellite dish 115 to communicate to the satellite 150 via a wireless communication channel. The satellite 150 is able to communicate with one or more satellite receivers, shown as a satellite receiver 120 (having a satellite dish 125), . . . , and a satellite receiver 130 (having a satellite dish 135). Each of the satellite receiver 120 and the satellite receiver 130 includes a decoder; specifically, the satellite receiver 120 includes a decoder 122, and the satellite receiver 130 includes a decoder 132. Each of the satellite receiver 120 and the satellite receiver 130 may also be communicatively coupled to a display. Again, specifically, the satellite receiver 120 may be communicatively coupled to a display 127, and the satellite receiver 130 may be communicatively coupled to a display 137. Various and further details will be provided below regarding the various embodiments in which the decoders 122 and 132 may be implemented to perform the decoding processing of the invention.

Here, the communication to and from the satellite 150 may cooperatively be viewed as being a wireless communication channel, or each of the communication to and from the satellite 150 may be viewed as being two distinct wireless communication channels.

For example, the wireless communication "channel" may be viewed as not including multiple wireless hops in one embodiment. In other embodiments, the satellite 150 receives a signal received from the satellite transmitter 110 (via its satellite dish 115), amplifies it, and relays it to satellite receiver 120 (via its satellite dish 125); the satellite receiver 120 may also be implemented using terrestrial receivers such as satellite receivers, satellite based telephones, and satellite based Internet receivers, among other receiver types. In the case where the satellite 150 receives a signal received from the satellite transmitter 110 (via its satellite dish 115), amplifies it, and relays it, the satellite 150 may be viewed as being a "transponder." In addition, other satellites may exist that perform both receiver and transmitter operations in cooperation with the satellite 150. In this case, each leg of an up-down transmission via the wireless communication channel would be considered separately.

In whichever embodiment, the satellite 150 communicates with the satellite receiver 120. The satellite receiver 120 may be viewed as being a mobile unit in certain embodiments (employing a local antenna); alternatively, the satellite receiver 120 may be viewed as being a satellite earth station that may be communicatively coupled to a wired network in a similar manner in which the satellite transmitter 110 may also be communicatively coupled to a wired network. In both situations, the satellite receiver 120 and the satellite receiver 130 are each operable to support the decoder 122 and the decoder 132 contained therein, respectively.

The FIG. 1 shows one of the many embodiments where coding (encoding and decoding) may be performed according to any one or more of the various embodiments of the invention. The decoding of either of the decoders 122 and 132 is operable to support any one of min*, max*, min, or max (and the respective inverse) when performing LDPC decoding processing according to the invention.

Figure 2:
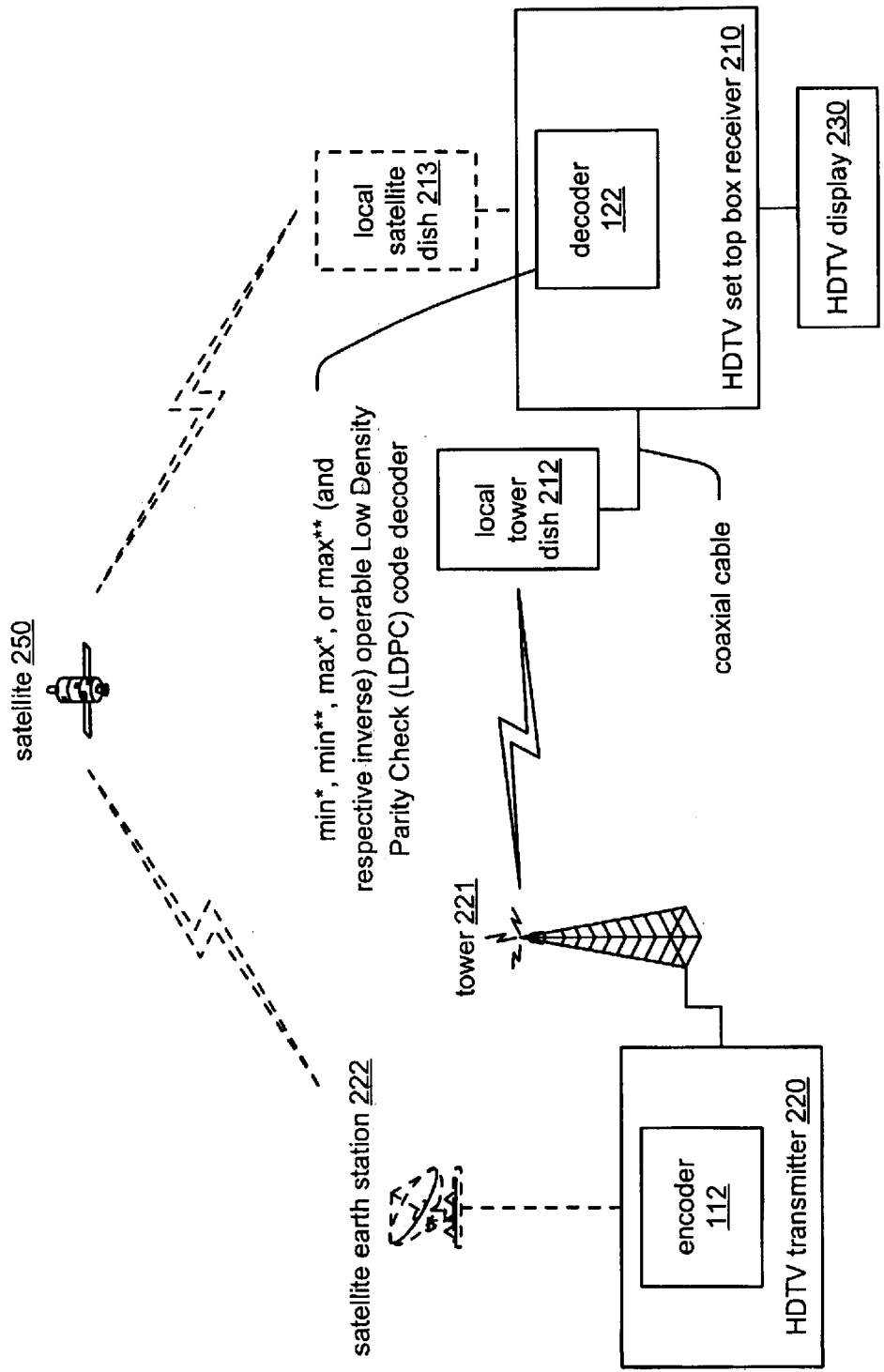
FIG. 2 is a system diagram illustrating an embodiment of a High Definition Television (HDTV) communication system that is built according to the invention.

FIG. 2 is a system diagram illustrating an embodiment of a High Definition Television HDTV communication system 200 that is built according to the invention. An HDTV transmitter 220 is communicatively coupled to a tower 221. The HDTV transmitter 220, using its tower 221, transmits a signal to a local tower dish 212 via a wireless communication channel. The local tower dish 212 communicatively couples to an HDTV set top box receiver 210 via a coaxial cable. The HDTV set top box receiver 210 includes the functionality to receive the wireless transmitted signal that has been received by the local tower dish 212; this may include any transformation and/or down-converting as well to accommodate any up-converting that may have been performed before and during transmission of the signal from the HDTV transmitter 220 and its tower 221.

The HDTV set top box receiver 210 is also communicatively coupled to an HDTV display 230 that is able to display the demodulated and decoded wireless transmitted signals received by the HDTV set top box receiver 210 and its local tower dish 212. The HDTV transmitter 220 (via its tower 221) transmits a signal directly to the local tower dish 412 via the wireless communication channel in this embodiment. In alternative embodiments, the HDTV transmitter 220 may first receive a signal from a satellite 250, using a satellite earth station 222 that is communicatively coupled to the HDTV transmitter 220, and then transmit this received signal to the to the local tower dish 212 via the wireless communication channel. In this situation, the HDTV transmitter 220 operates as a relaying element to transfer a signal originally provided by the satellite 250 that is destined for the HDTV set top box receiver 210. For example, another satellite earth station may first transmit a signal to the satellite 250 from another location, and the satellite 250 may relay this signal to the satellite earth station 222 that is communicatively coupled to the HDTV transmitter 220. The HDTV transmitter 220 performs receiver functionality and then transmits its received signal to the local tower dish 212.

In even other embodiments, the HDTV transmitter 220 employs the satellite earth station 222 to communicate to the satellite 250 via a wireless communication channel. The satellite 250 is able to communicate with a local satellite dish 213; the local satellite dish 213 communicatively couples to the HDTV set top box receiver 210 via a coaxial cable. This path of transmission shows yet another communication path where the HDTV set top box receiver 210 may communicate with the HDTV transmitter 220.

In whichever embodiment and whichever signal path the HDTV transmitter 220 employs to communicate with the HDTV set top box receiver 210, the HDTV set top box receiver 210 is operable to receive communication transmissions from the HDTV transmitter 220.

The HDTV transmitter 220 includes an embodiment of the encoder 112 described above. Similarly, the HDTV set top box receiver 210 includes an embodiment of the decoder 122 described above. Cooperatively, the encoder 112 and the decoder 122 form a codec according to the invention.

The FIG. 2 shows yet another of the many embodiments where LDPC coding (including LDPC encoding and LDPC decoding) that may be performed according to any one or more of the various embodiments of the invention. The decoding of the decoder 122 is operable to support any one of min*, max*, min, or max (and the respective inverse) when performing LDPC decoding processing according to the invention.

Figure 3:
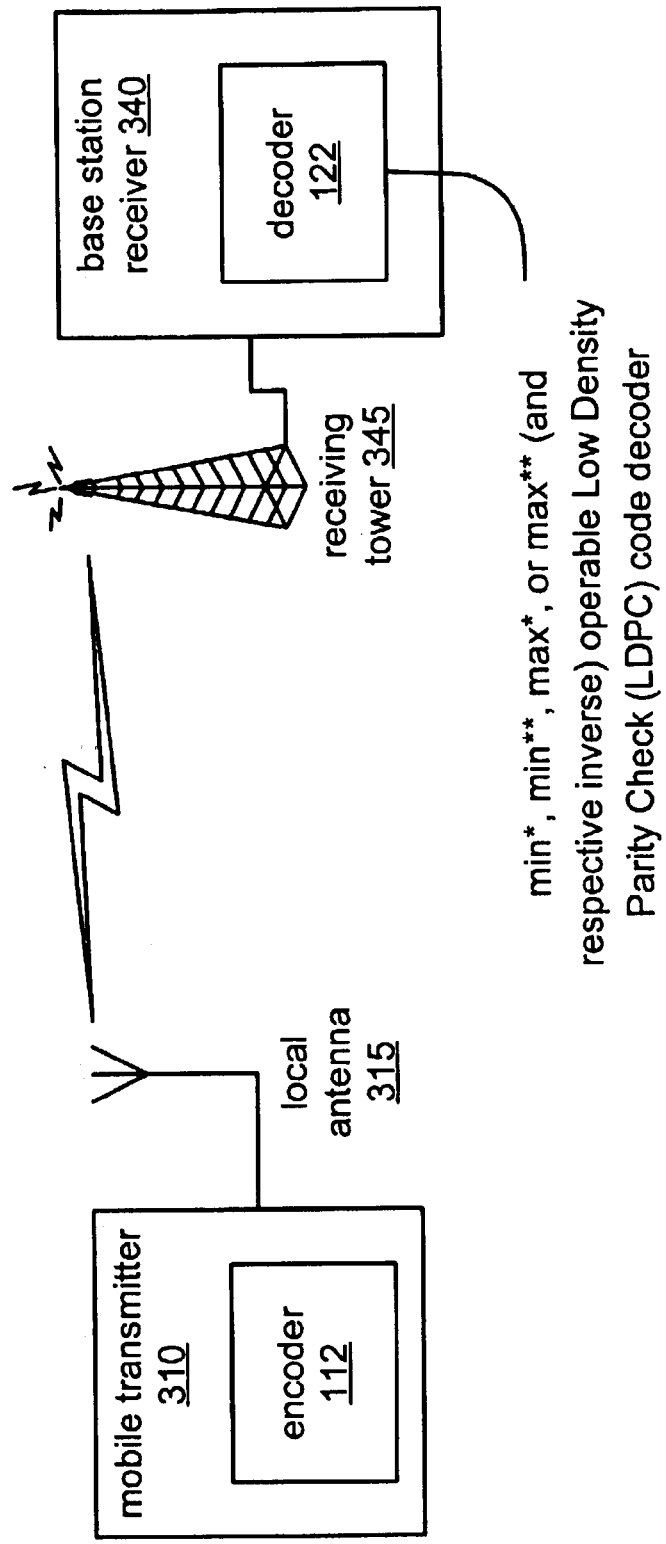
FIG. 3 is a system diagram illustrating an embodiment of a cellular communication system that is built according to the invention.

FIG. 3 is a system diagram illustrating an embodiment of a cellular communication system 300 that is built according to the invention. A mobile transmitter 310 includes a local antenna 315 communicatively coupled thereto. The mobile transmitter 310 may be any number of types of transmitters including a cellular telephone, a wireless pager unit, a mobile computer having transmit functionality, or any other type of mobile transmitter. The mobile transmitter 310 transmits a signal, using its local antenna 315, to a receiving tower 345 via a wireless communication channel. The receiving tower 345 is communicatively coupled to a base station receiver 340; the receiving tower 345 is operable to receive data transmission from the local antenna 315 of the mobile transmitter 310 that have been communicated via the wireless communication channel. The receiving tower 345 communicatively couples the received signal to the base station receiver 340.

The mobile transmitter 310 includes an embodiment of the encoder 112 described above. Similarly, the base station receiver 340 includes an embodiment of the decoder 122 described above. Cooperatively, the encoder 112 and the decoder 122 form a codec according to the invention.

The FIG. 3 shows yet another of the many embodiments where LDPC coding (including LDPC encoding and LDPC decoding) may be performed according to any one or more of the various embodiments of the invention. The decoding of the decoder 122 is operable to support any one of min*, max*, min, or max (and the respective inverse) when performing LDPC decoding processing according to the invention.

Figure 4:
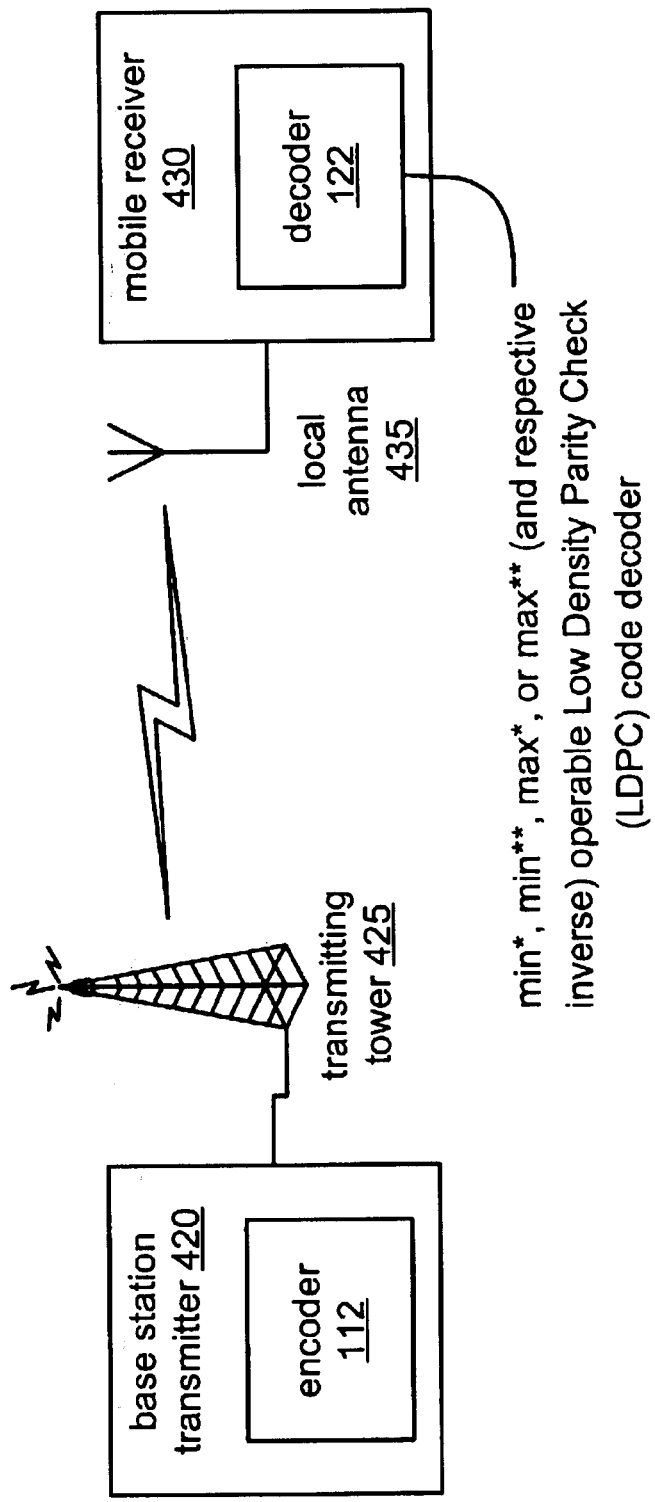
FIG. 4 is a system diagram illustrating another embodiment of a cellular communication system that is built according to the invention.

FIG. 4 is a system diagram illustrating another embodiment of a cellular communication system 400 that is built according to the invention. From certain perspectives, the cellular communication system 400 of the FIG. 4 may be viewed as being the reverse transmission operation of the cellular communication system 300 of the FIG. 3. A base station transmitter 420 is communicatively coupled to a transmitting tower 425. The base station transmitter 420, using its transmitting tower 425, transmits a signal to a local antenna 435 via a wireless communication channel. A mobile receiver 430 includes the local antenna 435 communicatively coupled thereto. The local antenna 435 is communicatively coupled to a mobile receiver 430 so that the mobile receiver 430 may receive transmission from the transmitting tower 435 of the base station transmitter 420 that have been communicated via the wireless communication channel. The local antenna 435 communicatively couples the received signal to the mobile receiver 430. It is noted that the mobile receiver 430 may be any number of types of receivers including a cellular telephone, a wireless pager unit, a mobile computer having receive functionality, or any other type of mobile receiver.

The base station transmitter 420 includes an embodiment of the encoder 112 described above. Similarly, the mobile receiver 430 includes an embodiment of the decoder 122 described above. Cooperatively, the encoder 112 and the decoder 122 form a codec according to the invention.

The FIG. 4 shows yet another of the many embodiments where LDPC coding (including LDPC encoding and LDPC decoding) may be performed according to any one or more of the various embodiments of the invention. The decoding of the decoder 122 is operable to support any one of min*, max*, min, or max (and the respective inverse) when performing LDPC decoding processing according to the invention.

Figure 5:
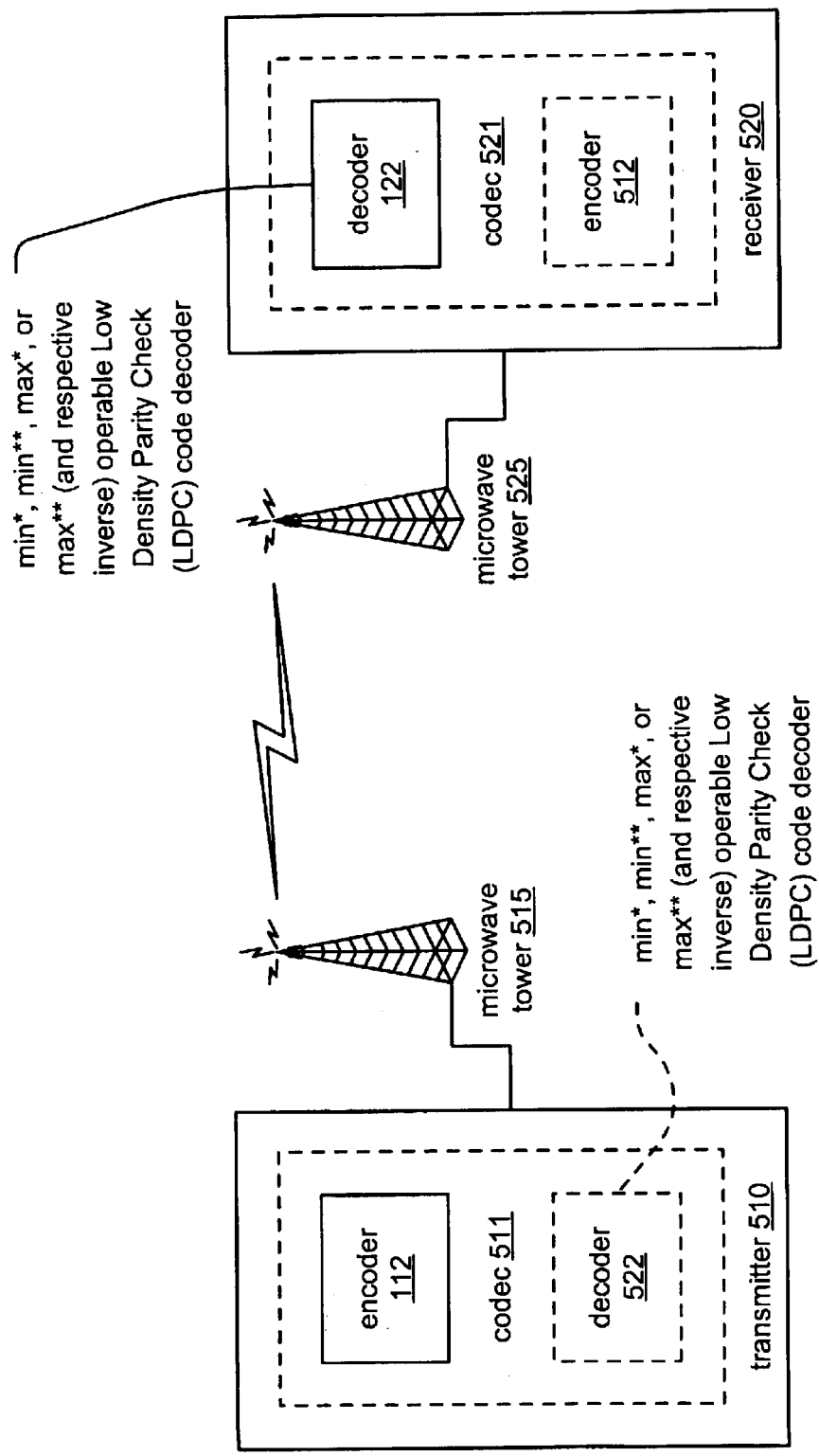
FIG. 5 is a system diagram illustrating an embodiment of a microwave communication system that is built according to the invention.

FIG. 5 is a system diagram illustrating an embodiment of a microwave communication system 500 that is built according to the invention. A transmitter 510 is communicatively coupled to a microwave tower 515. The transmitter 510, using its microwave tower 515, transmits a signal to a microwave tower 525 via a wireless communication channel. A receiver 520 is communicatively coupled to the microwave tower 525. The microwave tower 525 is able to receive transmissions from the microwave tower 515 that have been communicated via the wireless communication channel.

The transmitter 510 includes an embodiment of the encoder 112 described above. Similarly, the receiver 520 includes an embodiment of the decoder 122 described above. Cooperatively, the encoder 112 and the decoder 122 form a codec according to a uni-directional communication implementation of the invention.

However, in a bi-directional communication implementation of the invention, the transmitter 510 also includes an embodiment of a decoder 522; the embodiment of the decoder 522 may be viewed as being duplicative of the decoder 122 within the receiver 520. The encoder 112 and the decoder 522 together form a codec 511 within the transmitter 510. The receiver 520 also includes an embodiment of an encoder 512; the embodiment of the encoder 512 may be viewed as being duplicative of the encoder 112 within the transmitter 510. The decoder 122 and the encoder 512 together form a codec 521 within the receiver 520.

The embodiment of the invention described within the FIG. 5 shows an embodiment where a codec, built according to the invention, may be viewed as within a single device (such as the codec 511 within the transmitter 510 or the codec 521 within the receiver 520) or as being distributed across two separate devices, namely, the transmitter 510 and the receiver 520.

The FIG. 5 shows yet another of the many embodiments where LDPC coding (including LDPC encoding and LDPC decoding) may be performed according to any one or more of the various embodiments of the invention. Again, the decoding of the decoders 122 and 522 is operable to support any one of min*, max*, min, or max (and the respective inverse) when performing LDPC decoding processing according to the invention.

Figure 6:
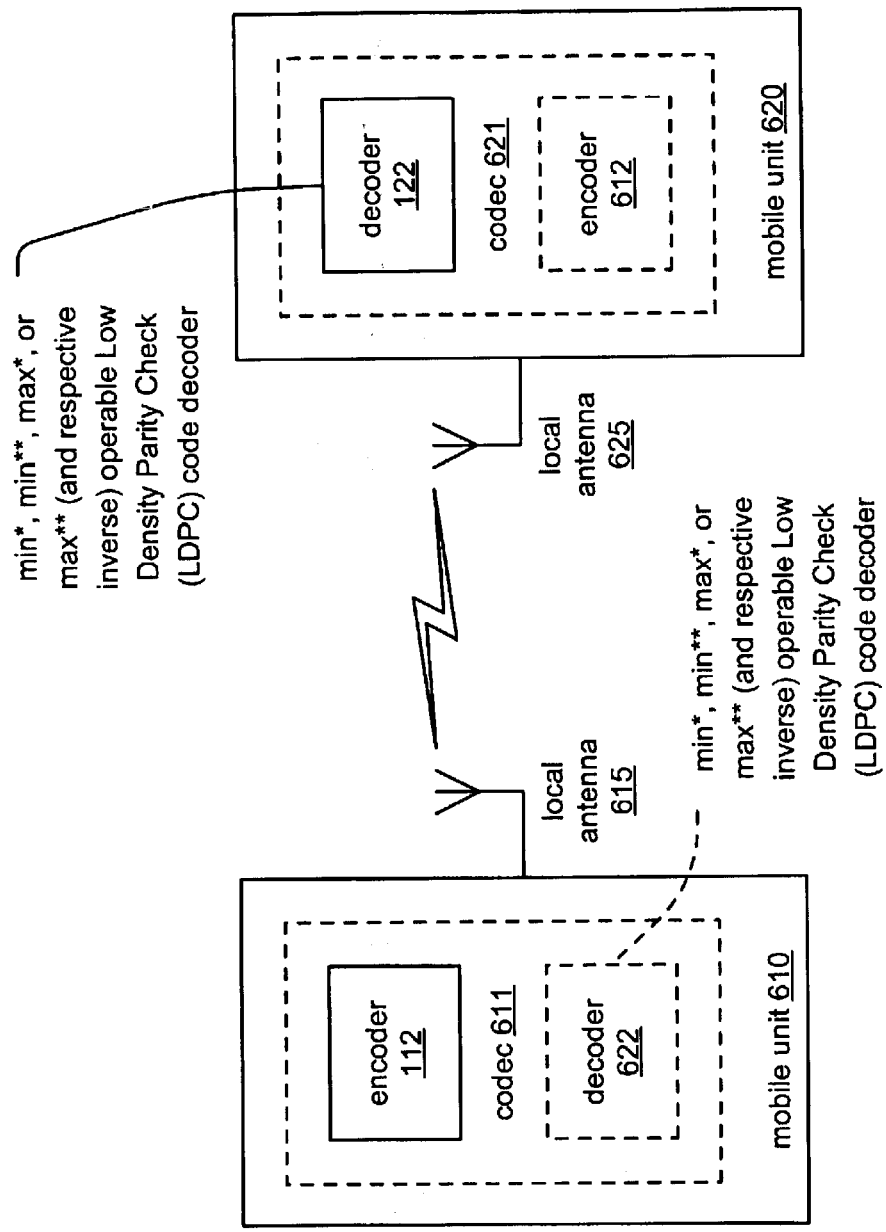
FIG. 6 is a system diagram illustrating an embodiment of a point-to-point radio communication system that is built according to the invention.

FIG. 6 is a system diagram illustrating an embodiment of a point-to-point radio communication system 600 that is built according to the invention. A mobile unit 610 includes a local antenna 615 communicatively coupled thereto. The mobile unit 610, using its local antenna 615, transmits a signal to a local antenna 625 via a wireless communication channel. A mobile unit 620 includes the local antenna 625 communicatively coupled thereto. The mobile unit 620 may receive transmissions from the mobile unit 610 that have been communicated via the wireless communication channel.

The mobile unit 610 includes an embodiment of the encoder 112 described above. Similarly, the mobile unit 620 includes an embodiment of the decoder 122 described above. Cooperatively, the encoder 112 and the decoder 122 form a codec according to a uni-directional communication implementation of the invention.

However, in a bi-directional communication implementation of the invention, the mobile unit 610 also includes an embodiment of a decoder 622; the embodiment of the decoder 622 may be viewed as being duplicative of the decoder 122 within the mobile unit 620. The encoder 112 and the decoder 622 together form a codec 611 within the mobile unit 610. The mobile unit 620 also includes an embodiment of an encoder 612; the embodiment of the encoder 612 may be viewed as being duplicative of the encoder 112 within the mobile unit 610. The decoder 122 and the encoder 612 together form a codec 621 within the mobile unit 620.

The embodiment of the invention described within the FIG. 6 shows an embodiment where a codec, built according to the invention, may be viewed as within a single device (such as the codec 611 within the mobile unit 610 or the codec 621 within the mobile unit 610) or as being distributed across two separate devices, namely, the mobile unit 610 and the mobile unit 620.

The FIG. 6 shows yet another of the many embodiments where LDPC coding (including LDPC encoding and LDPC decoding) may be performed according to any one or more of the various embodiments of the invention. Again, the decoding of the decoders 122 and 622 is operable to support any one of min*, max*, min, or max (and the respective inverse) when performing LDPC decoding processing according to the invention.

Figure 7:
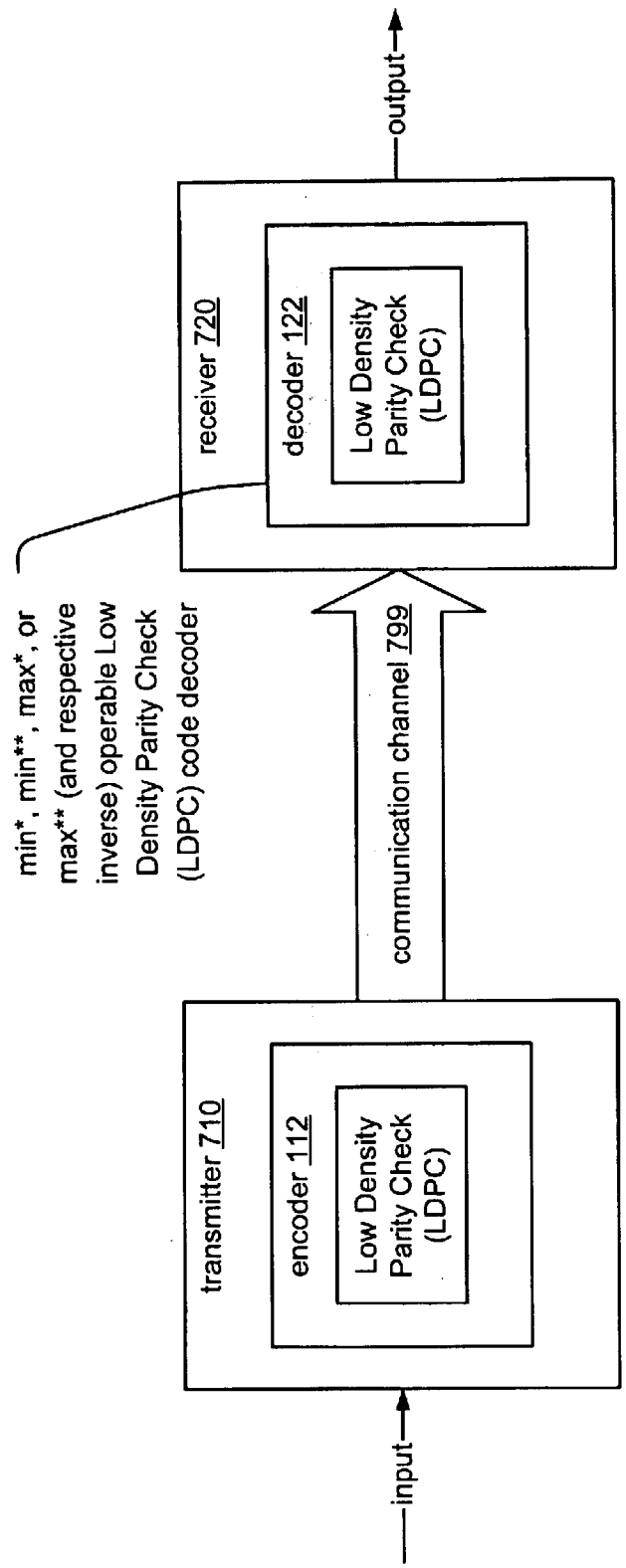
FIG. 7 is a system diagram illustrating an embodiment of a uni-directional communication system that is built according to the invention.

FIG. 7 is a system diagram illustrating an embodiment of a uni-directional communication system 700 that is built according to the invention. A transmitter 710 communicates with a receiver 720 via a uni-directional communication channel 799. The uni-directional communication channel 799 may be a wireline (or wired) communication channel or a wireless communication channel without departing from the scope and spirit of the invention. The wired media by which the uni-directional communication channel 799 may be implemented are varied, including coaxial cable, fiber-optic cabling, and copper cabling, among other types of "wiring." Similarly, the wireless manners in which the uni-directional communication channel 799 may be implemented are varied, including satellite communication, cellular communication, microwave communication, and radio communication, among other types of wireless communication.

The transmitter 710 includes an embodiment of the encoder 112. The encoder 112 is operable to support Low Density Parity Check (LDPC) code whose decoding involves calculating a minimal or maximal value. Cooperatively, the encoder 112 and the decoder 122 form a codec according to the invention.

The FIG. 7 shows yet another of the many embodiments where LDPC coding (including LDPC encoding and LDPC decoding) may be performed according to any one or more of the various embodiments of the invention. Again, the decoding of the decoder 122 is operable to support any one of min*, max*, min, or max (and the respective inverse) when performing LDPC decoding processing according to the invention.

Figure 8:
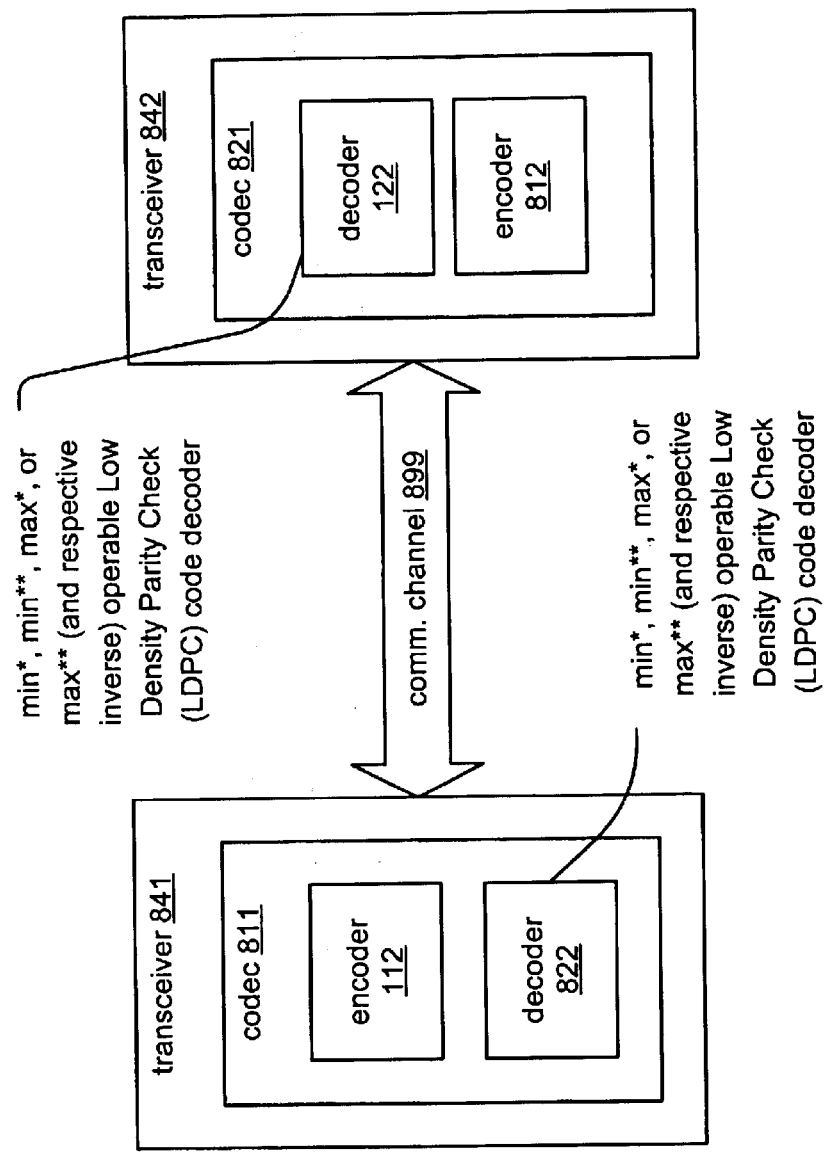
FIG. 8 is a system diagram illustrating an embodiment of a bi-directional communication system that is built according to the invention.

FIG. 8 is a system diagram illustrating an embodiment of a bi-directional communication system 800 that is built according to the invention. A transceiver 841 and a transceiver 842 are able to communicate with one another via a bi-directional communication channel 899. The bi-directional communication channel 899 may be a wireline (or wired) communication channel or a wireless communication channel without departing from the scope and spirit of the invention. The wired media by which the bi-directional communication channel 899 may be implemented are varied, including coaxial cable, fiber-optic cabling, and copper cabling, among other types of "wiring." Similarly, the wireless manners in which the bi-directional communication channel 899 may be implemented are varied, including satellite communication, cellular communication, microwave communication, and radio communication, among other types of wireless communication.

The transceiver 841 includes a codec 811 that includes a encoder 112 and a decoder 822. Similarly, transceiver 842 includes a codec 821 that includes a decoder 122 and a encoder 812. The codec 811 and the codec 821 may be viewed as being duplicative of one another within the transceivers 841 and 842.

The FIG. 8 shows yet another of the many embodiments where LDPC coding (including LDPC encoding and LDPC decoding) may be performed according to any one or more of the various embodiments of the invention. Again, the decoding of the decoders 122 and 822 is operable to support any one of min*, max*, min, or max (and the respective inverse) when performing LDPC decoding processing according to the invention.

Figure 9:
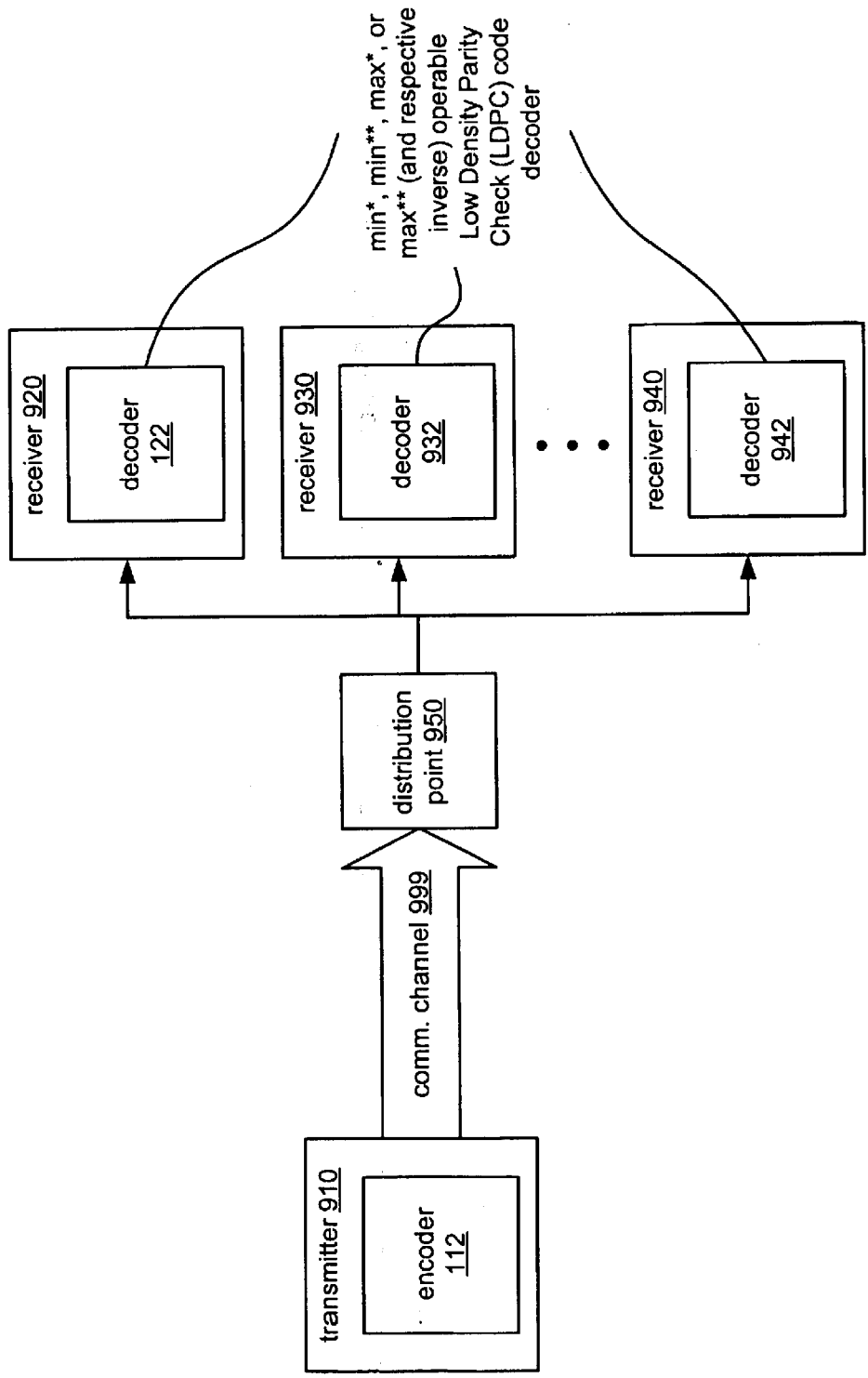
FIG. 9 is a system diagram illustrating an embodiment of a one to many communication system that is built according to the invention.

FIG. 9 is a system diagram illustrating an embodiment of a one to many communication system 900 that is built according to the invention. A transmitter 910 is able to communicate, via broadcast in certain embodiments, with a number of receivers, shown as receivers 910, 920, . . . , and 940 via a uni-directional communication channel 999. The uni-directional communication channel 999 may be a wireline (or wired) communication channel or a wireless communication channel without departing from the scope and spirit of the invention. The wired media by which the bi-directional communication channel 999 may be implemented are varied, including coaxial cable, fiber-optic cabling, and copper cabling, among other types of "wiring." Similarly, the wireless manners in which the bi-directional communication channel 999 may be implemented are varied, including satellite communication, cellular communication, microwave communication, and radio communication, among other types of wireless communication.

A distribution point 950 is employed within the one to many communication system 900 to provide the appropriate communication to the receivers 910, 920, . . . , and 940. In certain embodiments, the receivers 910, 920, . . . , and 940 each receive the same communication and individually discern which portion of the total communication is intended for themselves.

The transmitter 910 includes an embodiment of the encoder 112. Similarly, each of the receivers 910, 920, . . . , and 940 includes an embodiment of the decoder; specifically, the receiver 920 includes an embodiment of the decoder 122;the receiver 930 includes an embodiment of the decoder 932; and the receiver 940 includes an embodiment of the decoder 942. Cooperatively, the encoder 112 and each of the decoders 122, 932, . . . , and 942 form codecs according to the invention. Each of the decoders 122, 932, . . . , and 942 is operable to support any one of min*, max*, min, or max (and the respective inverse) when performing LDPC decoding processing according to the invention.

The FIG. 9 shows yet another of the many embodiments where LDPC coding (including LDPC encoding and LDPC decoding) may be performed according to any one or more of the various embodiments of the invention. Again, the decoding of the decoders 122, 932, . . . , and 942 is operable to support any one of min*, max*, min, or max (and the respective inverse) when performing LDPC decoding processing according to the invention.

Figure 10:
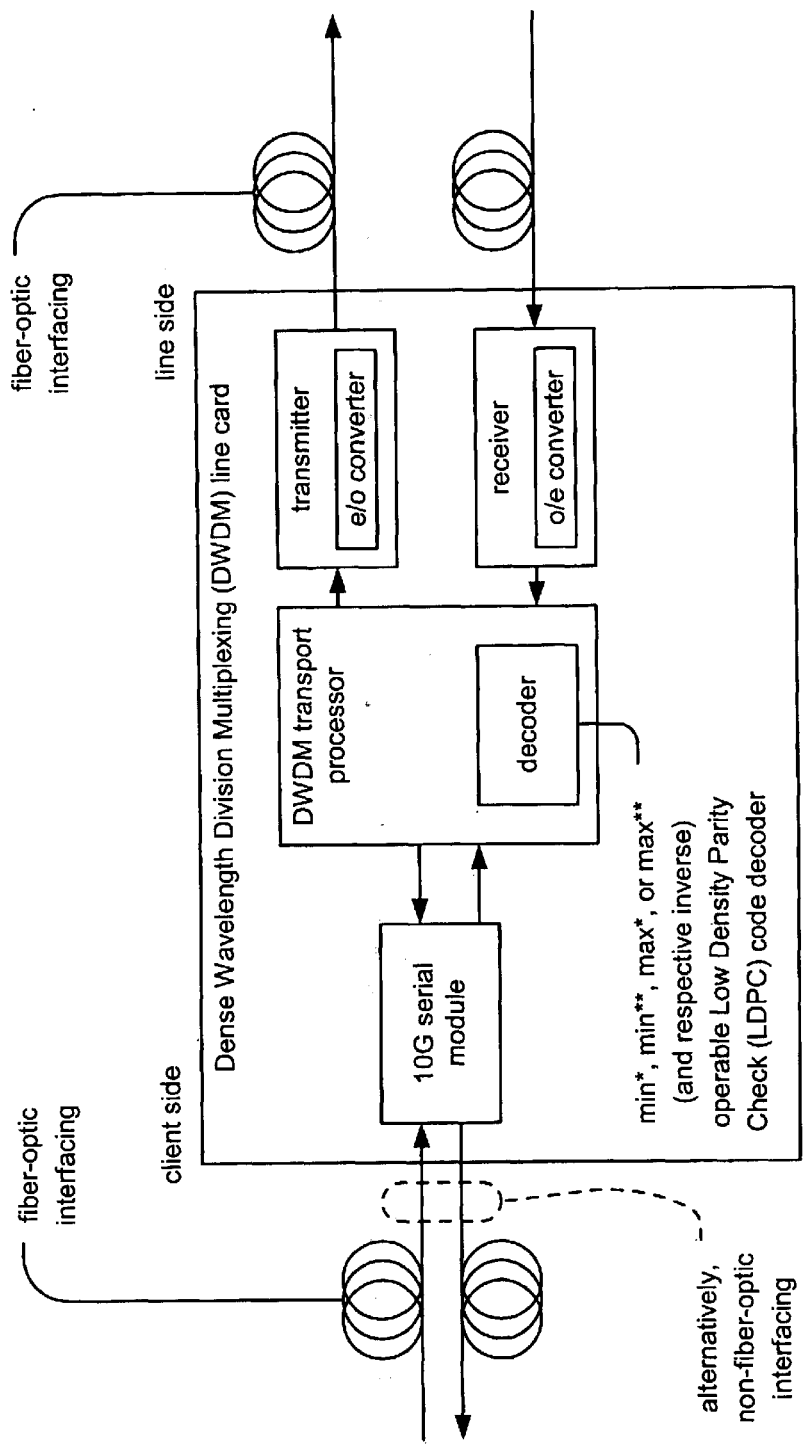
FIG. 10 is a system diagram illustrating an embodiment of a fiber-optic communication system that is built according to the invention.

FIG. 10 is a system diagram illustrating an embodiment of a fiber-optic communication system that is built according to the invention. The fiber-optic communication system is operable to support is operable to support any one of min*, max*, min, or max (and the respective inverse) decoding processing, for LDPC-coded codes, according to the invention. The fiber-optic communication system includes a Dense Wavelength Division Multiplexing (DWDM) line card that is interposed between a line side and a client side.

DWDM is a technology that has gained increasing interest recently. From both technical and economic perspectives, the ability to provide potentially unlimited transmission capacity is the most obvious advantage of DWDM technology. The current investment already made within fiber-optic infrastructure can not only be preserved when using DWDM, but it may even be optimized by a factor of at least 32. As demands change, more capacity can be added, either by simple equipment upgrades or by increasing the number of wavelengths (lambdas) on the fiber-optic cabling itself, without expensive upgrades. Capacity can be obtained for the cost of the equipment, and existing fiber plant investment is retained. From the bandwidth perspective, some of the most compelling technical advantage of DWDM can be summarized as follows:

The transparency of DWDM: Because DWDM is a physical layer architecture (PHY), it can transparently support both time division multiplexing (TDM) and data formats such as asynchronous transfer mode (ATM), Gigabit Ethernet, ESCON, and Fibre Channel with open interfaces over a common physical layer.

The scalability of DWDM: DWDM can leverage the abundance of dark fiber in many metropolitan area and enterprise networks to quickly meet demand for capacity on point-to-point links and on spans of existing SONET/SDH rings.

The dynamic provisioning capabilities of DWDM: the fast, simple, and dynamic provisioning of network connections give providers the ability to provide high-bandwidth services in days rather than months.

Fiber-optic interfacing is employed at each of the client and line sides of the DWDM line card. The DWDM line card includes a transport processor that includes functionality to support DWDM long haul transport, DWDM metro transport, nextgeneration SONET/SDH multiplexers, digital cross-connects, and fiber-optic terminators and test equipment. On the line side, the DWDM line card includes a transmitter, that is operable to perform electrical to optical conversion for interfacing to an optical medium, and a receiver, that is operable to perform optical to electrical conversion for interfacing from the optical medium. On the client side, the DWDM line card includes a 10 G serial module. That is operable to communicate with any other devices on the client side of the fiber-optic communication system using a fiber-optic interface. Alternatively, the interface may be implemented using non-fiber-optic media, including copper cabling and/or some other type of interface medium.

The DWDM transport processor of the DWDM line card includes a decoder that is used to decode received signals from either one or both of the line and client sides and an encoder that is used to encode signals to be transmitted to either one or both of the line and client sides. The decoder is operable to support any one of min*, max*, min, or max (and the respective inverse) when performing LDPC decoding processing according to the invention. The FIG. 10 shows yet another of the many embodiments where a device may employ is operable to support any one of min*, max*, min, or max (and the respective inverse) decoding processing, for LDPC-coded signals, according to any one or more of the various embodiments of the invention.

Figure 11:
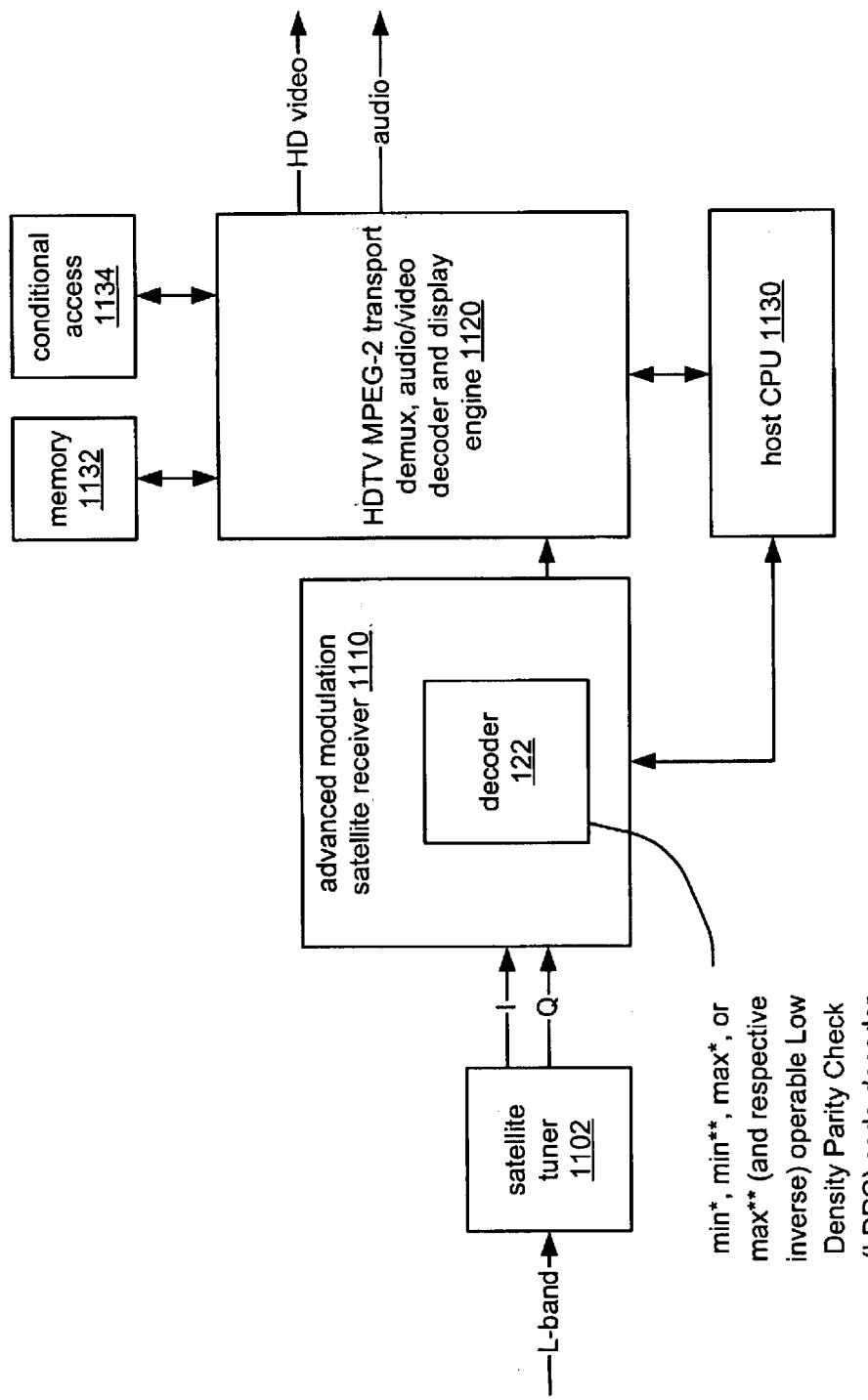
FIG. 11 is a system diagram illustrating an embodiment of a satellite receiver set-top box system that is built according to the invention.

FIG. 11 is a system diagram illustrating an embodiment of a satellite receiver set-top box system 1100 that is built according to the invention. The satellite receiver set-top box system 1100 includes an advanced modulation satellite receiver 1110 that is implemented in an all digital architecture. The satellite receiver set-top box system 1100 includes a satellite tuner 1102 that receives a signal via the L-band. The satellite tuner 1102 extracts I,Q (in-phase and quadrature) components from a signal received from the L-band and provides them to the advanced modulation satellite receiver 1110. The advanced modulation satellite receiver 1110 includes an embodiment of the decoder 112. The decoder 112 is operable to support any one of min*, max*, min, or max (and the respective inverse) when performing LDPC decoding processing according to the invention.

The advanced modulation satellite receiver 1110 communicatively couples to an HDTV MPEG-2 (Motion Picture Expert Group) transport de-mux, audio/video decoder and display engine 1120. Both the advanced modulation satellite receiver 1110 and the HDTV MPEG-2 transport de-mux, audio/video decoder and display engine 1020 communicatively couple to a host central processing unit (CPU) 1130. The HDTV MPEG-2 transport de-mux, audio/video decoder and display engine 1120 also communicatively couples to a memory module 1132 and a conditional access functional block 1134. The HDTV MPEG-2 transport de-mux, audio/video decoder and display engine 1120 provides HD video and audio output that may be provided to an HDTV display.

The advanced modulation satellite receiver 1110 is a single-chip digital satellite receiver supporting the decoder 122 that is operable to support any one of min*, max*, min, or max (and the respective inverse) when performing LDPC decoding processing according to the invention. The advanced modulation satellite receiver 1110 is operable to receive communication provided to it from a transmitter device that includes an encoder according to the invention.

Several of the following Figures describe particular embodiments that may be used to perform the is operable to support any one of min*, max*, min, or max (and the respective inverse) decoding processing that may be employed within decoding processing according to any one of the various embodiments shown above that employ LDPC codes.

Figure 12:
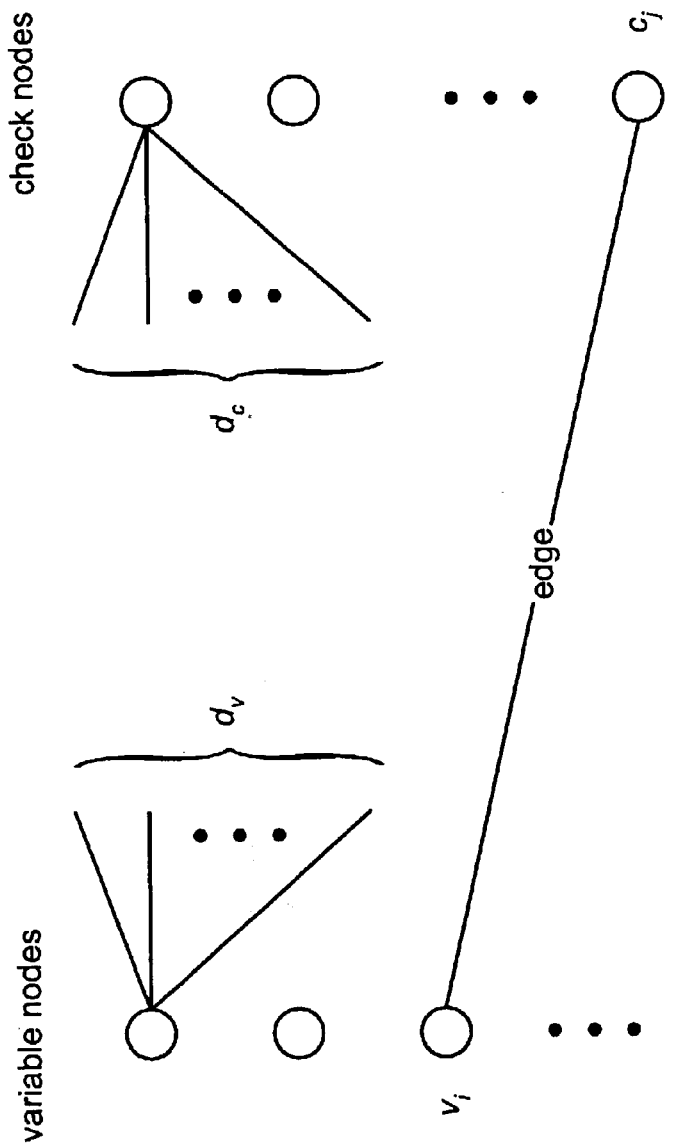
FIG. 12 is a diagram illustrating an embodiment of a Low Density Parity Check (LDPC) code bipartite graph.

FIG. 12 is a diagram illustrating an embodiment of a Low Density Parity Check (LDPC) code bipartite graph. An LDPC code may be viewed as being a code having a binary parity check matrix such that nearly all of the elements of the matrix have values of zeros. For example, $H=(h_{i,j})_{M \times N}$ may be viewed as being a parity check matrix of an LDPC code with block length N. If every column of the matrix has $d_v$ 1's and every row of the matrix has $d_c$ 1's, then this code is called a $(d_v, d_c)$ regular LDPC code. For example, a regular (4,72) LDPC code would be viewed as being a code whose binary parity check matrix would have 4 1's in every column and 72 1's in every row.

These regular LDPC codes were introduced by the authors of R. Gallager, *Low-Density Parity-Check Codes*, Cambridge, Mass.: MIT Press, 1963. A regular LDPC code can be defined as a bipartite graph by its parity check matrix with left side nodes representing variable of the code bits, and the right side nodes representing check equations. The bipartite graph of the LDPC code, shown in the FIG. 12, may be defined by H and having N variable nodes and M check nodes. Every variable node has exactly $d_v$ edges connecting this node to some of the check nodes, which is called the degree of a variable node, and every check node has exactly $d_c$ edges connecting this node to some of the variable nodes, which is called the degree of a check node.

Referring to FIG. 12, an edge between a variable node $v_i$ and check node $c_j$ may be defined by $e=(i, j)$. However, on the other hand, given an edge $e=(i, j)$, the nodes of the edge may alternatively be denoted as by $e=(v(e),c(e))$. Given a variable node $v_i$, we may define the set of edges emitting from the node $v_i$ by $E_v(i)=\{e|v(e)=i\}$. Given a check node $c_j$, we may define the set of edges emitting from the node $c_j$ by $E_c(j)=\{e|c(e)=j\}$. Continuing on, the derivative result will be $|E_v(i)|=d_v$ and $|E_c(j)|=d_c$.

In contradistinction, an irregular LDPC code may also described using a bipartite graph. However, the degree of each set of nodes within an irregular LDPC code may be chosen according to some distribution. Therefore, for two different variable nodes, $v_{i_1}$ and $v_{i_2}$ of an irregular LDPC code, $|E_v(i_1)|$ may not equal to $|E_v(i_2)|$. This relationship may also hold true for two check nodes. The concept of irregular LDPC codes were originally introduced by the authors of M. Lugy, M. Mitzenmacher, A. Shokrollahi, D. Spielman and V. Stemann, "Practical loss-resilient codes," *IEEE Trans. Inform. Theory*, Vol. 47, pp. 569–584, February 2001.

While many of the illustrative embodiments described herein utilize regular LDPC code examples, it is also noted that the invention is also operable to accommodate both regular LDPC codes and irregular LDPC codes.

The Log-Likelihood ratio (LLR) decoding of LDPC codes may be described as follows: The probability that a bit within a received vector in fact has a value of 1 when a 1 was actually transmitted is calculated. Similarly, the probability that a bit within a received vector in fact has a value of 0 when a 0 was actually transmitted is calculated. These probabilities are calculated using the LDPC code that is use to check the parity of the received vector. The LLR is the logarithm of the ratio of these two calculated probabilities. This LLR will give a measure of the degree to which the communication channel over which a signal is transmitted may undesirably affect the bits within the vector.

The Log-Likelihood ratio (LLR) decoding of LDPC codes may be described mathematically as follows:

Beginning with $C=\{v|v=(v_0, \ldots, v_{N-1}), vH^T=0\}$ being an LDPC code and viewing a received vector, $y=(y_0, \ldots, y_{N-1})$, with the sent signal having the form of $((-1)^{v_{0i}}, \ldots, (-1)^{v_{N-1}})$, then the metrics of the channel may be defined as $p(y_i|v_i=0)$, $p(y_i|v_i=1)$, $i=0, \ldots, N-1$. The LLR of a metric will then be defined as follows:

$$L_{metric}(i) = \ln \frac{p(y_i|v_i) = 0)}{p(y_i|v_i) = 1)}$$

For every variable node $v_i$, its LLR information value will then be defined as follows:

$$\ln \frac{p(v_i = 0 \mid y_i)}{p(v_i = 1 \mid y_i)} = L_{metric}(i) + \ln \frac{p(v_i = 0)}{p(v_i = 1)}$$

Since the variable node, $v_i$, is in a codeword, then the value of ln $$\frac{p(v_i = 0)}{p(v_i = 1)}$$

may be replaced by $$\ln \frac{p(v_i = 0, vH^T = 0 \mid y)}{p(v_i = 1, vH^T = 0 \mid y)} = \sum_{(i,j) \in E_v(i)} \ln \frac{p(v_i = 0, vh_j^T = 0 \mid y)}{p(v_i = 1, vh_j^T = 0 \mid y)}$$

where $E_v(i)$ is a set of edges starting with $v_i$ as defined above.

When performing the Belief Propagation (BP) decoding approach, then the value of ln $$\frac{p(v_i = 0, vh_j^T = 0 \mid y)}{p(v_i = 1, vh_j^T = 0 \mid y)}$$

may be replaced by the following relationship $$L_{check}(i, j) = \ln \frac{p\left(\sum_{e \in Ec(j) \setminus \{(i,j)\}} v_{v(e)} = 0 \mid y\right)}{p\left(\sum_{e \in Ec(j) \setminus \{(i,j)\}} v_{v(e)} = 1 \mid y\right)}$$

$L_{check}(i, j)$ is called the extrinsic (EXT) information of the check node $c_j$ with respect to the edge $(i, j)$. In addition, it is noted that $e \in E_c(j) \setminus \{(i, j)\}$ indicates all of the edges emitting from check node $c_j$ except for the edge that emits from the check node $c_j$ to the variable node $v_i$. Extrinsic information values may be viewed as those values that are calculated to assist in the generation of best estimates of actual bit values within a received vector. Also in a BP approach, then the extrinsic information of the variable node $v_i$ with respect to the edge $(i, j)$ may be defined as follows:

$$L_{var}(i, j) = L_{metric}(i) + \sum_{(i,k) \in E_v(i) \setminus \{(i,j)\}} L_{check}(i, k)$$

The functionality of a BP LLR decoder that is operable to decode an LDPC code is described below within the FIG. 13.

Figure 13:
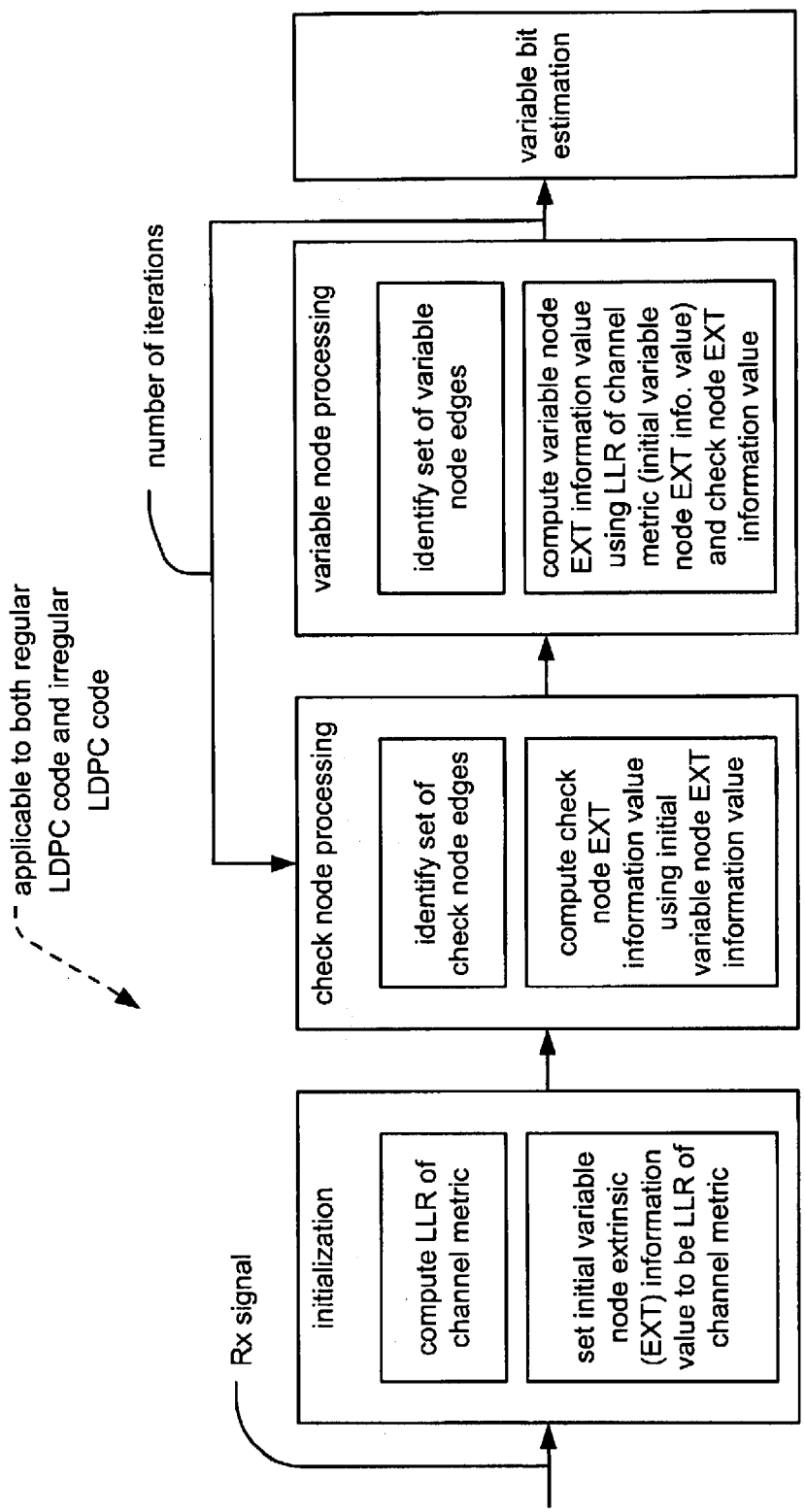
FIG. 13 is a functional block diagram illustrating an embodiment of LDPC code Log-Likelihood ratio (LLR) decoding functionality that is arranged according to the invention.

FIG. 13 is a functional block diagram illustrating an embodiment of LDPC code Log-Likelihood ratio (LLR) decoding functionality that is arranged according to the invention. The LLR decoding functionality includes a number of functional blocks that operate on a received signal (shown as Rx signal). The received signal is provided by an initialization functional block to establish the initial conditions of the decoding process, then to a check node processing functional block and on to a variable node processing functional block for determining the extrinsic information for the check and variable nodes, respectively, and finally to a variable bit estimation functional block where the actual best estimation of one or more bits within the received signal are made.

The initialization functional block computes the LLR of the channel metric over which the received signal has been transmitted. The initialization involves computing $L_{metric}(i)$ which is the LLR of the channel metric. In addition, the initialization functional block includes setting the initial variable node extrinsic value to be the LLR of the channel metric. This may be expressed mathematically as follows:

$$L_{var}^n(e) = L_{metric}(v(e)) \text{ for all the edges } e \text{ and } n=0.$$

The check node processing functional block involves identifying the set of all of the check node edges according to the bipartite graph shown within the FIG. 12. This may be shown mathematically as follows:

For every check node $c_i$, $i=0, \ldots, M-1$, we define the check node edges as $E_c(i) = \{e_0, \ldots, e_{d_c-1}\}$.

In addition, the check node processing functional block also performs computation of the check node extrinsic information value ($L_{check}^n(e_j)$) using the initial variable node extrinsic value ($L_{var}^{n-1}(e_k)$).

The variable node processing functional block involves identifying the set of all variable node edges according to the bipartite graph shown within the FIG. 12.

This may be shown mathematically as follows:

For every variable node $v_i$, $i=0, \ldots, N-1$, we define the variable node edges as $E_v(i) = \{e_0, \ldots, e_{d_v-1}\}$.

In addition, a variable node extrinsic information value is computed using an LLR of channel metric and a check node extrinsic information value. This may be shown mathematically as follows:

$$\text{Compute } L_v^n(i) = L_{metric}(i) + \sum_{k=0}^{d_{v-1}} L_{check}^n(e_k)$$

$$\text{Compute } L_{var}^n(e_j) = L_v^n - L_{check}^n(e_j), e_j \in E_v(i)$$

In accordance with the iterative decoding described herein, multiple decoding iterations may be performed by feeding back the results provided by the variable node processing functional block to the check node processing functional block.

At the last iteration, a best estimate of a variable bit contained within the received signal may be made by the variable bit estimation functional block. The best estimate is made using the variable $L_v^n(i)$. When $L_v^n(i)$ is greater than or equal to zero, then the best estimate of a variable bit is made as being a value of 0; when $L_v^n(i)$ is less than zero, then the best estimate of a variable bit is made as being a value of 1.

$$v_i = \begin{cases} 0 & L_v^n(i) \geq 0 \\ 1, & L_v^n(i) < 0 \end{cases}$$

Alternatively, a reverse analysis may be performed if desired in certain embodiments.

$$v_i = \begin{cases} 1 & L_v^n(i) \geq 0 \\ 0, & L_v^n(i) < 0 \end{cases}$$

The prior art approaches of performing LDPC decoding typically prove to be very computationally intensive. The invention provides several embodiments that may significantly reduce the total number of operations that need be performed as well as the corresponding memory required to support those operations. This can result in a great deal of processing savings as well as speeding up of the decoding process.

Figure 14:
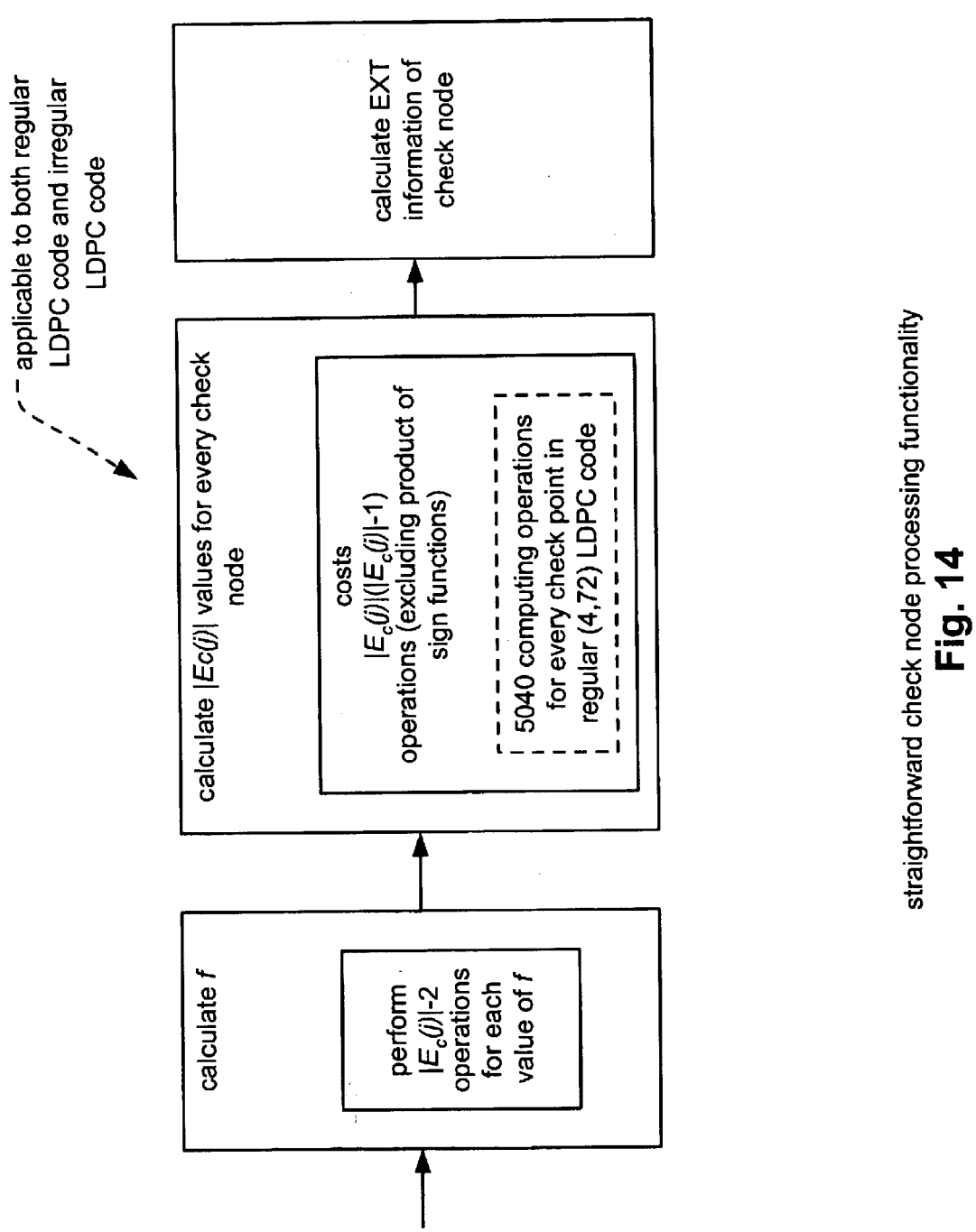
FIG. 14 is a functional block diagram illustrating an embodiment of straightforward check node processing functionality that is arranged according to the invention.
Figure 15:
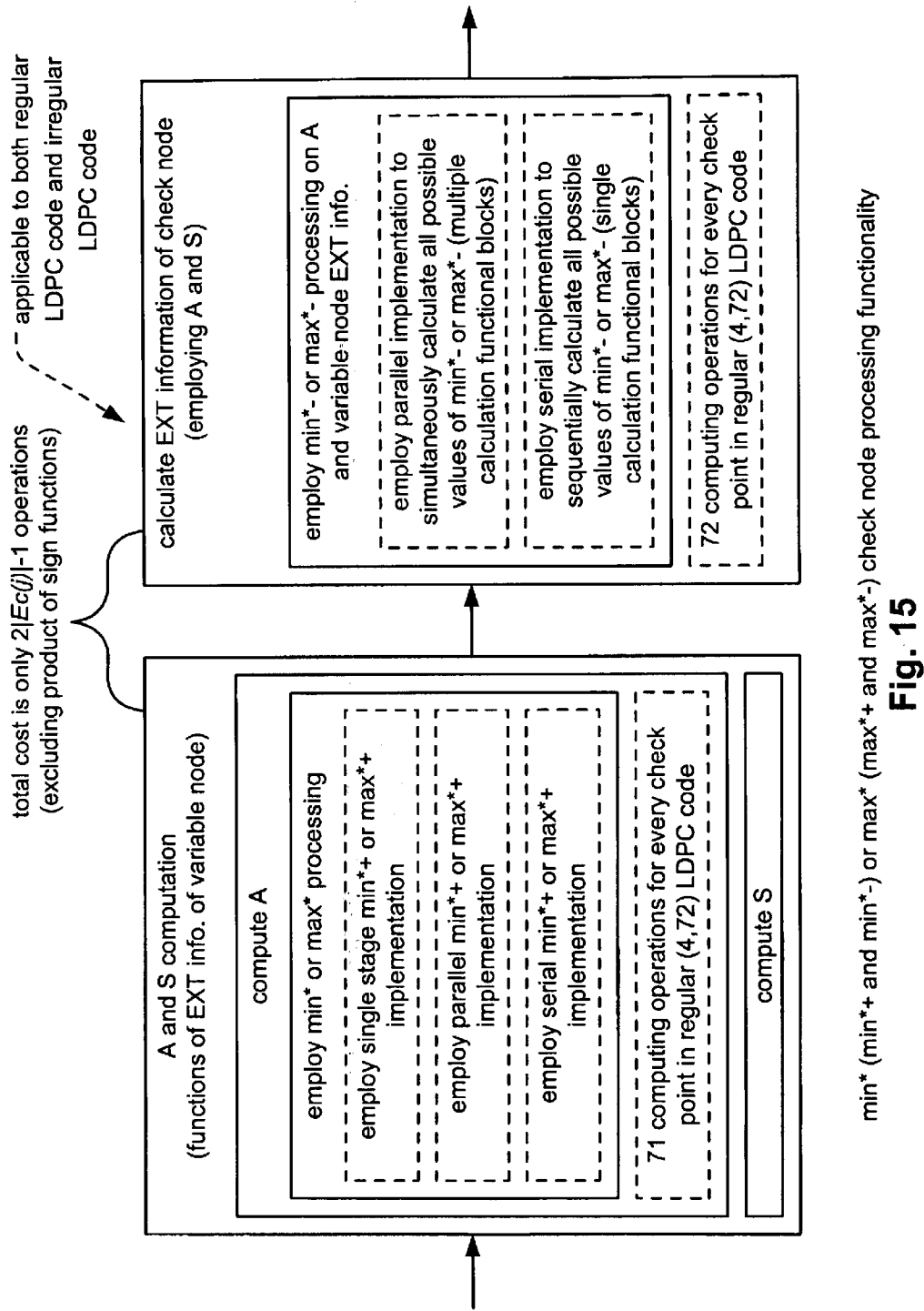
FIG. 15 is a functional block diagram illustrating an embodiment of min* (min*+ and min*−) or max* (max*+ and max*−) check node processing functionality that is arranged according to the invention.
Figure 16:
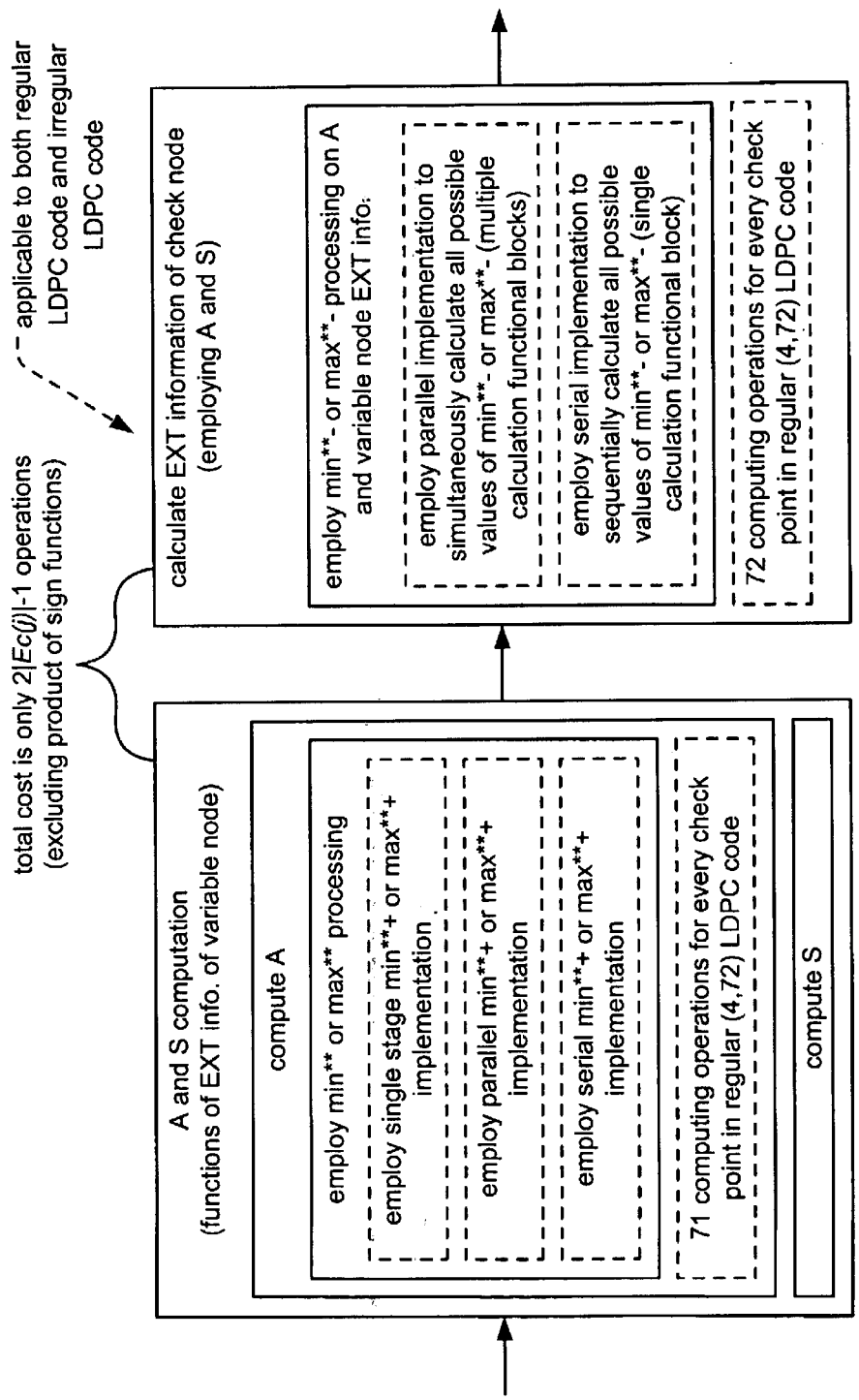
FIG. 16 is a functional block diagram illustrating an embodiment of min (min+ and min−) or max (max+ and max−) check node processing functionality that is arranged according to the invention.

The processing within the check node processing functional block shown above within the FIG. 13 may be performed using several computational optimizations provided by the invention. The FIGS. 14, 15, and 16 show some possible embodiments for performing the check node processing. In particular, FIGS. 15 and 16 show processing optimization functionality that may be provided by invention to provide for improved decoding performance.

The following description is used to show basic computations that need be performed to calculate the check node extrinsic information value that is used in decoding a variable bit within a received signal. Afterwards, the FIGS. 14, 15, and 16 will show embodiments of functionality that may be implemented to perform these calculations employed within the decoding.

The basic computation may be may be described as beginning with the random variables, $v_1, v_2, \ldots, v_k$ having values in $\{0,1\}$ (zero or one) and with the probability $p_i(0)$ and $p_i(1), i=1,2, \ldots, k$. The denotation of the logarithmic ratio of these probabilities is shown below:

$$L(v_i) = \ln[p_i(1)/p_i(0)], i=1,2,\ldots,k$$

It may also be shown, as by the authors in J. Hagenauer, E. Offer and L. Papke, "Iterative decoding of binary block and convolutional codes," *IEEE Trans. Inform. Theory*, Vol. 42, No. 2 March 1996, pp. 429–445, that the extrinsic information value for a sum of random variables may be shown as follows:

$$L(v_1 + v_2) = \ln \frac{p(v_1 + v_2 = 1)}{p(v_1 + v_2 = 0)} = \ln \frac{1 + \exp(L(v_1) + L(v_2))}{\exp(L(v_1)) + \exp(L(v_2))}$$

Using this relationship, the following relationship may be made.

$$L\left(\sum_{i=1}^{k} v_i\right) = \ln \frac{p\left(\sum_{i=1}^{k} v_i = 1\right)}{p\left(\sum_{i=1}^{k} v_i = 0\right)} = L\left(\left[\sum_{i=1}^{k-1} v_i\right] + v_k\right) \quad \text{EQ 1}$$

The computation of this function may be performed using the following function:

$$f(x, y) = \ln \frac{1 + \exp(x, y)}{\exp(x) + \exp(y)}$$

This function may be further simplified as follows:

$$f(x, y) = \text{sign}(x)\text{sign}(y) \ln \frac{1 + \exp(|x| + |y|)}{\exp(|x|) + \exp(|y|)}; \quad \text{EQ 2}$$

$$\text{where sign}(x) = \begin{cases} 1, & x \geq 0 \\ -1, & x < 0 \end{cases}.$$

Since $|x|, |y| \geq 0$, we have $\exp(|x|)(\exp(|y|)-1) \geq (\exp(|y|)-1)$, and therefore the following relationship may be made:

$$\ln \frac{1 + \exp(|x| + |y|)}{\exp(|x|) + \exp(|y|)} \geq 0 \quad \text{EQ 3}$$

By using the Equations 2 and 3 above, the following two relationships may be made.

$$\text{sign}(f(x, y)) = \text{sign}(x)\text{sign}(y)$$

$$|f(x, y)| = f(|x|, |y|)$$

Continuing on, the following relationships may be achieved:

$$f(x, y) = \text{sign}(x)\text{sign}(y) f(|x|, |y|) \quad \text{EQ 4}$$

To generalize this function to functions having more variable, the following relationship may be made:

$$f(x_1, x_2, \ldots, x_k) = f(f(x_1, \ldots, x_{k-1}), x_k) \quad \text{EQ 5}$$

In addition, the following relationships may be achieved as well:

$$f(x_1, \ldots, x_k) = \left(\prod_{i=1}^{n} \text{sign}(x_i)\right) f(|x_1|, \ldots, |x_k|) \quad \text{EQ 6}$$

The following two relationships may then be employed when performing the decoding of an LDPC code.

$$\text{sign}(f(x_1, \ldots, x_n)) = \left(\prod_{i=1}^{n} \text{sign}(x_i)\right), \text{ and}$$

$$|f((x_1, \ldots, x_k)| = f(|x_1|, \ldots, |x_k|)$$

A brief proof of the preceding relationship is shown below. In the earlier case, the value of k was 2. Continuing on, if we operate on the supposition that EQ 6 is in fact true when k=n−1. If we use Equations 4 and 5, and by also using the following relationship:

$$(f(x_1, \ldots, x_n) =$$

$$(\text{sign}(f(x_1, \ldots, x_{n-1})\text{sign}(x_n) f(|f(x_1, \ldots, x_{n-1})|, |x_n|) =$$

$$\left[\prod_{i=1}^{n} \text{sign}(x_i)\right] f(f(|x_1|, \ldots, |x_{n-1}|, |x_n|) = \left[\prod_{i=1}^{n} \text{sign}(x_i)\right] f(|x_1|, \ldots, |x_n|).$$

Now, the L function defined above within the EQ 1 may then be described by the relationship shown below.

$$L\left(\sum_{i=1}^{k} v_i\right) = \quad \text{EQ 7}$$

$$f(L(v_1), \ldots, L(v_k)) = \left[\prod_{i=1}^{k} \text{sign}(L(v_i))\right] f(|L(v_1)|, \ldots, |L(v_k)|)$$

A common calculation that is performed when decoding an LDPC signal includes the computation and approximation of the function: $f(|x|, |y|)$.

From the definition of $f(|x|,|y|)$, the following relationship may be made.

$$f(|x|, |y|) = \ln\frac{1 + \exp(-(|x| + |y|))}{\exp(-|x|) + \exp(-|y|)} \quad \text{EQ 8}$$

$$f(|x|, |y|) = -\ln(\exp(-|x|) + \exp(-|y|)) + \ln(1 + \exp(-(|x| + |y|)))$$

$$f(|x|, |y|) = \min(|x|, |y|) + \ln\left[\frac{1 + \exp(-(|x| + |y|))}{1 + \exp(-||x| - |y||)}\right] = \min\!**(|x|, |y|)$$

We denote the right side of the last equation by the min function, or more specifically shown as min$(|x|,|y|)$. The min* function is provided here for comparison to the min** function.

For any real values x and y, the calculation of min* may be described as below. The min* calculation includes finding an actual minimum and also a natural log base e ($\log_e = \ln$) correction factor.

$$\min\!*(x, y) = -\ln(e^{-x} + e^{-y})$$

In general, we define min*$(x_1, \ldots, x_N)$=min*(min*$(x_1, \ldots, x_{N-1}), x_N$). Using induction, one can prove the following relationship:

$$\min\!*(x_1, \ldots, x_N) = -\ln(e^{-x_1} + e^{-x_2} + \ldots + e^{-x_N})$$

From the min* relationship shown above, we have $$\min\!*(x, y) = \begin{cases} -\ln(e^{-x}(1+e^{x-y})), & x \le y \\ -\ln(e^{-y}(1+e^{y-x})), & x > y \end{cases} = \min(x, y) - \ln(1 + e^{-|x-y|})$$

This equation may also be simplified as shown below:

$$\min\!*(x, y) = \min(x, y) - \ln(1 + e^{-|x-y|})$$

It is noted that the min** function also has some similarities to the min* function. For example, similar to the definition of min*, part of the min** function, shown as ln $$\left[\frac{1 + \exp(-(|x| + |y|))}{1 + \exp(-||x| - |y||)}\right],$$

may be considered as a natural log base e ($\log_e = \ln$) correction factor that only needs a read-only memory (ROM), or some other memory storage device, to store some possible values of that portion. One example of how such storage may be performed may be found in E. Eleftheriou, T. Mittelholzer and A. Dholakia, "Reduced-complexity decoding algorithm for low-density parity-check codes," *IEEE Electronic Letters*, Vol. 37, pp. 102–104, January 2001.

Moreover, we denote min$(x_1, \ldots, x_n)$=min(min**$((x_1, \ldots, x_{n-1}), x_n))$ Using this relationship, then the relationship of EQ 7 may be described as the following relationship:

$$L\!\left(\sum_{i=1}^{k} v_i\right) = \left[\prod_{i=1}^{k} \text{sign}(L(u_i))\right] \min\!**\{|L(v_1)|, \ldots, |L(v_k)|\}$$

In taking the first part of the right side of the second equation in EQ 8, the authors of J. Hagenauer, E. Offer, and L. Papke, "Iterative decoding of binary block and convolutional codes," *IEEE Trans. Inform. Theory*, Vol. 42, No. 2 March 1996, pp. 429–445 had suggested to use the approximation $f(|x|,|y|) \approx \min(|x|,|y|)$.

With this approximation, the EQ 7 may then be described as follows:

$$L\!\left(\sum_{i=1}^{k} v_i\right) \approx \left[\prod_{i=1}^{k} \text{sign}(L(u_i))\right] \min\{|L(v_1)|, \ldots, |L(v_k)|\}$$

However, this proposed solution is a very significant compromise of the accuracy of the calculation. As a result of such a significant compromise in accuracy, a great loss is performance is undesirably realized using such an approach. A much better approximation that includes the appropriate logarithmic correction may be employed as follows:

Approximate $f(|x|,|y|)$ as follows:

$$f(|x|,|y|) \approx \min\!*(|x|,|y|) = \min(|x|,|y|) - \ln(1 + e^{-||x|-|y||})$$

It is especially noted here that this approximation shown above does not result in any performance loss. This way, a simplification may be made in the operations performed without any performance loss thereby achieving a more efficient implementation.

With this approximation, the relationship of the EQ 7 will then become $$L\!\left(\sum_{i=1}^{k} v_i\right) = \left[\prod_{i=1}^{k} \text{sign}(L(u_i))\right] \min\!*\{|L(v_1)|, \ldots, |L(v_k)|\}$$

The following description employs the various relationships described above in performing LDPC decoding. The following FIGS. 14, 15, and 16 all show embodiments of how the check node processing functionality of the FIG. 13 may be supported according to the invention.

The application of the EQ 7 is made to an LLR decoder. In doing so, the value of $L(v_i)$ is replaced by $$L_{var}^{n-1}(i, j)$$

with respect to the edge (i, j). In doing so, then the extrinsic information value of the check node with respect to the edge (i, j), shown as $L_{check}^n(i, j)$, will become:

$$L_{check}^n(i, j) = \quad \text{EQ 9}$$

$$\left[\prod_{e \in E_c(j)\setminus\{(i,j)\}} \text{sign}(L_{var}^{n-1}(e))\right] f(\{|L_{var}^{n-1}(e)| | e \in E_c(j)\setminus\{(i, j)\}\})$$

FIG. 14 is a functional block diagram illustrating an embodiment of straightforward check node processing functionality that is arranged according to the invention. The FIG. 14 employs a straightforward implementation of EQ 9. In doing so, the calculation of the function $f$ is performed in a first functional block. When referring to the EQ 9, it is seen that $f$ has $|E_c(j)|-1$ values. Therefore, $|E_c(j)|-2$ computational operations are then needed to compute one value of $f$.

In a second functional block, the $|E_c(j)|$ values are computed for every check node. This calculation will cost $|E_c(j)|(|E_c(j)|-1)$ computational operations without considering computing the product of sign functions, for example ($\Pi \text{sign}(L)$).

We may look at one specific embodiment in order to see the computational requirements to support this straightforward check node processing functionality. In doing so, we consider decoding a regular (4,72) LDPC code. For every check point $c_i$, 5040 computational operations are needed to perform the decoding. While a regular LDPC code is used here for illustration, it is also noted that the invention is also operable to accommodate irregular LDPC codes as well.

After performing the calculation of the $|E_c(j)|$ values, then the extrinsic information for the check node is calculated according to the straightforward check node processing functionality of the FIG. 14.

FIG. 15 is a functional block diagram illustrating an embodiment of min* (min*+ and min*−) or max* (max*+ and max*−) check node processing functionality that is arranged according to the invention. The FIG. 15 may employ min* processing that is further broken down into min*+ and min*− operations. Alternatively, the FIG. 15 may employ max* processing that is further broken down into max*+ and max*− operations. This breakdown is also described in detail within, "Inverse function of min*: min*− (inverse function of max*: max*−)," that has been incorporated by reference above.

When breaking down the min* operation into min*+ and min*− (the inverse of min*+) operations, min* operation itself, defined above, is now renamed as being a min*+ operation. Furthermore, the following definition of the min*− operation may be shown on any real values x and y such that x<y as follows:

$$\text{min*}-(x, y)=-\ln(e^{-x}-e^{-y})$$

Then, we have min*−(x, y)=min(x, y)−ln(1−e^{−|x−y|}). The complexity of this min*− operation is that of min*(2 element) operation.

There is also a very useful property of the min*− operation when compared to the min*+ operation. As mentioned above, the min*− operation is an inverse of the min*+ operation. This operation may be shown below. Since $e^{-x}+e^{-y}>e^{-y}$, we have $-\ln(e^{-x}+e^{-y})<y$, thus, min*+(x, y)<y. Therefore, by employing the definitions of min*+ and min*−, the following relationship may be made as follows:

$$\text{min*} -(\text{min*}+(x, y), y)=-\ln(e^{\ln(e^{-x}+e^{-y})}-e^{-y})=-\ln(e^{-x})=x$$

This relationship and operation may be employed to provide for significantly reduced computationally complexity that performing straightforward min* or max* processing. Using the relationships introduced above, a min* processing functional block that employs both min*− and min*+ operations may be employed. Alternatively, by using analogous relationships corresponding to max* processing, a max* processing functional block that employs both max*− and max*+ operations may be employed.

The relationships between the max*− and max*+ operations of max* are described below in light of the decoding processing to be performed herein.

Some of the similar terms between the definitions of min*(x, y) and max* (x, y), can also be seen when the two terms are compared together as follows:

$$\text{min*}(x, y)=-\ln(\exp(-x)+\exp(-y))$$

$$\text{max*}(x, y)=\ln(\exp(x)+\exp(y))$$

Using these similarities, the following relationship may be made between min* (x, y) and max* (x, y):

$$\text{min*}(x, y)=-\text{max*}(-x,-y)$$

We then have the following relationship for calculating the term, $L_{check}^n(i, j)$. By capitalizing on the relationship between min* and −max* shown just above, the following $L_{check}^n(i, j)$ value may be calculated.

$$L_{check}^n(i, j) = (-1)\left[\prod_{e \in E_c(j)\setminus\{(i,j)\}} \text{sign}(L_{var}^{n-1}(e))\right]\text{max}*(\{-|L_{var}^{n-1}(e)\| e \in E_c(j)\setminus\{(i, j)\}\})$$

Similar to the manner in which min* may be broken down to the min*− and min*+ functions, the max* function may also be broken down into the max*− and max*+ functions as follows:

$$\text{min*}+(x, y)=\text{max*}(x, y)=\max(x, y)+\ln(1+\exp(-|x-y|))$$

$$\text{min*}-(x, y)=\ln(\exp(x)-\exp(y))=\max(x, y)+\ln(1-\exp(-|x-y|))$$

Continuing on by looking at the min* approximation approach described above, the EQ 9 may then be shown as follows:

$$L_{check}^n(i, j) \approx \left[\prod_{e \in E_c(j)\setminus\{(i,j)\}} \text{sign}(L_{var}^{n-1}(e))\right]\text{min}*(\{|L_{var}^{n-1}(e)\| e \in E_c(j)\setminus\{(i, j)\}\})$$

The min*− operation also has a useful relationship as shown below:

$$\text{min*}(x_x, \ldots, x_{N-1})=\text{min*}-(\text{min*}+(x_1, \ldots, x_N), x_N)$$

Therefore, the min* operation may be performed by performing both the min*− and min*+ operations.

When applying this property to check node processing functional block supported within an LLR decoder, the following detailed implementation may be performed for every given check node $c_i$. The calculation of two separate variables A and S is performed when calculating the extrinsic information of a check node.

Compute A=min*($\{|L_{var}^{n-1}(e)\| e \in E_c(j)\}$)—this is performed using min* processing as described above; and $$\text{Compute } S = \prod_{e \in E_c(j)} \text{sign}(L_{var}^{n-1}(e)).$$

Alternatively, A may be computed using max* processing without departing from the scope and spirit of the invention. These two values of A and S are passed to the next functional block for calculation of the extrinsic (EXT) information of the check node. In doing so, min*− processing (or max*− processing when max*+ processing has been used to compute A) is performed using the value of A and the variable node extrinsic (EXT) information value. For example, for (i, j), starting from node $c_i$:

$$\text{Compute } L_{check}^n(i, j) = [S \cdot \text{sign}(L_{var}^{n-1}(i, j))]\text{min}*-(A, |L_{var}^{n-1}(i, j)|)$$

This min*− operation (or alternatively max*− operation) may be implemented in a number of ways. For example, several min*− or max*− functional blocks may be implemented to support simultaneous calculation of all of these values for all of the edges (as in a parallel implementation that includes multiple min*− or max*− functional blocks). Alternatively, a single min*− or max*− functional block may be implemented that sequentially calculates all of these values for all of the edges (as in a serial implementation that includes a single min*− or max*− functional block).

Without considering calculation of the product sign functions, this approach provides for a very large reduction in computational operations; this approach only needs $2|E_c(j)|-1$ computational operations.

We may look at one specific embodiment in order to see the computational requirements to support this min* (min*+ and min*−) check node processing functionality. In doing so, we consider decoding a regular (4,72) LDPC code. For every check point $c_i$, only 143 computational operations are needed to perform the decoding as compared to the 5040 computational operations are needed to perform the decoding in the straightforward approach. These 143 computational operations include performing 71 computing operations when calculating A and 72 computing operations when calculating the extrinsic (EXT) information of the check node. Again, while a regular LDPC code is used here for illustration, it is also noted that the invention is also operable to accommodate irregular LDPC codes as well.

In addition, a single stage min* or max* implementation and/or a parallel min* or max* implementation may be employed as described within, "Single stage implementation of min*, max*, min and/or max to perform state metric calculation in SISO decoder," that has been incorporated by reference above. In addition, a serial min* or max* implementation may alternatively be implemented by using a single min* or max* functional block that sequentially performs each of the necessary min* or max* calculations in a serial fashion.

FIG. 16 is a functional block diagram illustrating an embodiment of min (min+ and min−) or max (max+ and max−) check node processing functionality that is arranged according to the invention. Again, the min function has been describe above. The max function is analogous to the min** function.

Using the min approach, the EQ 9 becomes $$L_{check}^n(i,j) = \left[\prod_{e \in E_c(j)\setminus\{(i,j)\}} \text{sign}(L_{var}^{n-1}(e))\right] \min(\{|L_{var}^{n-1}(e)| | e \in E_c(j)\setminus\{(i,j)\}\})$$

In similar manner in which the min* function may be broken down into a min*+ and min*− function, so may the min function be broken down into a min+ and min− function. To speed up the computation of this formula above using min processing, the min− function is first provided as shown below and then the relationship between the min− function and the min**+ function is given:

$$\min*-(x,y) = \min(x,y) - \ln\left(\frac{1-\exp(-(x+y))}{1-\exp(-|x-y|)}\right)$$

where the possible values of $$\ln\left(\frac{1-\exp(-(x+y))}{1-\exp(-|x-y|)}\right)$$

may also be stored in Read Only Memory (ROM). In addition, the component values of the term, $$\ln\left(\frac{1-\exp(-(x+y))}{1-\exp(-|x-y|)}\right),$$

may also be stored in ROM. For example, the natural log of the numerator, shown as $\ln(1-\exp(-(x+y)))$, and the natural log of the denominator, shown as $\ln(1-\exp(-|x-y|))$, may alternatively be stored in ROM and retrieved to calculate the value of their differences, $\ln(1-\exp(-(x+y)))-\ln(1-\exp(-(x+y)))$, which is then the value of the ratio term, $$\ln\left(\frac{1-\exp(-(x+y))}{1-\exp(-|x-y|)}\right).$$

Moreover, the following relationship is also true:

$$\min**-(x,y) = \ln\left(\frac{\exp(-(x+y))-1}{\exp(-y)-\exp(-x)}\right)$$

Using this relationship, even further simplification may be made as follows:

$$\min-(\min+(x,y),y) = \ln\left(\frac{e^{\ln\left[\frac{e^x+e^y}{1+e^{x+y}}\right]-y}-1}{e^{-y}-e^{\ln\left[\frac{e^x+e^y}{1+e^{x+y}}\right]}}\right)$$

$$\min-(\min+(x,y),y) = \ln\left[\frac{\exp(-y)(\exp(x)+\exp(y))-1-\exp(x+y)}{\exp(-y)(1+\exp(x+y))-\exp(x)-\exp(y)}\right]$$

$$\min-(\min+(x,y),y) = \ln\left[\frac{\exp(x)(\exp(-y)-\exp(y))}{(\exp(-y)-\exp(y))}\right] = x$$

Therefore, the following relationship may be made:

$$\min(x_1, \ldots, x_{N-1}) = \min-(\min**+(x_1, \ldots, x_N), x_N)$$

This shows the relationship between the min− function and the min+ function in the context of the overall min** function.

By applying this property to check node processing functionality employed within an LLR decoder (for example, as shown within check node processing functional block of the FIG. 13), the following detailed implementation for every given check node $c_i$ may be performed.

A first functional block involves calculating A and S for subsequent use in calculating the extrinsic information of the check node.

Compute $A = \min**(\{|L_{var}^{n-1}(e)| | e \in E_c(j)\})$; and $$S = \prod_{e \in E_c(j)} \text{sign}(L_{var}^{n-1}(e)).$$

For every edge (i, j) starting from node $c_j$:

Compute $L_{check}^n(i,j) = [S \cdot \text{sign}(L_{var}^{n-1}(i,j))]\min**-(A,|L_{var}^{n-1}(i,j)|)$.

This min− operation (or alternatively max− operation) may be implemented in a number of ways. For example, several min− or max− functional blocks may be implemented to support simultaneous calculation of all of these values for all of the edges (as in a parallel implementation that includes multiple min− or max− functional blocks). Alternatively, a single min− or max− functional block may be implemented that sequentially calculates all of these values for all of the edges (as in a serial implementation that includes a single min− or max− functional block).

Without considering calculation of the product sign functions, this approach using min or max also provides for a very large reduction in computational operations; this approach only needs $2|E_c(j)|-1$ computational operations.

We may look at one specific embodiment in order to see the computational requirements to support this min**

(min+ and min−) check node processing functionality. In doing so, we consider decoding a regular (4,72) LDPC code. For every check point $c_i$, only 143 computational operations are needed to perform the decoding as compared to the 5040 computational operations are needed to perform the decoding in the straightforward approach. These 143 computational operations include performing 71 computing operations when calculating A and 72 computing operations when calculating the extrinsic (EXT) information of the check node. Again, while a regular LDPC code is used here for illustration, it is also noted that the invention is also operable to accommodate irregular LDPC codes as well.

In addition, a single stage min or max implementation and/or a parallel min or max implementation may be employed according to the principles described within, "Single stage implementation of min*, max*, min and/or max to perform state metric calculation in SISO decoder," that has been incorporated by reference above. In addition, a serial min or max implementation may alternatively be implemented by using a single min or max functional block that sequentially performs each of the necessary min or max calculations in a serial fashion.

While the decoding processing described above employs the sign function within the context of min** or max* processing, an alternative approach to performing min or max that does not need the sign function. As the above decoding processing (that employs the sign function) is initially described in the context of min processing, the following decoding processing (NOT employing the sign function) is also initially described in the context of min processing.

The following function, $f(x, y)$, is employed in this discussion.

$$f(x, y) = \ln\frac{1 + \exp(x + y)}{\exp(x) + \exp(y)}$$

$$f(x, y) = \ln\frac{1 + \exp(-x - y)}{\exp(-x) + \exp(-y)}$$

$$f(x, y) = \ln(\exp(-x) + \exp(-y)) + \ln(1 + \exp(-x - y))$$

$$f(x, y) = \min(x, y) + \ln\left(\frac{1 + \exp(-(x + y))}{1 + \exp(-|x - y|)}\right)$$

$$f(x, y) = \min**(x, y)$$

It is also pointed out here that the min* function may be defined as follows:

$$\min+(x, y) = \min(x, y)$$

The inverse function of the min+ function is shown below as min−.

$$\min**-(x, y) = \ln\left(\frac{\exp(-(x + y)) - 1}{\exp(-y) - \exp(-x)}\right)$$

$$\min**-(x, y) = \min(x, y) - \ln\left(\frac{1 - \exp(-(x + y))}{1 - \exp(-|x - y|)}\right)$$

Using these relationships, the computation of the $L_{check}^n(i, j)$ may be performed without the sign function as follows:

$$L_{check}^n(i, j) = \min**\left(\sum L_{var}^{n-1}(e) \mid e \in E_c(j) \setminus \{(i, j)\}\right)$$

In addition, similar to how the min (min+ and min−) functions are employed above to perform LDPC decoding, max (max+ and max−) functions may be employed to perform LDPC decoding as described below.

$$\min(x, y) = -\max(-x, -y)$$

$$\max+(x, y) = \min+(x, y)$$

Therefore, one possible embodiment of implementing max**+(x, y) is shown below:

$$\max**+(x, y) = -\max(-x, -y) + \ln\left(\frac{1 + \exp(-(x + y))}{1 + \exp(-|x - y|)}\right)$$

In addition, another possible embodiment of how to implement the max**+(x, y) calculation is shown below:

$$\max**+(x, y) = -\max(x, y) + \ln\left(\frac{1 + \exp(+(x + y))}{1 + \exp(-|x - y|)}\right)$$

In addition, the following relationships are provided between max−(x, y) and min−(x, y).

$$\max-(x, y) = \min-(x, y) = -\max(-x, -y) - \ln\left(\frac{1 - \exp(-(x + y))}{1 - \exp(-|x - y|)}\right)$$

$$\max*(x, y) = \ln(\exp(x) + \exp(y)) = \max(x, y) + \ln(1 + \exp(-|x - y|))$$

Figure 17:
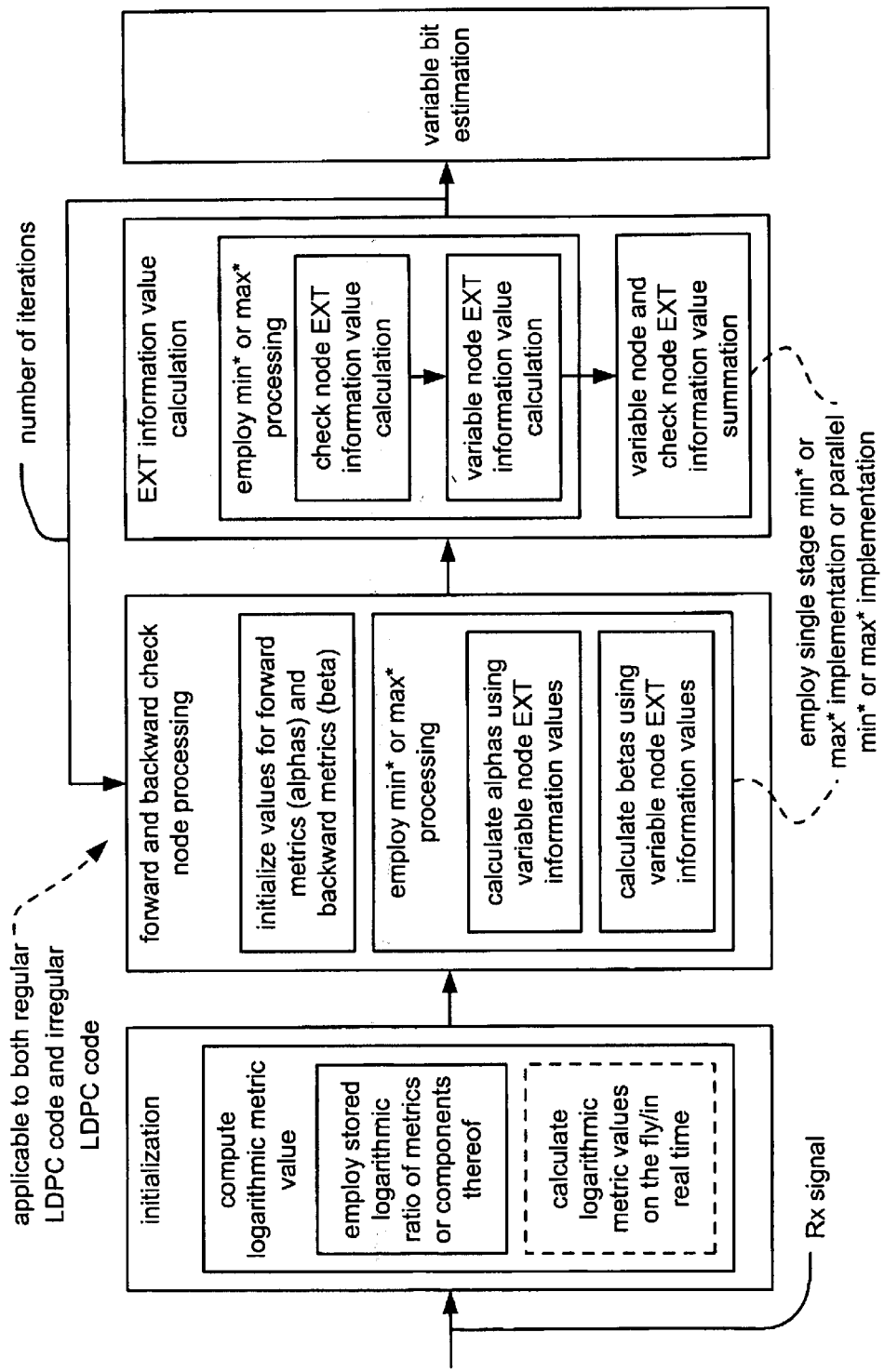
FIG. 17 is a functional block diagram illustrating an embodiment of LDPC forward/backward decoding functionality that is arranged according to the invention.

FIG. 17 is a functional block diagram illustrating an embodiment of LDPC forward/backward decoding functionality that is arranged according to the invention. The LDPC BP functionality includes a number of functional blocks that operate on a received (Rx) signal. The received signal is provided by an initialization functional block to establish the initial conditions of the decoding process, then to a forward and backward check node processing block and on to an extrinsic information value calculation functional block, respectively, and finally to a variable bit estimation functional block where the actual best estimation of one or more bits within the received signal are made.

The initialization functional block operates upon a received vector, $y = (y_0, \ldots, y_{N-1})$, within the received signal. The initialization functional block computes a logarithmic metric as shown below:

$$L_{metric}^i(0) = -\ln p(y_i/v_i = 0); \text{ and}$$

$$L_{metric}^i(1) = -\ln p(y_i/v_i = 1).$$

In order to save memory, only the logarithmic ratio of the metric need be saved in the memory; the logarithmic ratio of metrics may be stored or the components thereof. However, the logarithmic value of the metric may alternatively be calculated on the fly, in real time, using the log ratio values. For example, the initial values for the variable node extrinsic information value may be set to the logarithmic metric value for all edges e.

For example, $$L_{var}^0(e, a) = L_{metric}^{v(e)}(a) \text{ for all edges } e.$$

Within the forward and backward check node processing functional block, the initial values for alpha ($\alpha$) and beta ($\beta$). In addition, min* or max* processing is also performed to calculate the actual values of alpha ($\alpha$) and beta ($\beta$) using the variable node extrinsic information values. This may be performed as follows:

For every check node $c_i$, i=0, ..., M−1, the edges are defined as $E_c(i)=\{e_0, \ldots, e_{d_c-1}\}$, and the initial values for alpha ($\alpha$) and beta ($\beta$) may be defined as follows:

$$\alpha_{i,0}(0)=0,\ \alpha_{i,1}(1)=\text{max; and}$$

$$\beta_{i,d_c-1}(0)=0,\ \beta_{i,d_c-1}(1)=\text{max}.$$

Then, the actual computation of the values for alpha ($\alpha$) and beta ($\beta$) throughout a frame of data is performed as follows (described here specifically using min* but may also be performed using max* without departing from the scope and spirit of the invention):

$$\alpha_{i,j}(a)=\min^*(L_{var}^{n-1}(e_{j-1},0)+\alpha_{i,j-1}(a), L_{var}^{n-1}(e_{j-1},1)+\alpha_{i,j-1}(a+1)),$$

for $j=1, \ldots, d_c-1$; and $$\beta_{i,j}(a)=\min^*(L_{var}^{n-1}(e_{j+1},0)+\beta_{i,j+1}(a), L_{var}^{n-1}(e_{j+1},1)+\beta_{i,j+1}(a+1)),$$

for $j=d_c-2, \ldots, 0$.

In the extrinsic information value calculation functional block, the check node extrinsic information value is calculated as well as the variable node extrinsic information value. This may be shown mathematically as follows:

Compute $L_{check}^n(e,a)=\min^*(\alpha_{c(e),v(e)}(0)+\beta_{c(e),v(e)}(a), \alpha_{c(e),v(e)}(1)+\beta_{c(e),v(e)}(a+1))$ Compute $L_{var}^n(e, a) = L_{metric}^{v(e)}(a) + \sum_{e' \in E_v(v(e))\setminus\{e\}} L_{check}^n(e', a)$ While these calculations are shown above specifically as using min* processing, it is also noted that max* processing may also be used without departing from the scope and spirit of the invention to calculate the check node extrinsic information value as well as the variable node extrinsic information value.

After these two extrinsic values are calculated, they are summed together.

In accordance with the iterative decoding described herein, multiple decoding iterations may be performed by feeding back the results provided by the EXT information value calculation functional block to the forward and backward check node processing functional block.

On the last iteration:

Compute $L_{var}(a)=L_{var}^n(e,a)+L_{check}^n(e,a)$

The best estimate of the value of the random variable is made based on this value. For example, the following analysis may be performed to make the best estimate of the variable bit. When $L_{var}(a)$ is less than zero, then the best estimate of a variable bit is made as being a value of 1.

$$v_i = \begin{cases} 0 & L_{var}(a) \geq 0 \\ 1 & L_{var}(a) < 0 \end{cases}$$

Alternatively, a reverse analysis may be performed if desired in certain embodiments.

$$v_i = \begin{cases} 1 & L_{var}(a) \geq 0 \\ 0 & L_{var}(a) < 0 \end{cases}$$

It is noted that any of the embodiments of the various methods shown and described below may be implemented within any of the devices including decoders within the various systems described herein. In addition, the functionality included within these several decoder embodiments may also be implemented to perform these methods as well.

Figure 18:
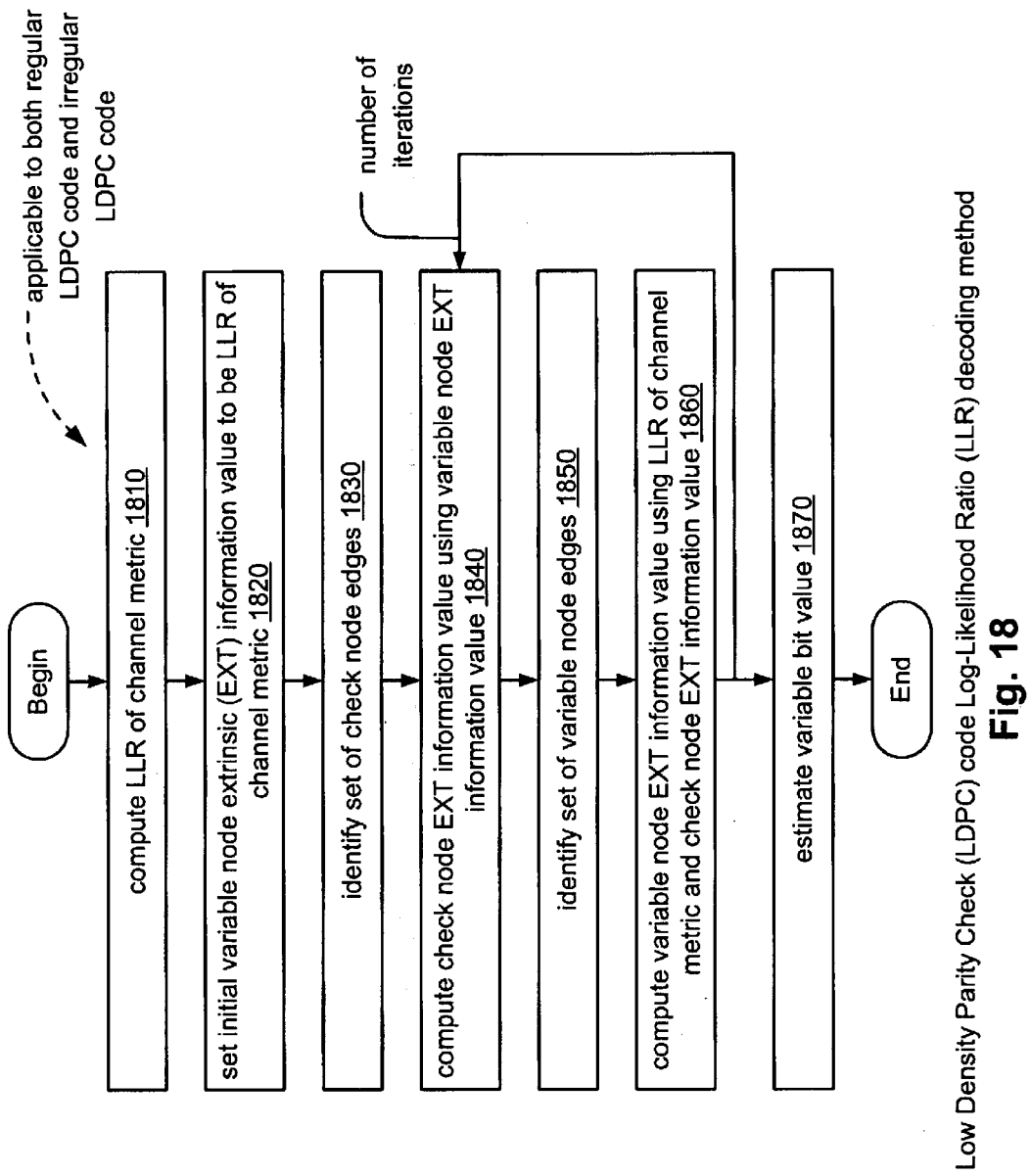
FIG. 18 is an operational flow diagram illustrating an embodiment of a Low Density Parity Check (LDPC) code Log-Likelihood Ratio (LLR) decoding method that is performed according to the invention.

FIG. 18 is an operational flow diagram illustrating an embodiment of a Low Density Parity Check (LDPC) code Log-Likelihood Ratio (LLR) decoding method that is performed according to the invention. In a block 1810, an LLR of a channel metric is computed. This LLR channel metric corresponds to a channel over which a received signal has been transmitted. Then, in a block 1820, a variable node extrinsic information value is initially set to be the LLR of the channel metric computed in the block 1810. Then, in a block 1830, a set of check node edges in addition identified. In a block 1840, the check node extrinsic information value is computed using the variable node extrinsic information value. In a block 1850, the set of variable node edges are identified. Then, in a block 1860, the variable node extrinsic information value using LLR of channel metric and check node EXT information value are computed.

In accordance with the iterative decoding described herein, multiple decoding iterations may be performed by feeding back the variable node extrinsic information value, calculated in the block 1860, to the block 1840. Ultimately, in a block 1870, the best estimate of the variable bit value is made.

Figure 19:
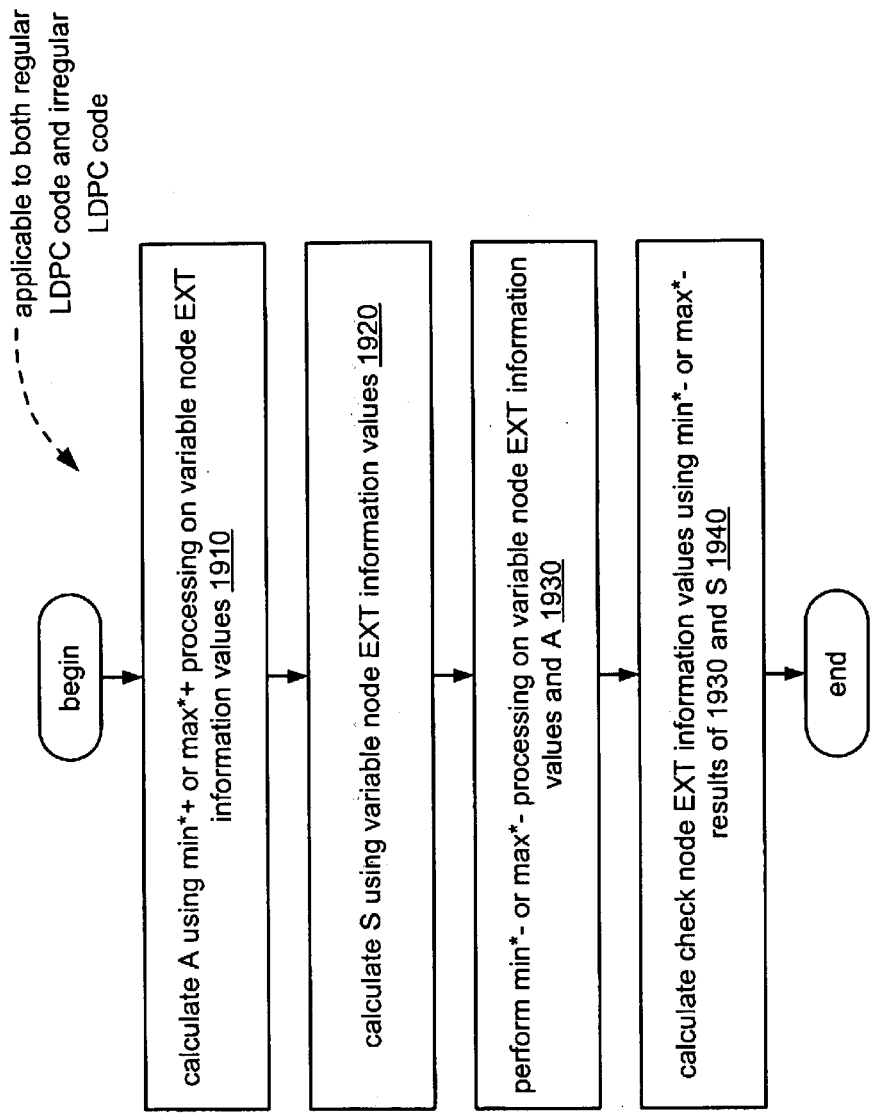
FIG. 19 is an operational flow diagram illustrating an embodiment of a min* (min*+ and min*−) or max* (max*+ and max*−) check node processing method that is performed according to the invention.

FIG. 19 is an operational flow diagram illustrating an embodiment of a min* (min*+ and min*−) or max* (max*+ and max*−) check node processing method that is performed according to the invention. An intermediate variable A is calculated using min*+ or max*+ processing on variable node extrinsic information values as shown in a block 1910. Then, a variable S is calculated using variable node extrinsic information values as shown in a block 1920. As shown in a block 1930, min*− or max*− processing is performed on variable node extrinsic information values and the variable A calculated in the block 1910. Ultimately, check node extrinsic information values are calculated using the min*− or the max*− results of 1930 and the value of S that is calculated as shown in the block 1940.

Figure 20:
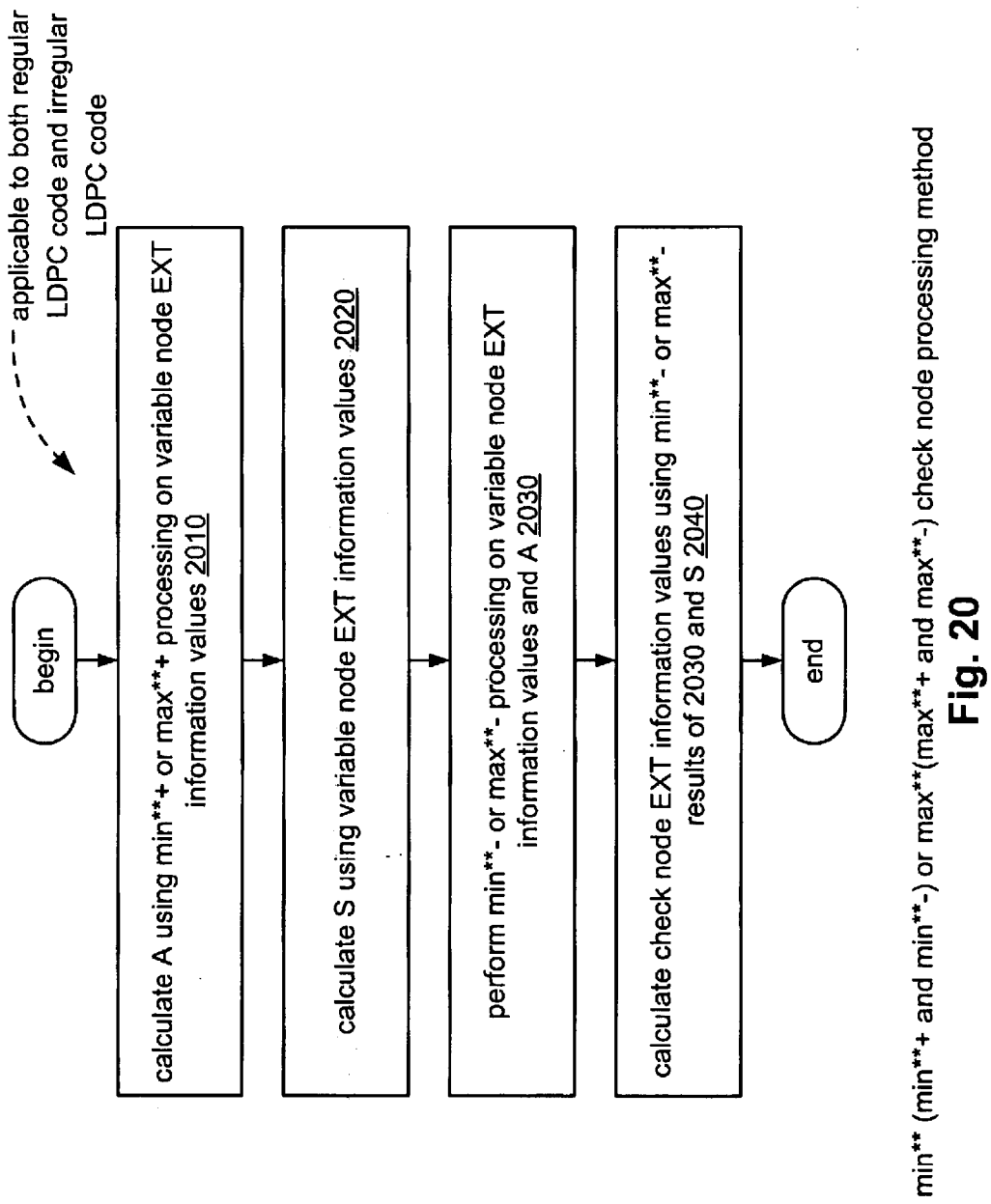
FIG. 20 is an operational flow diagram illustrating an embodiment of a min (min+ and min−) or max (max+ and max−) check node processing method that is performed according to the invention.

FIG. 20 is an operational flow diagram illustrating an embodiment of a min (min+ and min−) or max (max+ and max−) check node processing method that is performed according to the invention. The method shown within the FIG. 20 is similar to the method of the FIG. 19 with the exception that min** processing is performed instead of min* processing.

For example, an intermediate variable A is calculated using min+ or max+ processing on variable node extrinsic information values as shown in a block 2010. Then, a variable S is calculated using variable node extrinsic information values as shown in a block 2020. As shown in a block 2030, min− or max− processing is performed on variable node extrinsic information values and the variable A calculated in the block 2010. Ultimately, check node extrinsic information values are calculated using the min− or the max− results of 2030 and the value of S that is calculated as shown in the block 2040.

Figure 21:
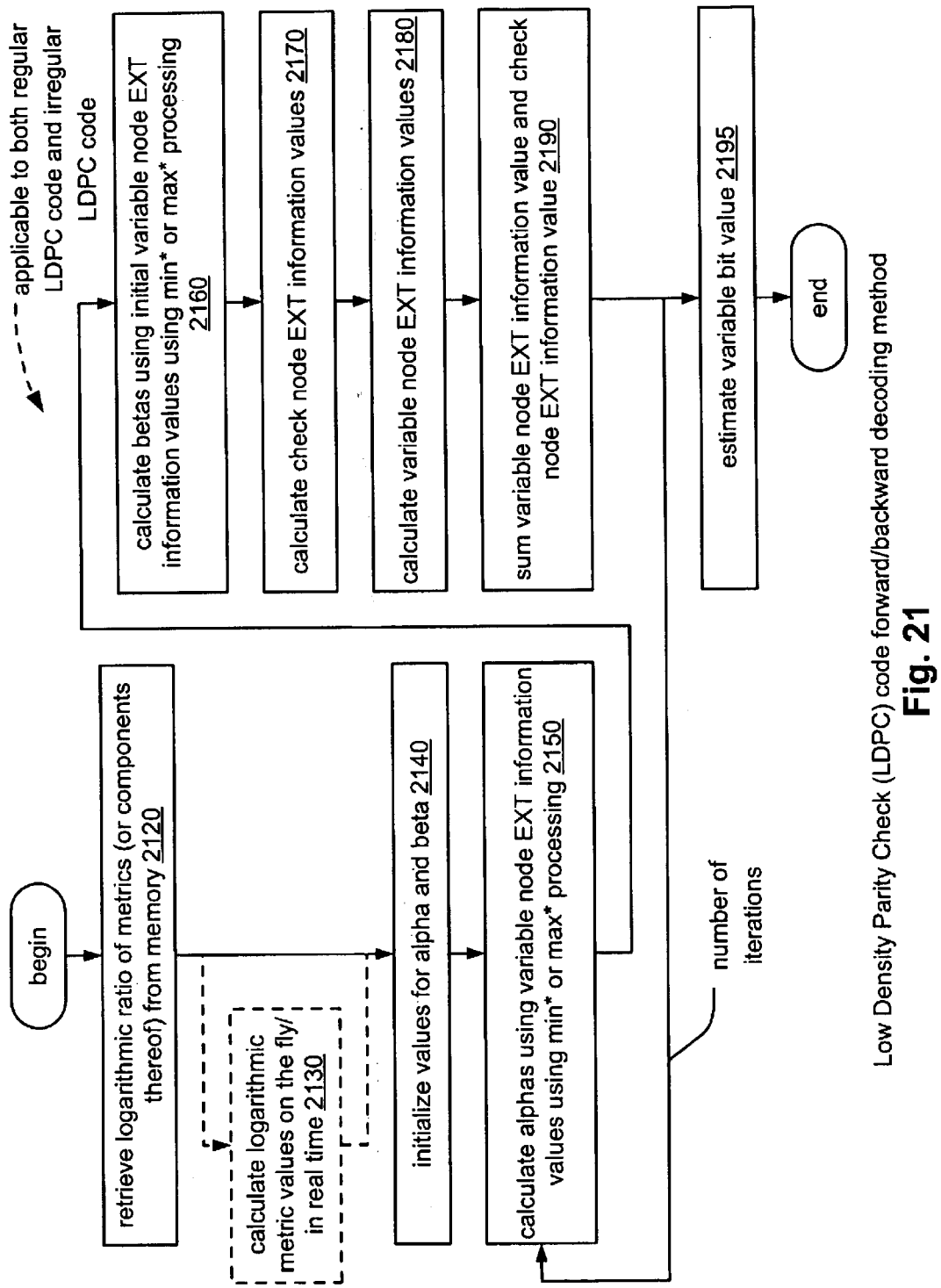
FIG. 21 is an operational flow diagram illustrating an embodiment of a Low Density Parity Check (LDPC) code forward/backward decoding method that is performed according to the invention.

FIG. 21 is an operational flow diagram illustrating an embodiment of a Low Density Parity Check (LDPC) code forward/backward decoding method that is performed according to the invention. As shown in a block 2120, a logarithmic ratio of metrics is retrieved from memory. If desired in certain embodiments, as shown in a block 2130, the logarithmic metric values are calculates on the fly/in real time. Afterwards, as shown in a block 2140, the values for alpha and beta are initialized. These variable node extrinsic values are used to calculate the alphas (as shown in a block

2150) and the betas (as shown in a block 2160) using min* or max* processing.

The check node extrinsic information values are then calculated as shown in a block 2170. Afterwards, the variable node extrinsic information values are calculated as shown in a block 2180. Once both the variable node and check node extrinsic information values are calculated within the blocks 2170 and 2180, then these two values are summed as shown in a block 2190.

In accordance with the iterative decoding described herein, multiple decoding iterations may be performed by feeding back the summed result, calculated in the block 2190, to the block 2150. Using this resultant sum of the two extrinsic values, a best estimate of the variable bit value is made as shown in a block 2195.

Figure 22:
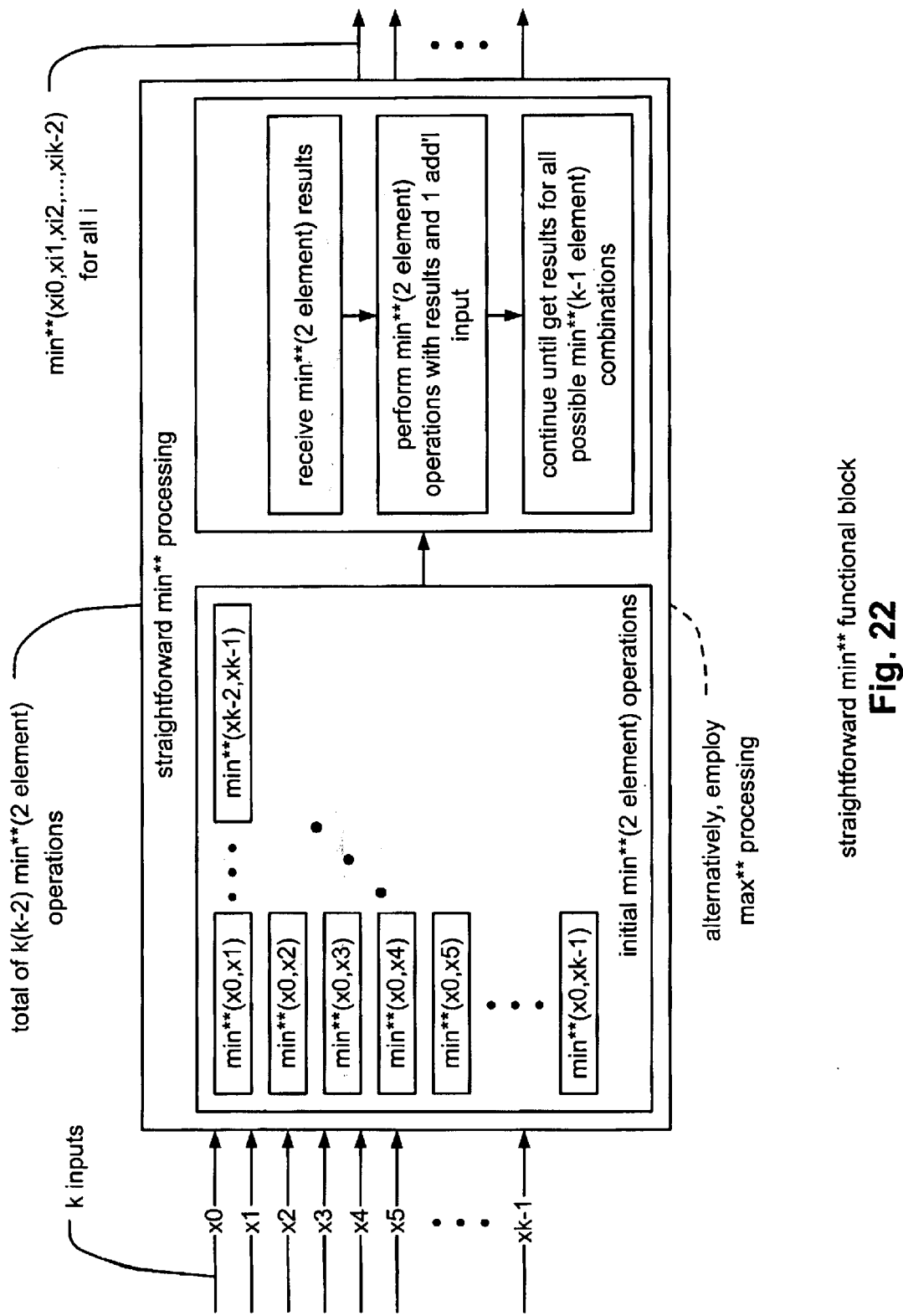
FIG. 22 is a functional block diagram illustrating an embodiment of a straightforward min** functional block that is arranged according to the invention.

FIG. 22 is a functional block diagram illustrating an embodiment of a straightforward min functional block that is arranged according to the invention. It is also noted that this functional block may alternatively be implemented using max processing without departing from the scope and spirit of the invention.

In performing the straightforward min** processing, we look at an embodiment where k inputs are provided.

Given k numbers $x_0, x_1, \ldots, x_{k-1}$. The problem is that to compute $\min^{**}(x_{i_0}, x_{i_1}, \ldots, x_{i_{k-2}})$ for all possible choices of k−1 elements among these k input numbers.

There are $$\binom{k}{k-1} = k$$

such combinations. If a straightforward method is used to every k−1 elements min, then a total of k(k−2) min(x, y) operations (called min**(2 element)) operations are needed.

Specifically, looking at the k inputs, we may parse the straightforward min processing into a preliminary/initial processing functional block and subsequent functional block. For example, several initial min(2 element) operations are performed on the various 2 element combinations of the entire gamut of inputs. Then, after these initial min(2 element) operations are performed, then the results there from are employed with additional elements, thereby performing additional min(2 element) operations that will include additional elements. This processing is performed until all of the combinations are calculated for all of the k−1 elements min operations. This straightforward approach is not an economic or fast way to compute these values. For example, when k=7, total 35 min(2 element) operations are needed.

One method to reduce the number of min**(2 element) operations is to perform an intermediate result sharing approach described below.

Figure 23:
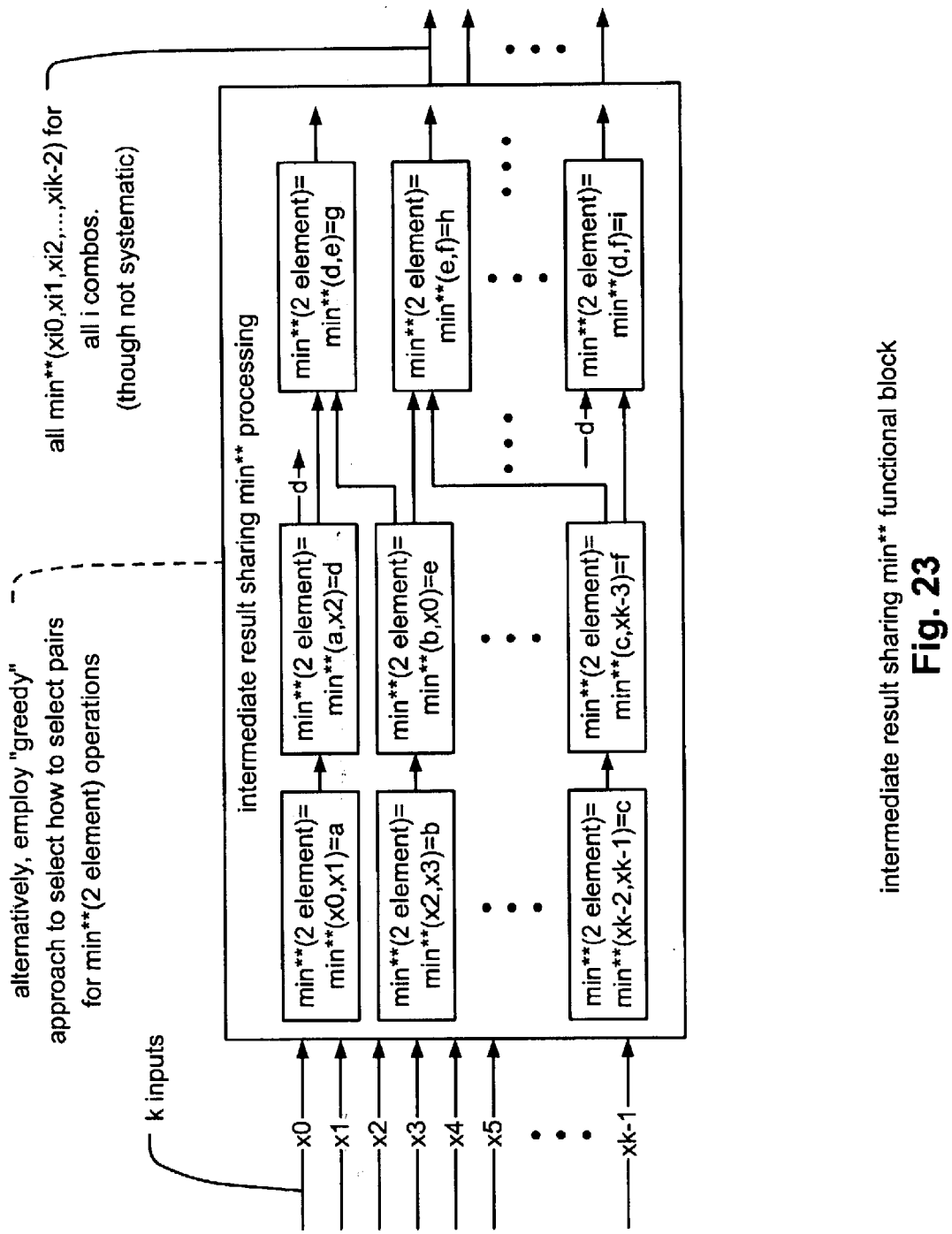
FIG. 23 is a functional block diagram illustrating an embodiment of an intermediate result sharing min** functional block that is arranged according to the invention.

FIG. 23 is a functional block diagram illustrating an embodiment of an intermediate result sharing min functional block that is arranged according to the invention. This intermediate result sharing approach may be implemented using a "greedy" approach; this is a locally optimal method that may be used to optimize the total gate count of a device that is used to implement the approach. When employing the greedy approach, the best choice is made at the moment. An exhaustive determination is not performed. For example, in the context of deciding which pair of min elements use in the first min calculation, the greedy approach looks for the most common element among all of the possible elements pairs. For example, the result of min(x0,x1) may be the most common used result at the initial assessment. The key point within the greedy approach is that this approach makes a locally optimal choice in the hope that this choice will lead to a globally optimal solution. A greedy choice property may be stated as follows: "A globally optimal solution can be arrived at by making a locally optimal (greedy) choice." However, it is also noted that any number of other approaches may also employ the intermediate result sharing described herein as well.

It is also noted that this functional block may alternatively be implemented using max** processing without departing from the scope and spirit of the invention.

These k inputs are again input; this time, they are input to an intermediate result sharing min processing functional block. Here, several of the results of min(2 element) operations are again calculated, but there is a more efficient grouping of these intermediate results when performing min(2 element) operations. The FIG. 23 shows the grouping of the intermediate results in an effort to provide a more efficient implementation of the intermediate values of a, b, c are generated from the min(2 element) operations that are performed on the input values; these next min(2 element) operations are used to generate the next iteration of min(2 element) operations outputs shown as d, e, f. This process continues until all of the k−1 elements min operations are performed. However, this intermediate result sharing min approach is somewhat problematic, in that, it is not a systematic approach. This makes it difficult to perform within decoder embodiments that require systematic operations, and it is very hard to use this approach for larger numbers of k.

Figure 24:
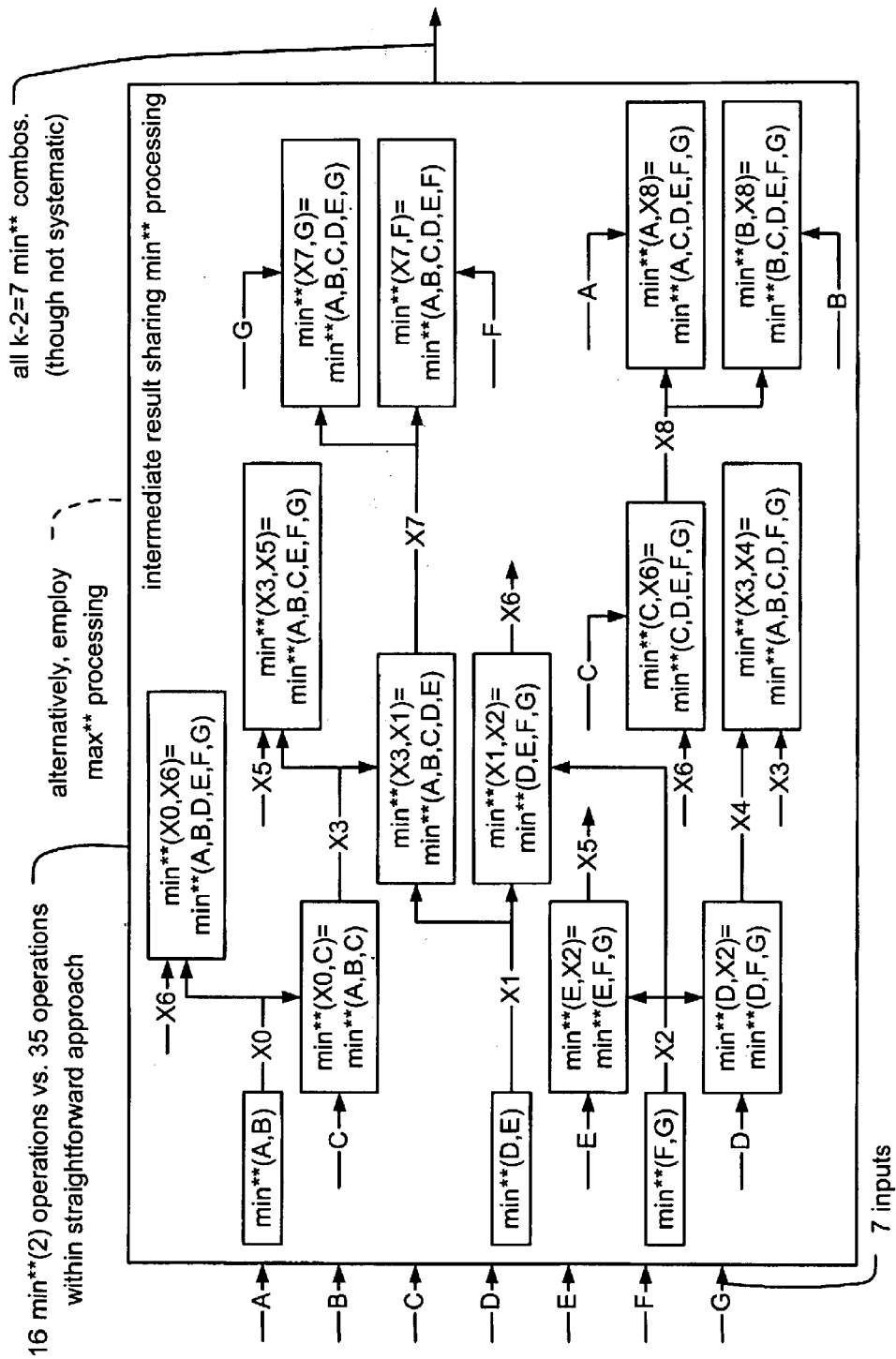
FIG. 24 is a functional block diagram illustrating another embodiment of the intermediate result sharing min** functional block of the FIG. 23 that is arranged according to the invention.

FIG. 24 is a functional block diagram illustrating another embodiment of the intermediate result sharing min functional block of the FIG. 23 that is arranged according to the invention. This particular embodiment will show the non-systematic embodiment of the FIG. 23 that operates on 7 inputs. This embodiment considers 7 elements A, B, C, D, E, F, G. The 7 possible min computations of k−1=6 element combinations are shown below:

min**(A,B,C,D,E,F)
min**(A,B,C,D,E,G)
min**(A,B,C,D,F,G)
min**(A,B,C,E,F,G)
min**(A,B,D,E,F,G)
min**(A,C,D,E,F,G)
min**(B,C,D,E,F,G)

An efficient selection of sharing the intermediate values is shown below in the following 16 operational steps.

Step 1: Compute $X_0$=min**(A,B);
Step 2: Compute $X_1$=min**(D,E);
Step 3: Compute $X_2$=min**(F,G);
Step 4: Compute $X_3$=min($X_0$,C) (=min(A,B,C));
Step 5: Compute $X_4$=min(D,$X_2$) (=min(D,F,G));
Step 6: Compute $X_5$=min(E,$X_1$) (=min(E,F,G));
Step 7: Compute $X_6$=min($X_1$,$X_2$) (=min(D,E,F,G));
Step 8: Compute $X_7$=min($X_3$,$X_1$) (=min(A,B,C,D,E));
Step 9: Compute $X_8$=min(C,$X_2$) (=min(C,D,E,F,G));
Step 10: Compute min(A,B,C,D,E,F)=min($X_7$,F);
Step 11: Compute min((A,B,C,D,E,G)=min($X_7$,G);
Step 12: Compute min(A,B,C,D,F,G)=min($X_3$,$X_4$);
Step 13: Compute min(A,B,C,E,F,G)=min($X_3$,$X_5$);
Step 14: Compute min(A,B,D,E,F,G)=min($X_0$,$X_6$)
Step 15: Compute min(A,C,D,E,F,G)=min(A,$X_8$); and
Step 16: Compute min(B,C,D,E,F,G)=min(B,$X_8$).

In this way, total 16 min(2 element) operations are needed, which is less than half number of the operations of the straightforward min approach described above. Again, it is noted that this intermediate sharing approach is not a systematic approach making it very hard to use for larger k.

In the following Figures and description, an even faster and systematic approach is introduced that employs min− or max− processing, being the inverses of the min or max processing operations, respectively.

Figure 25:
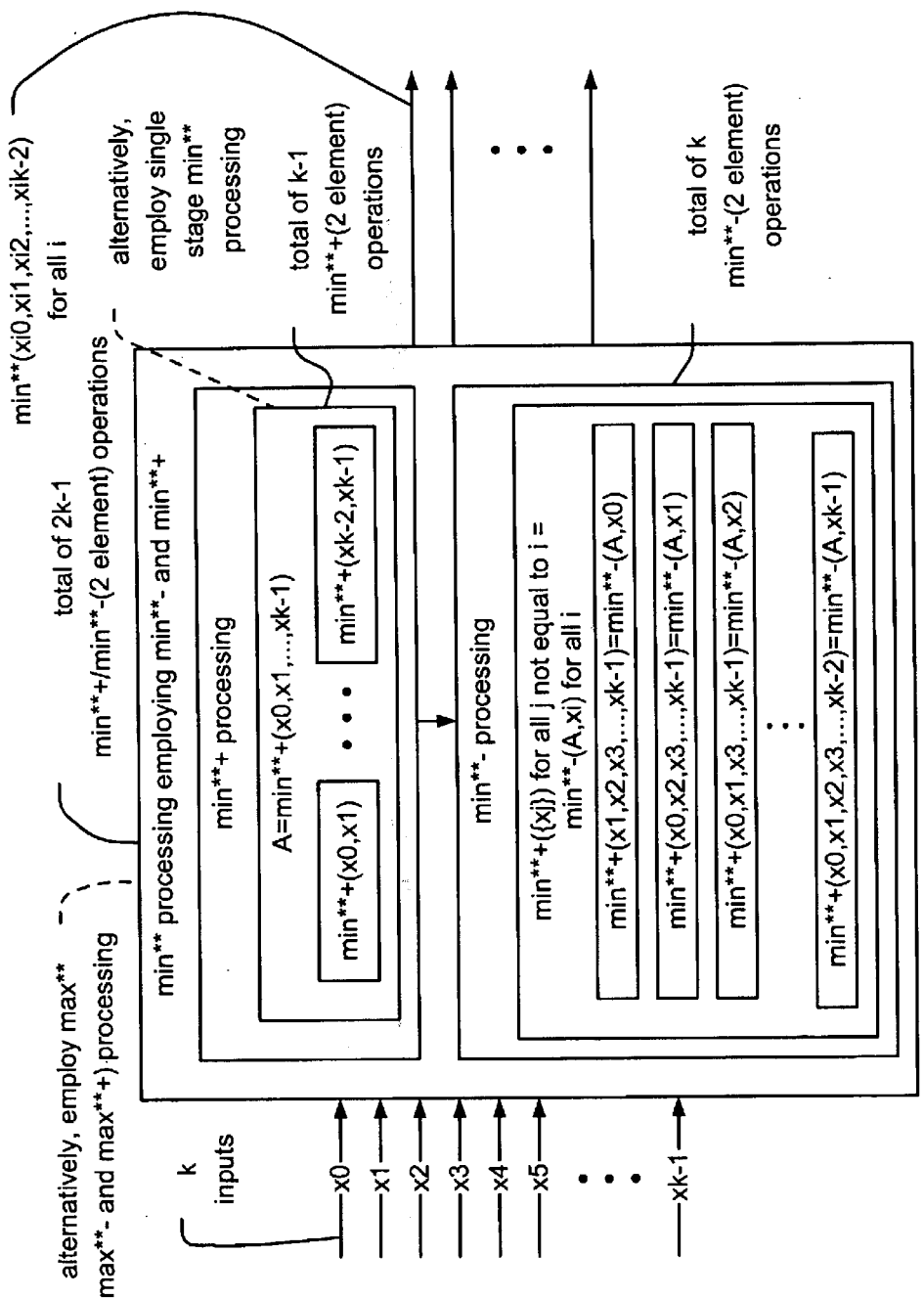
FIG. 25 is a functional block diagram illustrating an embodiment of a min functional block, employing min− and min**+ processing, that is arranged according to the invention.

FIG. 25 is a functional block diagram illustrating an embodiment of a min functional block, employing min− and min+ processing, that is arranged according to the invention. The min processing is further broken down into two separate operations.

The min operation itself, defined above, is now renamed as being a min+ operation. The complexity of this min− operation is the same as that of min(2 element) operation described above.

There is also a very useful property of the min− operation when compared to the min+ operation. The min− operation is an inverse function of the min+ operation. This relationship and operation may be employed to provide for significantly reduced computationally complexity that performing straightforward min processing. Using the relationships introduced above, a min processing functional block that employs both min− and min+ operations may be employed.

It is also noted that a max processing functional block that employs both max− and max+ operations may be alternatively employed. Again, there is a very useful property of the max− operation when compared to the max+ operation. The max− operation is an inverse function of the max**+ operation.

This relationship and operation may be employed to provide for significantly reduced computationally complexity that performing straightforward max processing. Using the relationships introduced above, a max processing functional block that employs both max− and max+ operations may be employed.

The FIG. 25 employs the min processing that is employed by performing both the min− and min+ operations. To illustrate the functionality of this more efficient operation, an illustration of an embodiment that is to perform min processing on k inputs is again used. To employ the min+ and min− processing to perform the total min processing, min+ processing is initially performed. In doing so, an intermediate variable A is first calculated using min+ processing that will subsequently be used to perform the min+ processing to generate all of the combinations of the k−1 elements of min**.

The min+ operations begin by calculating the intermediate variable A=min+($x_0, \ldots, x_{k-1}$). This is performed by performing k−1 min(2 element) operations. For example, the min(2 element) operations are shown as min+(x0,x1), ..., and min+(xk−2,xk−1) within the FIG. 25. However, the total min** operation requires the calculation of all of the possible k−1 element combinations.

It is also noted that other approaches may be used to calculate the intermediate value of A. One example includes performing the min calculation using a single stage operation. Alternatively, a parallel approach may also be employed to perform this min calculation. Moreover, a serial approach of the min calculation may be performed where a single min functional block sequentially performs all of the min calculations necessary to acquire the final min result. Other approaches may also be employed without departing from the scope and spirit of the invention.

The relationships of min− and min+, described above, is employed to continue the total min processing. For example, the use of the intermediate variable A is employed to finalize the min calculations of all of the k−1 element possible combinations. This is performed as follows:

For example, min+$_{j\neq}$({$x_j$})=min−(A,$x_i$) for all possible i.

A further clarification of this relationship is provided below:

Beginning with B=min**+$_{j\neq}$({$x_j$}), for j≠.

Next, the definition of min+ is employed, and the result of B is min'ed with each value of $x_i$, for all i. By employing by the inverse function property described above (that shows the relationship between min− and min+), the result may be derived as shown below.

$$B=\text{min}^{}-(\text{min}^{}+((B,x_i),x_i)=\text{min}^{**}-(A,x_i)$$

This processing that is employed within the decoding processing is shown within a min− functional block. For example, using the relationships of min, that employs min+ and min−, may be used to calculate all of the k−1 element possible combinations using only min−(2 element) operations. This reduced complexity, by breaking down the min operation into min+ and min−, will significantly reduce the computational complexity of the total min** operation as well as significantly conserve processing resources.

Specifically, the min**− calculations are shown below:

$$\text{min}^{}-(A,x0)=\text{min}^{}+(x1,x2,x3,\ldots,xk-1);$$

$$\text{min}^{}-(A,x1)=\text{min}^{}+(x0,x2,x3,\ldots,xk-1);$$

$$\text{min}^{}-(A,x2)=\text{min}^{}+(x0,x1,x3,\ldots,xk-1);\ldots;\text{and}$$

$$\text{min}^{}-(A,xk-1)=\text{min}^{}+(x0,x1,x2,x3,\ldots,xk-2).$$

The total number of min+(2 element) operations to be performed within the min+ processing functional block includes k−1 operations. In addition, the total number of min−(2 element) operations to be performed within the min− processing functional block includes k operations. Therefore, the total number of operations includes k−1+k=2k−1. This gives a tremendous savings when compared to the straightforward approach that requires k(k−2) min(2 element) operations. This min approach, by employing min− and min+ processing, may also be performed using fewer operations that the intermediate result sharing approach described above.

One additional property of the min processing that is employed by performing both the min− and min**+ operations is that it is a systematic approach.

Figure 26:
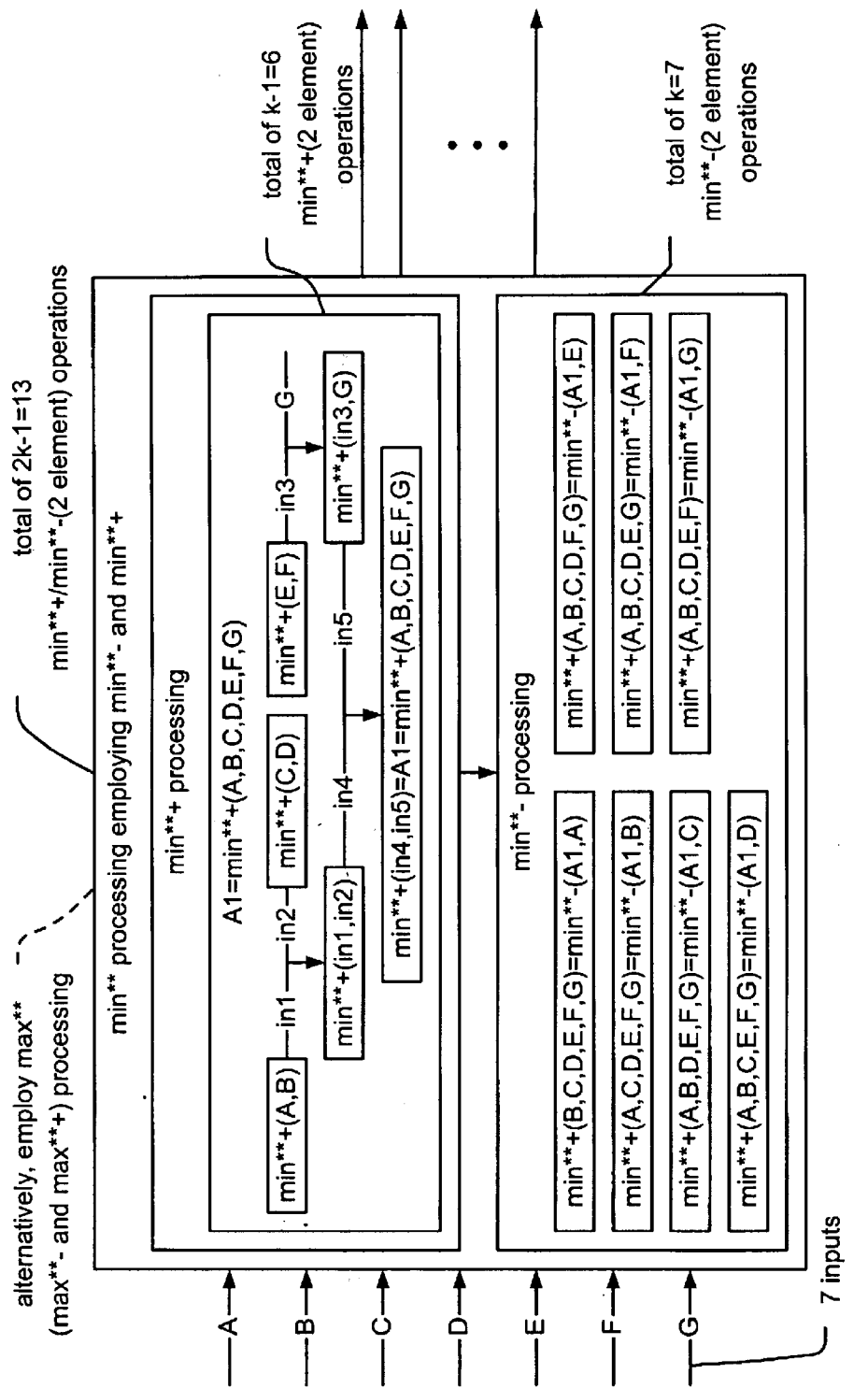
FIG. 26 is a functional block diagram illustrating another embodiment of a min functional block, employing min− and min**+ processing, of the FIG. 25 that is arranged according to the invention.

FIG. 26 is a functional block diagram illustrating another embodiment of a min functional block, employing min− and min+ processing, of the FIG. 25 that is arranged according to the invention. This particular embodiment shows a systematic embodiment that operates on 7 inputs. This embodiment considers 7 elements A, B, C, D, E, F, G. The 7 possible min computations of k−1=6 element combinations are once again shown below:

min**(A,B,C,D,E,F)
min**(A,B,C,D,E,G)
min**(A,B,C,D,F,G)
min**(A,B,C,E,F,G)
min**(A,B,D,E,F,G)
min**(A,C,D,E,F,G)
min**(B,C,D,E,F,G)

The min+ processing is first performed to calculate the A1=min(A,B,C,D,E,F,G) intermediate result that will subsequently be used to perform min− processing to calculate all of the min results shown above. The k−1=6 min**+(2 element) operations employed to do this are shown as follows:

Step 1: min**+(A,B)=in1
  Step 2: min**+(C,D)=in2
  Step 3: min**+(E,F)=in3
  Step 4: min**+(in1,in2)=in4
  Step 5: min**+(in3,G)=in5
  Step 6: min+(in4,in5)=min(A,B,C,D,E,F,G)=A1

This initial processing of the intermediate variable A1 may be viewed as being a parallel approach perform min** calculation.

This intermediate result A1 is then used within a min**− functional block to calculate all of the possible k−1 element combinations. A total number of k=7 operations is performed to do this in this embodiment.

Specifically, the min**− calculations are shown below:

Step 1: min−(A1,A)=min+(B,C,D,E,F,G)
  Step 2: min−(A1,B)=min+(A,C,D,E,F,G)
  Step 3: min−(A1,C)=min+(A,B,D,E,F,G)
  Step 4: min−(A1,D)=min+(A,B,C,E,F,G)
  Step 5: min−(A1,E)=min+(A,B,C,D,F,G)
  Step 6: min−(A1,F)=min+(A,B,C,D,E,G)
  Step 7: min−(A1,G)=min+(A,B,C,D,E,F)

As can be seen, a significant reduction of min(2 element) operations (be they min+ or min− operations) is achieved. For example, a total of 2k−1=13 operational steps may be performed. The min processing, employing both the min− and min+ operations, provides for a significant reduction in operational steps. This decoding processing functionality may be employed to provide for a reduction in processing steps within a variety of the codes mentioned above.

It is also noted that the embodiments shown within the FIGS. 25 and 26 may be implemented such they are also backward compatible with the decoding processing performed within the straightforward min processing and intermediate result sharing min processing functional blocks within the FIGS. 22, 23, and 24. That is to say, a single decoder may be implemented such that it may support (at any one time) one, two, or all of the straightforward min processing functionality, the intermediate result sharing min processing functionality, and the min (min+ and min−) processing functionality. Alternatively, a single decoder may be implemented such that it may support (at any one time) one, two, or all of the straightforward max processing functionality, the intermediate result sharing max processing functionality, and the max (max+ and max−) processing functionality.

Figure 27:
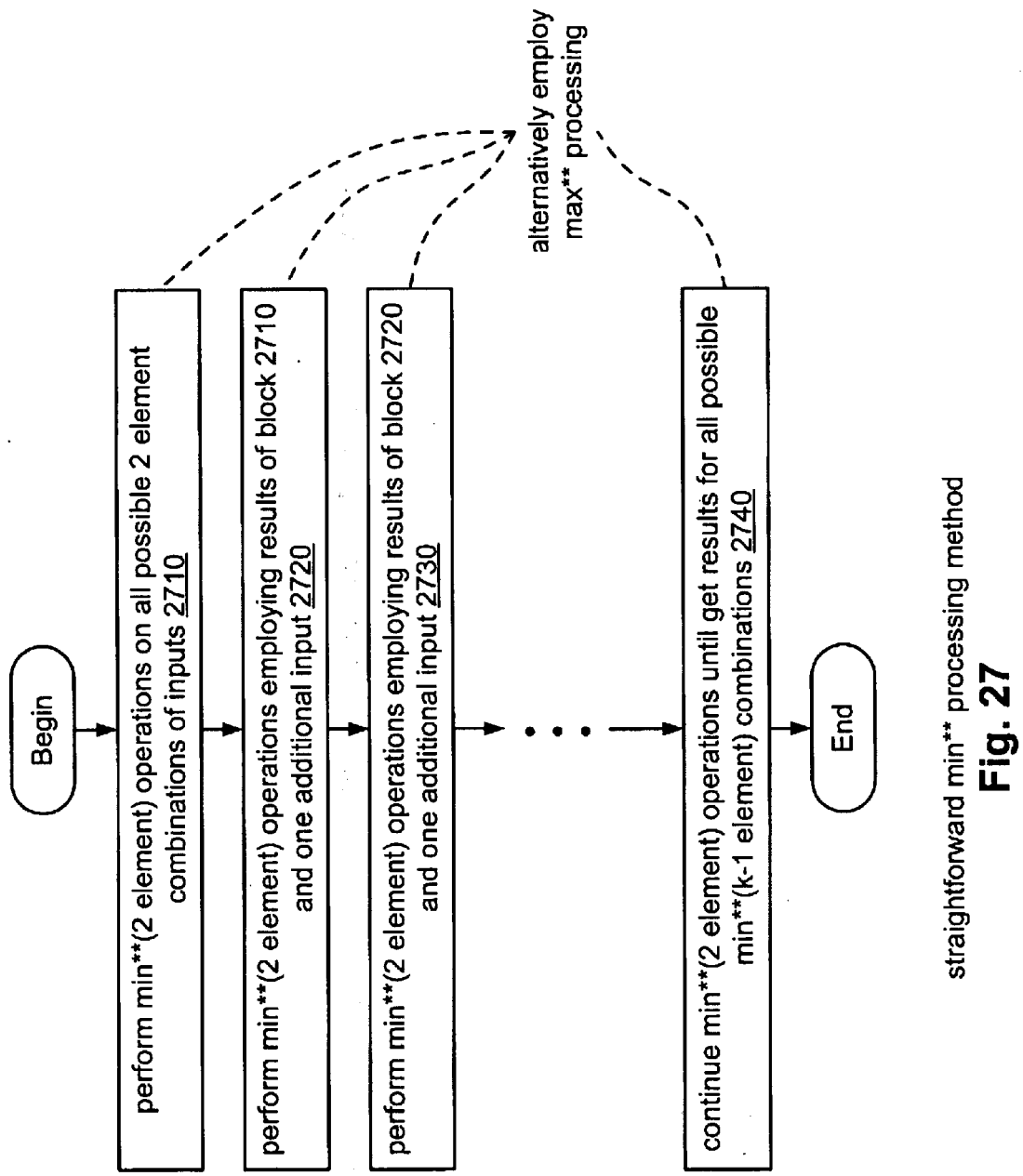
FIG. 27 is an operational flow diagram illustrating an embodiment of a straightforward min** processing method that is performed according to the invention.

FIG. 27 is an operational flow diagram illustrating an embodiment of a straightforward min processing method that is performed according to the invention. It is also noted that the max operations may alternatively be employed to perform straightforward processing according to the invention.

As shown in a block 2710, min operations are performed on all possible 2 element combinations of a number of inputs. Then, continuing on with the method, as shown in a block 2720, min(2 element) operations are performed on the results of the block 2710 and one additional input selected from the total number of inputs. Again, as shown in a block 2730, min(2 element) operations are performed on the results of the blocks 2710 and 2720 and one additional input selected form the total number of inputs. As shown in a block 2740, this process continues on until all of the possible min(k−1 element) combinations have been determined.

Figure 28:
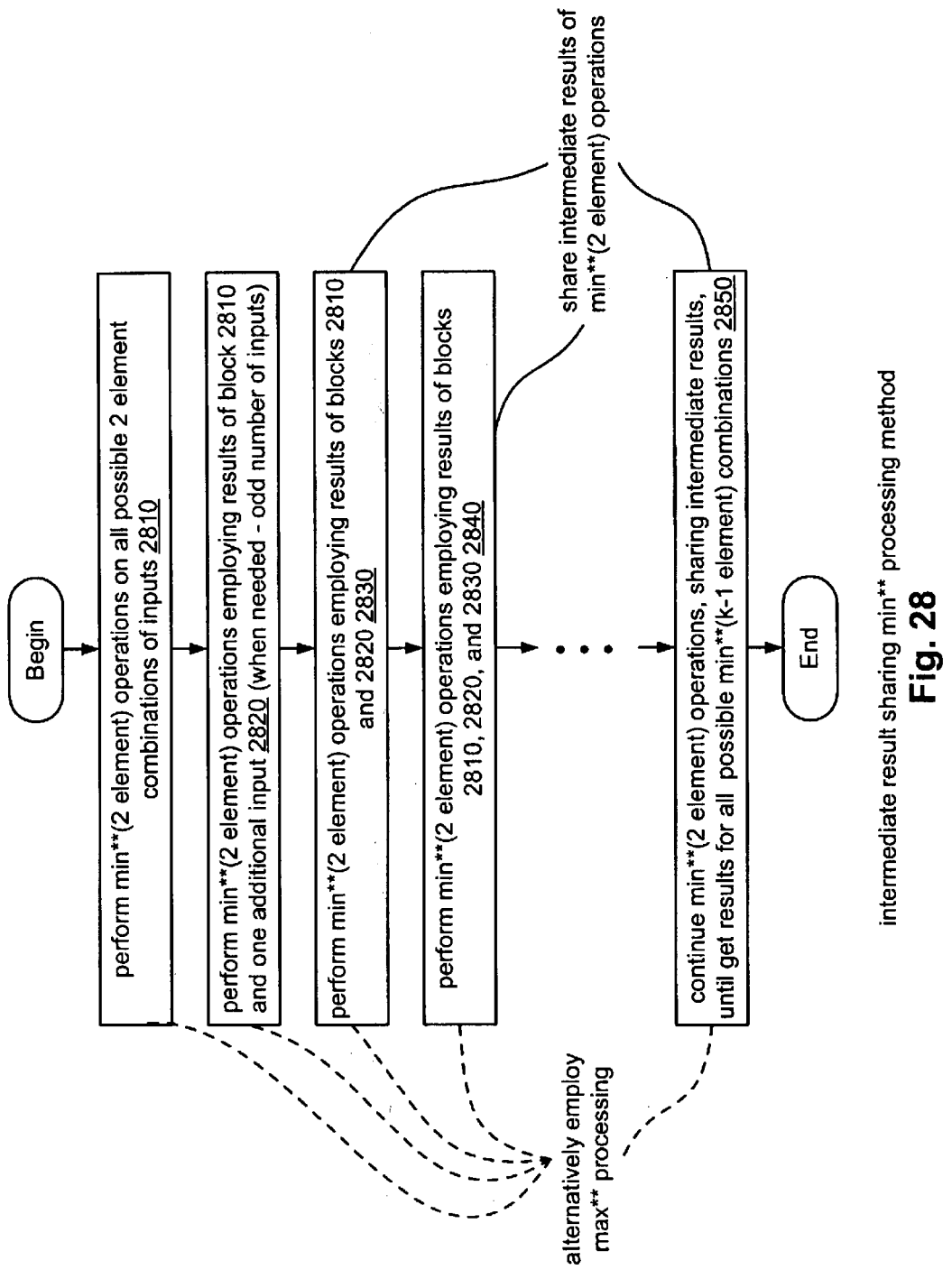
FIG. 28 is an operational flow diagram illustrating an embodiment of an intermediate result sharing min** processing method that is performed according to the invention.

FIG. 28 is an operational flow diagram illustrating an embodiment of an intermediate result sharing min processing method that is performed according to the invention. It is also noted that the max operations may alternatively be employed to perform intermediate result sharing processing according to the invention.

As shown in a block 2810, min operations are performed on all possible 2 element combinations of a number of inputs. Then, as shown in a block 2820, min(2 element) operations are performed on the results of the block 2810 and one additional input selected from the total number of inputs; this may be performed when there is an odd number of inputs.

Again, as shown in a block 2830, min(2 element) operations are performed on the results of the blocks 2810 and 2820; the processing within the block 2830 may be viewed as performing intermediate sharing of the results achieved within the blocks 2810 and 2820. Similarly, as shown in a block 2840, min(2 element) operations are performed on the results of the blocks 2810, 2820, and 2830; the processing within the block 2840 may be viewed as performing intermediate sharing of the results achieved within the blocks 2810, 2820, and 2830. This process continues on sharing the intermediate results of the previous blocks. As shown in a block 2840, this process continues on until all of the possible min*(k−1 element) combinations have been determined.

Figure 29:
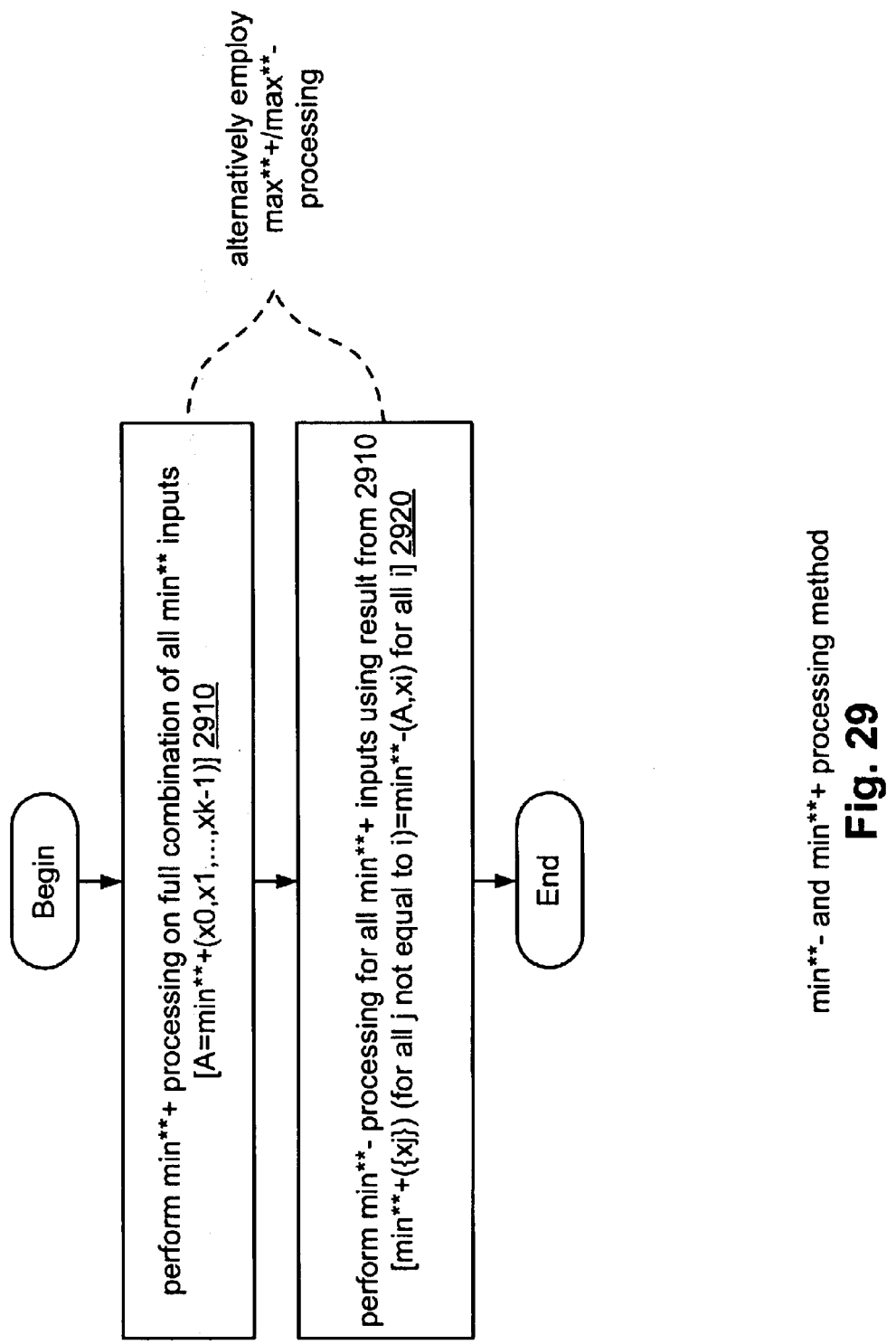
FIG. 29 is an operational flow diagram illustrating an embodiment of a min− and min+ processing method that is performed according to the invention.

FIG. 29 is an operational flow diagram illustrating an embodiment of a min** (min*− and min*+) processing method that is performed according to the invention. It is also noted that max** (max*− and max*+) operations may alternatively be employed to perform similar processing according to the invention.

The min− and min+ processing method may efficiently be broken down into two separate two separate processing steps, one that performs min+ processing and one that performs min− processing. Specifically, as shown in a block 2910, min+ processing is performed on the full combination of all min inputs to generate an intermediate variable $A = \text{min}^{**}+(x_0, x_1, \ldots, x_{k-1})$.

Then, using this intermediate variable A, min− processing is performing using all of the min inputs and the intermediate variable A, to generate all of the possible min(k−1 element) combinations of the min inputs as shown in a block 2920.

In view of the above detailed description of the invention and associated drawings, other modifications and variations will now become apparent. It should also be apparent that such other modifications and variations may be effected without departing from the spirit and scope of the invention.

What is claimed is:

1. A Low Density Parity Check (LDPC) code Log-Likelihood Ratio (LLR) decoder that is operable to decode a bit within a signal, the decoder comprising:
   an initialization functional block that computes a Log-Likelihood ratio (LLR) of a channel metric and assigns an initial value of a variable node extrinsic information value to be the LLR of the channel metric, the channel metric corresponding to a communication channel over which the signal is communicated;
   a check node processing functional block that computes a check node extrinsic information value using the value of the variable node extrinsic information value by employing min* processing, min** processing, max* processing, or max** processing;
   a variable node processing functional block that computes a variable node extrinsic information value using the value of the variable node extrinsic information value and the check node extrinsic information value;

wherein the variable node processing functional block provides the variable node extrinsic information value as feedback to the check node processing functional block to perform a plurality of decoding iterations; and a variable bit estimation functional block that estimates a value of the bit within the signal using the variable node extrinsic information value.

2. The decoder of claim 1, wherein the check node processing functional block identifies a plurality of check node edges before computing the check node extrinsic information value.

3. The decoder of claim 1, wherein the variable node processing functional block identifies a plurality of variable node edges before computing the variable node extrinsic information value.

4. The decoder of claim 1, wherein the min* processing that may be employed by the check node processing functional block comprises min*+ processing using a corresponding plurality of variable node extrinsic information values thereby generating an intermediate variable A.

5. The decoder of claim 4, wherein the check node processing functional block is operable to perform the min*+ processing in at least one of a parallel min*+ implementation, a single stage min*+ implementation, and a serial min*+ implementation.

6. The decoder of claim 4, wherein the min* processing that may be employed by the check node processing functional block comprises min*− processing using the intermediate variable A and a corresponding variable node extrinsic information value of the plurality of variable node extrinsic information values.

7. The decoder of claim 6, wherein the check node processing functional block is operable to perform the min*− processing in at least one of a parallel min*− implementation that simultaneously calculates a plurality of possible min*− values and a serial min*− implementation that sequentially calculates the plurality of possible min*− values.

8. The decoder of claim 1, wherein the min processing that may be employed by the check node processing functional block comprises min+ processing using a corresponding plurality of variable node extrinsic information values thereby generating an intermediate variable A.

9. The decoder of claim 8, wherein the check node processing functional block performs the min+ processing in at least one of a parallel min+ implementation, a single stage min+ implementation, and a serial min+ implementation.

10. The decoder of claim 8, wherein the min processing employed by the check node processing functional block comprises min− processing using the intermediate variable A and a variable node extrinsic information value of the plurality of variable node extrinsic information values.

11. The decoder of claim 10, wherein the check node processing functional block is operable to perform the min− processing in at least one of a parallel min− implementation that simultaneously calculates a plurality of possible min*− values and a serial min− implementation that sequentially calculates the plurality of possible min− values.

12. The decoder of claim 1, wherein the max* processing that may be employed by the check node processing functional block comprises max*+ processing using a corresponding plurality of variable node extrinsic information values thereby generating an intermediate variable A.

13. The decoder of claim 12, wherein the check node processing functional block performs the max*+ processing in at least one of a parallel max*+ implementation, a single stage max*+ implementation, and a serial max*+ implementation.

14. The decoder of claim 12, wherein the max* processing employed by the check node processing functional block comprises max*− processing using the intermediate variable A and a variable node extrinsic information value of the plurality of variable node extrinsic information values.

15. The decoder of claim 14, wherein the check node processing functional block is operable to perform the max*− processing in at least one of a parallel max*− implementation that simultaneously calculates a plurality of possible max*− values and a serial max*− implementation that sequentially calculates the plurality of possible max*− values.

16. The decoder of claim 1, wherein the max processing that may be employed by the check node processing functional block comprises max+ processing using a corresponding plurality of variable node extrinsic information values thereby generating an intermediate variable A.

17. The decoder of claim 16, wherein the check node processing functional block performs the max+ processing in at least one of a parallel max+ implementation, a single stage max+ implementation, and a serial max+ implementation.

18. The decoder of claim 16, wherein the max processing employed by the check node processing functional block comprises max− processing using the intermediate variable A and a variable node extrinsic information value of the plurality of variable node extrinsic information values.

19. The decoder of claim 18, wherein the check node processing functional block is operable to perform the min*− processing in at least one of a parallel max− implementation that simultaneously calculates a plurality of possible max− values and a serial max− implementation that sequentially calculates the plurality of possible max− values.

20. The decoder of claim 16, wherein the decoder is implemented within a communication receiver; and the communication receiver is contained within at least one of a satellite communication system, a high definition television (HDTV) communication system, a cellular communication system, a microwave communication system, a point-to-point communication system, a uni-directional communication system, a bi-directional communication system, a one to many communication system, and a fiber-optic communication system.

21. The decoder of claim 1, wherein the signal is one of a regular LDPC code signal and an irregular LDPC code signal.

22. The decoder of claim 1, wherein the decoder is contained within at least one of a satellite receiver, a High Definition Television (HDTV) set top box receiver, a base station receiver, a mobile receiver, a receiver, a mobile unit, a transceiver, an advanced modulation satellite receiver, and a Dense Wavelength Division Multiplexing (DWDM) line card.

23. The decoder of claim 1, wherein the decoder is implemented within a communication receiver; and the communication receiver is contained within at least one of a satellite communication system, a High Definition Television (HDTV) communication system, a cellular communication system, a microwave communication system, a point-to-point communication system, a uni-directional communication system, a bi-directional communication system, a one to many communication system, and a fiber-optic communication system.

24. A forward/backward Low Density Parity Check (LDPC) code decoder that is operable to decode a bit within a signal, the decoder comprising:
an initialization functional block that computes a logarithmic metric value of the signal;
a forward and backward check node processing functional block that employs min* processing or max* processing to calculate a plurality of forward metric values (alphas) and a plurality of backward metric values (betas) using an initial plurality of variable node extrinsic information values;
an extrinsic information value calculation functional block that employs min* processing or max* processing to calculate a plurality of check node extrinsic values using the plurality of forward metric values (alphas) and the plurality of backward metric values (betas);
wherein the extrinsic information value calculation functional block also employs min* processing or max* processing to calculate a plurality of variable node extrinsic values using the logarithmic metric value of the signal and the plurality of check node extrinsic values;
wherein the extrinsic information value calculation functional block that sums a variable node extrinsic value of the plurality of variable node extrinsic values and a check node extrinsic value of the plurality of check node extrinsic values;
wherein the extrinsic information value calculation functional block provides the sum generated by the extrinsic information value calculation functional block as feedback to the forward and backward check node processing functional block to perform a plurality of decoding iterations; and
a variable bit estimation functional block that estimates a value of the bit within the signal using the sum generated by the extrinsic information value calculation functional block.

25. The decoder of claim 24, wherein the initialization functional block computes a logarithmic metric of the signal in real time using a stored logarithmic ratio of metrics.

26. The decoder of claim 24, wherein the initialization functional block employs a stored logarithmic ratio of metrics or components of the logarithmic ratio of metrics.

27. The decoder of claim 24, wherein the min* processing is performed in at least one of a parallel min* implementation, a single stage min* implementation, and a serial min* implementation.

28. The decoder of claim 24, wherein the max* processing is performed in at least one of a parallel max* implementation, a single stage max* implementation, and a serial max* implementation.

29. The decoder of claim 24, wherein the signal is one of a regular LDPC code signal and an irregular LDPC code signal.

30. The decoder of claim 24, wherein the decoder is contained within at least one of a satellite receiver, a High Definition Television (HDTV) set top box receiver, a base station receiver, a mobile receiver, a receiver, a mobile unit, a transceiver, an advanced modulation satellite receiver, and a Dense Wavelength Division Multiplexing (DWDM) line card.

31. The decoder of claim 24, wherein the decoder is implemented within a communication receiver; and
the communication receiver is contained within at least one of a satellite communication system, a High Definition Television (HDTV) communication system, a cellular communication system, a microwave communication system, a point-to-point communication system, a uni-directional communication system, a bi-directional communication system, a one to many communication system, and a fiber-optic communication system.

32. A Low Density Parity Check (LDPC) code Log-Likelihood Ratio (LLR) decoding method that decodes an LDPC coded signal, the method comprising:
computing a LLR of a channel metric;
during a first decoding iteration, setting a variable node extrinsic information to be the LLR of the channel metric;
identifying a set of check node edges;
computing a check node extrinsic information value using the variable node extrinsic information value by employing min* processing, min** processing, max* processing, or max** processing;
identifying a set of variable node edges;
computing a variable node extrinsic information value using the LLR of the channel metric and the check node extrinsic information value;
feeding back the variable node extrinsic information value for use in computing a subsequent check node extrinsic information value when performing iterative decoding; and
estimating a variable bit value using the variable node extrinsic information value.

33. The method of claim 32, wherein the min* processing comprises min*+ processing using a plurality of variable node extrinsic information values thereby generating an intermediate variable A.

34. The method of claim 33, wherein the min*+ processing is performed in at least one of a parallel min*+ implementation, a single stage min*+ implementation, and a serial min*+ implementation.

35. The method of claim 33, wherein the min* processing comprises min*− processing using the intermediate variable A and a variable node extrinsic information value of the plurality of variable node extrinsic information values.

36. The method of claim 35, the min*− processing is performed in at least one of a parallel min*− implementation that simultaneously calculates a plurality of possible min*− values and a serial min*− implementation that sequentially calculates the plurality of possible min*− values.

37. The method of claim 32, wherein the min processing comprises min+ processing using a plurality of variable node extrinsic information values thereby generating an intermediate variable A.

38. The method of claim 37, wherein the min+ processing is performed in at least one of a parallel min+ implementation, a single stage min+ implementation, and a serial min+ implementation.

39. The method of claim 37, wherein the min processing comprises min− processing using the intermediate variable A and a variable node extrinsic information value of the plurality of variable node extrinsic information values.

40. The method of claim 39, the min− processing is performed in at least one of a parallel min− implementation that simultaneously calculates a plurality of possible min− values and a serial min− implementation that sequentially calculates the plurality of possible min**− values.

41. The method of claim 32, wherein the max* processing comprises max*+ processing using a plurality of variable node extrinsic information values thereby generating an intermediate variable A.

42. The method of claim 41, wherein the max*+ processing is performed in at least one of a parallel max*+ implementation, a single stage max*+ implementation, and a serial max*+ implementation.

43. The method of claim 41, wherein the max* processing comprises max*− processing using the intermediate variable A and a variable node extrinsic information value of the plurality of variable node extrinsic information values.

44. The decoder of claim 43, the max*− processing is performed in at least one of a parallel max*− implementation that simultaneously calculates a plurality of possible max*− values and a serial min*− implementation that sequentially calculates the plurality of possible max*− values.

45. The method of claim 32, wherein the max processing comprises max+ processing using a plurality of variable node extrinsic information values thereby generating an intermediate variable A.

46. The method of claim 45, wherein the max+ processing is performed in at least one of a parallel max+ implementation, a single stage max+ implementation, and a serial max+ implementation.

47. The method of claim 45, wherein the max processing comprises max− processing using the intermediate variable A and a variable node extrinsic information value of the plurality of variable node extrinsic information values.

48. The method of claim 47, the max− processing is performed in at least one of a parallel max− implementation that simultaneously calculates a plurality of possible max− values and a serial max− implementation that sequentially calculates the plurality of possible max**− values.

49. The method of claim 32, wherein the LDPC coded signal is one of a regular LDPC code signal and an irregular LDPC code signal.

50. The method of claim 32, wherein the method is performed within a decoder; and
the decoder is contained within at least one of a satellite receiver, a High Definition Television (HDTV) set top box receiver, a base station receiver, a mobile receiver, a receiver, a mobile unit, a transceiver, an advanced modulation satellite receiver, and a Dense Wavelength Division Multiplexing (DWDM) line card.

51. The method of claim 32, wherein the method is performed within a decoder;
the decoder is implemented within a communication receiver; and
the communication receiver is contained within at least one of a satellite communication system, a High Definition Television (HDTV) communication system, a cellular communication system, a microwave communication system, a point-to-point communication system, a uni-directional communication system, a bi-directional communication system, a one to many communication system, and a fiber-optic communication system.

52. A Low Density Parity Check (LDPC) code forward/backward decoding method, the method comprising:
retrieving a ratio of logarithmic metrics;
calculating a logarithmic metric value of a signal using the ratio of logarithmic metrics;
generating a plurality of initial values for a plurality of forward metric values (alphas) and a plurality of backward metric values (betas);
calculating a plurality of values for the plurality of forward metric values (alphas) by performing min* processing of an initial plurality of variable node extrinsic information values;
calculating a plurality of values for the plurality of backward metric values (betas) by performing min* processing or max* processing of an initial plurality of variable node extrinsic information values;
calculating a plurality of check node extrinsic information values by performing min* processing on the plurality of forward metric values (alphas) and the plurality of backward metric values (betas);
calculating a plurality of variable node extrinsic information values by performing min* processing or max* processing on the logarithmic metric value of the signal and the plurality of check node extrinsic values;
summing the plurality of check node extrinsic information values and the plurality of variable node extrinsic information values thereby generating a sum;
feeding back the sum of the plurality of check node extrinsic information values and the plurality of variable node extrinsic information values for use in calculating a subsequent plurality of values for the plurality of forward metric values (alphas) when performing iterative decoding; and
estimating a variable bit value using the sum.

53. The method of claim 52, wherein the min* processing is performed in at least one of a parallel min* implementation, a single stage min* implementation, and a serial min* implementation.

54. The method of claim 52, wherein the max* processing is performed in at least one of a parallel max* implementation, a single stage max* implementation, and a serial max* implementation.

55. The method of claim 52, wherein the LDPC coded signal is one of a regular LDPC code signal and an irregular LDPC code signal.

56. The method of claim 52, wherein the method is performed within a decoder; and
the decoder is contained within at least one of a satellite receiver, a High Definition Television (HDTV) set top box receiver, a base station receiver, a mobile receiver, a receiver, a mobile unit, a transceiver, an advanced modulation satellite receiver, and a Dense Wavelength Division Multiplexing (DWDM) line card.

57. The method of claim 52, wherein the method is performed within a decoder;
the decoder is implemented within a communication receiver; and
the communication receiver is contained within at least one of a satellite communication system, a High Definition Television (HDTV) communication system, a cellular communication system, a microwave communication system, a point-to-point communication system, a uni-directional communication system, a bi-directional communication system, a one to many communication system, and a fiber-optic communication system.

58. A decoder that is operable to perform min processing by employing min− and min**+ processing, comprising:
a min+ functional block that performs min+ processing on a plurality of min** inputs thereby generating an intermediate variable; and
a min− functional block that performs min− processing on each of the min inputs of the plurality of min inputs and the intermediate variable thereby generating a plurality of min** outputs.

59. The decoder of claim 58, wherein the min+ processing operates on two elements, the two elements comprising two min inputs of the plurality of min** inputs.

60. The decoder of claim 58, wherein the min− processing operates on two elements, the two elements comprising one min input of the plurality of min** inputs and the intermediate variable.

61. The decoder of claim 58, wherein the min+ functional block performs a number of min+ processes, the number of min+ processes being less than a number of min inputs of the plurality of min** inputs.

62. The decoder of claim 58, wherein the min− functional block performs a number of min− processes, the number of min− processes being equal to a number of min inputs of the plurality of min** inputs.

63. The decoder of claim 58, wherein the min+ processing comprises an inverse function of the min− processing on the plurality of min** inputs.

64. The decoder of claim 58, wherein the decoder is operable to perform straightforward min processing on the plurality of min inputs.

65. The decoder of claim 58, wherein the decoder is operable to perform intermediate result sharing min** processing.

66. The decoder of claim 58, wherein the decoder is contained within at least one of a satellite receiver, a high definition television (HDTV) set top box receiver, a base station receiver, a mobile receiver, a receiver, a mobile unit, a transceiver, and an advanced modulation satellite receiver.

67. The decoder of claim 58, wherein the decoder is implemented within a communication receiver; and
the communication receiver is contained within at least one of a satellite communication system, a high definition television (HDTV) communication system, a cellular communication system, a microwave communication system, a point-to-point communication system, a uni-directional communication system, a bi-directional communication system, a one to many communication system, and a fiber-optic communication system.

68. A decoder that is operable to perform min processing by employing min− and min**+ processing, comprising:
a min+ functional block that sequentially performs min+ processing on two min input elements, the two min input elements selected from a plurality of min** inputs, thereby generating an intermediate variable; and
a min− functional block that sequentially performs min− processing on two elements, the two elements comprising one of the min inputs of the plurality of min inputs and the intermediate variable, thereby generating a plurality of min** outputs; and
wherein the min+ functional block performs a number of min+ processes, the number of min+ processes being less than a number of min inputs of the plurality of min** inputs;
the min− functional block performs a number of min− processes, the number of min− processes being equal to the number of min inputs of the plurality of min** inputs; and
the min+ processing comprises an inverse function of the min− processing.

69. The decoder of claim 68, wherein the decoder is operable to perform straightforward min processing on the plurality of min inputs.

70. The decoder of claim 68, wherein the decoder is operable to perform intermediate result sharing min processing on the plurality of min inputs.

71. The decoder of claim 68, wherein the decoder is contained within at least one of a satellite receiver, a high definition television (HDTV) set top box receiver, a base station receiver, a mobile receiver, a receiver, a mobile unit, a transceiver, and an advanced modulation satellite receiver.

72. The decoder of claim 68, wherein the decoder is implemented within a communication receiver; and
the communication receiver is contained within at least one of a satellite communication system, a high definition television (HDTV) communication system, a cellular communication system, a microwave communication system, a point-to-point communication system, a uni-directional communication system, a bi-directional communication system, a one to many communication system, and a fiber-optic communication system.

73. A decoder that is operable to perform max processing by employing max− and max**+ processing, comprising:
a max+ functional block that performs max+ processing on a plurality of max** inputs thereby generating an intermediate variable; and
a max− functional block that performs max− processing on each of the max inputs of the plurality of max inputs and the intermediate variable thereby generating a plurality of max** outputs.

74. The decoder of claim 73, wherein the max+ processing operates on two elements, the two elements comprising two max inputs of the plurality of max** inputs.

75. The decoder of claim 73, wherein the max− processing operates on two elements, the two elements comprising one max input of the plurality of max** inputs and the intermediate variable.

76. The decoder of claim 73, wherein the max+ functional block performs a number of max+ processes, the number of max+ processes being less than a number of max inputs of the plurality of max** inputs.

77. The decoder of claim 73, wherein the max− functional block performs a number of max− processes, the number of max− processes being equal to a number of max inputs of the plurality of max** inputs.

78. The decoder of claim 73, wherein the max+ processing comprises an inverse function of the max− processing.

79. The decoder of claim 73, wherein the decoder is operable to perform straightforward max processing on the plurality of max inputs.

80. The decoder of claim 73, wherein the decoder is operable to perform intermediate result sharing max processing on the plurality of max inputs.

81. The decoder of claim 73, wherein the decoder is contained within at least one of a satellite receiver, a high definition television (HDTV) set top box receiver, a base station receiver, a mobile receiver, a receiver, a mobile unit, a transceiver, and an advanced modulation satellite receiver.

82. A decoder that is operable to perform max processing by employing max− and max**+ processing, comprising:
a max+ functional block that sequentially performs max+ processing on two max input elements, the two max input elements selected from a plurality of max** inputs, thereby generating an intermediate variable; and
a max− functional block that sequentially performs max− processing on two elements, the two elements comprising one of the max inputs of the plurality of max inputs and the intermediate variable, thereby generating a plurality of max outputs; and wherein the max+ functional block performs a number of max+ processes, the number of max+ processes being less than a number of max inputs of the plurality of max inputs;

the max− functional block performs a number of max− processes, the number of max− processes being equal to the number of max inputs of the plurality of max inputs; and the max+ processing comprises an inverse function of the max**− processing.

83. The decoder of claim 82, wherein the decoder is operable to perform straightforward max** processing.

84. The decoder of claim 82, wherein the decoder is operable to perform intermediate result sharing max** processing.

85. The decoder of claim 82, wherein the decoder is contained within at least one of a satellite receiver, a high definition television (HDTV) set top box receiver, a base station receiver, a mobile receiver, a receiver, a mobile unit, a transceiver, and an advanced modulation satellite receiver.

86. The decoder of claim 82, wherein the decoder is implemented within a communication receiver; and the communication receiver is contained within at least one of a satellite communication system, a high definition television (HDTV) communication system, a cellular communication system, a microwave communication system, a point-to-point communication system, a uni-directional communication system, a bi-directional communication system, a one to many communication system, and a fiber-optic communication system.

87. A min processing method that employs min− and min**+ processing, the method comprising:

performing min+ processing on a plurality of min inputs thereby generating an intermediate variable; and performing min− processing on each of the min inputs of the plurality of min inputs and the intermediate variable thereby generating a plurality of min outputs.

88. The method of claim 87, wherein the min+ processing operates on two elements, the two elements comprising two min inputs of the plurality of min** inputs.

89. The method of claim 87, wherein the min− processing operates on two elements, the two elements comprising one min input of the plurality of min** inputs and the intermediate variable.

90. The method of claim 87, wherein the min+ processing performs a number of min+ processes, the number of min+ processes being less than a number of min inputs of the plurality of min** inputs.

91. The method of claim 87, wherein the min− processing performs a number of min− processes, the number of min− processes being equal to a number of min inputs of the plurality of min** inputs.

92. The method of claim 87, wherein the min+ processing comprises an inverse function of the min− processing.

93. The method of claim 87, further comprising performing straightforward min processing on the plurality of min inputs.

94. The method of claim 87, further comprising performing intermediate result sharing min processing on the plurality of min inputs.

95. The method of claim 87, wherein the method is performed within a decoder; and the decoder is contained within at least one of a satellite receiver, a high definition television (HDTV) set top box receiver, a base station receiver, a mobile receiver, a receiver, a mobile unit, a transceiver, and an advanced modulation satellite receiver.

96. The method of claim 87, wherein the method is performed within a decoder;

the decoder is implemented within a communication receiver; and the communication receiver is contained within at least one of a satellite communication system, a high definition television (HDTV) communication system, a cellular communication system, a microwave communication system, a point-to-point communication system, a uni-directional communication system, a bi-directional communication system, a one to many communication system, and a fiber-optic communication system.

97. A max processing method that employs max− and max**+ processing, the method comprising:

performing max+ processing on a plurality of max inputs thereby generating an intermediate variable; and performing max− processing on each of the max inputs of the plurality of max inputs and the intermediate variable thereby generating a plurality of max outputs.

98. The method of claim 97, wherein the max+ processing operates on two elements, the two elements comprising two max inputs of the plurality of max** inputs.

99. The method of claim 97, wherein the max− processing operates on two elements, the two elements comprising one max input of the plurality of max** inputs and the intermediate variable.

100. The method of claim 97, wherein the max+ processing performs a number of max+ processes, the number of max+ processes being less than a number of max inputs of the plurality of max** inputs.

101. The method of claim 97, wherein the max− processing performs a number of max− processes, the number of max− processes being equal to a number of max inputs of the plurality of max** inputs.

102. The method of claim 97, wherein the max+ processing comprises an inverse function of the max− processing.

103. The method of claim 97, further comprising performing straightforward max processing on the plurality of max inputs.

104. The method of claim 97, further comprising performing intermediate result sharing max processing on the plurality of max inputs.

105. The method of claim 97, wherein the method is performed within a decoder; and the decoder is contained within at least one of a satellite receiver, a high definition television (HDTV) set top box receiver, a base station receiver, a mobile receiver, a receiver, a mobile unit, a transceiver, and an advanced modulation satellite receiver.

106. The method of claim 97, wherein the method is performed within a decoder;

the decoder is implemented within a communication receiver; and the communication receiver is contained within at least one of a satellite communication system, a high definition television (HDTV) communication system, a cellular communication system, a microwave communication system, a point-to-point communication system, a uni-directional communication system, a bi-directional communication system, a one to many communication system, and a fiber-optic communication system.

107. A decoder that performs min* check node processing when decoding an LDPC (Low Density Parity Check) coded signal, the decoder comprising:

a check node processing functional block that updates a check node extrinsic information value by employing min* processing;

a min* functional block, whose operation is directed by the check node processing functional block, that performs the min* processing on a first value and a second value;

wherein the min* functional block determines a first sign function value using the first value;

wherein the min* functional block determines a second sign function value using the second value;

wherein the min* functional block determines a minimum value from among the first value and the second value;

wherein the min* functional block retrieves from a ROM (Read Only Memory) a predetermined logarithmic correction factor that is an absolute value of a difference between the first value and the second value;

wherein the min* functional block subtracts the predetermined logarithmic correction factor from the minimum value thereby generating a min* resultant; and wherein the min* functional block multiplies the first sign function value by the second sign function value and by the min* resultant.

108. The decoder of claim 107, wherein:

the decoder is contained within at least one of a satellite receiver, a High Definition Television (HDTV) set top box receiver, a base station receiver, a mobile receiver, a receiver, a mobile unit, a transceiver, an advanced modulation satellite receiver, and a Dense Wavelength Division Multiplexing (DWDM) line card.

109. The decoder of claim 107, wherein:

the decoder is implemented within a communication receiver; and the communication receiver is contained within at least one of a satellite communication system, a High Definition Television (HDTV) communication system, a cellular communication system, a microwave communication system, a point-to-point communication system, a uni-directional communication system, a bi-directional communication system, a one to many communication system, and a fiber-optic communication system.

110. A decoder that performs min* check node processing when decoding an LDPC (Low Density Parity Check) coded signal, the decoder comprising:

a check node processing functional block that updates a check node extrinsic information value by employing min* processing;

a min* functional block, whose operation is directed by the check node processing functional block, that performs the min* processing on a first value and a second value;

wherein the min* functional block determines a first sign function value using the first value;

wherein the min* functional block determines a second sign function value using the second value;

wherein the min* functional block determines a minimum value from among the first value and the second value;

wherein the min* functional block retrieves from memory a predetermined logarithmic correction factor that corresponds to the first value and the second value; and wherein the min* functional block calculates the updated check node extrinsic information value using the first sign function value, the second sign function value, the minimum value, and the predetermined logarithmic correction factor that is retrieved from memory.

111. The decoder of claim 110, wherein:

the predetermined logarithmic correction factor is an absolute value of a difference between the first value and the second value.

112. The decoder of claim 110, wherein:

the memory from which the predetermined logarithmic correction factor is retrieved is ROM (Read Only Memory).

113. The decoder of claim 110, wherein:

the min* functional block multiplies the first sign function value by the second sign function value.

114. The decoder of claim 110, wherein:

the min* functional block subtracts the predetermined logarithmic correction factor from the minimum value.

115. The decoder of claim 110, wherein:

the min* functional block subtracts the predetermined logarithmic correction factor from the minimum value thereby generating a min* resultant; and the min* functional block multiplies the first sign function value by the second sign function value and by the min* resultant.

116. The decoder of claim 110, wherein:

the decoder is contained within at least one of a satellite receiver, a High Definition Television (HDTV) set top box receiver, a base station receiver, a mobile receiver, a receiver, a mobile unit, a transceiver, an advanced modulation satellite receiver, and a Dense Wavelength Division Multiplexing (DWDM) line card.

117. The decoder of claim 110, wherein:

the decoder is implemented within a communication receiver; and the communication receiver is contained within at least one of a satellite communication system, a High Definition Television (HDTV) communication system, a cellular communication system, a microwave communication system, a point-to-point communication system, a uni-directional communication system, a bi-directional communication system, a one to many communication system, and a fiber-optic communication system.

118. A decoder that performs min* check node processing when decoding an LDPC (Low Density Parity Check) coded signal, the decoder comprising:

a check node processing functional block that updates a check node extrinsic information value by employing min* processing;

a min* functional block, whose operation is directed by the check node processing functional block, that performs the min* processing on a first value and a second value;

wherein the min* functional block determines a first sign function value using the first value;

wherein the min* functional block determines a second sign function value using the second value;

wherein the min* functional block determines a min* resultant using the first value and the second value; and wherein the min* functional block calculates the updated check node extrinsic information value using the first sign function value, the second sign function value, and the min* resultant.

119. The decoder of claim 118, wherein:

the min* functional block determines a minimum value from among the first value and the second value;

the min* functional block retrieves from memory a predetermined logarithmic correction factor that corresponds to the first value and the second value; and the min* functional block subtracts the predetermined logarithmic correction factor from the minimum value thereby generating the min* resultant.

120. The decoder of claim 119, wherein:

the predetermined logarithmic correction factor is an absolute value of a difference between the first value and the second value.

121. The decoder of claim 119, wherein:

the memory from which the predetermined logarithmic correction factor is retrieved is ROM (Read Only Memory).

122. The decoder of claim 118, wherein:

the min* functional block multiplies the first sign function value by the second sign function value and by the min* resultant.

123. The decoder of claim 118, wherein:

the decoder is contained within at least one of a satellite receiver, a High Definition Television (HDTV) set top box receiver, a base station receiver, a mobile receiver, a receiver, a mobile unit, a transceiver, an advanced modulation satellite receiver, and a Dense Wavelength Division Multiplexing (DWDM) line card.

124. The decoder of claim 118, wherein:

the decoder is implemented within a communication receiver; and the communication receiver is contained within at least one of a satellite communication system, a High Definition Television (HDTV) communication system, a cellular communication system, a microwave communication system, a point-to-point communication system, a uni-directional communication system, a bi-directional communication system, a one to many communication system, and a fiber-optic communication system.

125. A Low Density Parity Check (LDPC) code Log-Likelihood Ratio (LLR) decoder that is operable to decode a bit within a signal, the decoder comprising:

an initialization functional block that computes a Log-Likelihood ratio (LLR) of a channel metric and assigns an initial value of a variable node extrinsic information value to be the LLR of the channel metric, the channel metric corresponding to a communication channel over which the signal is communicated;

a check node processing functional block that computes a check node extrinsic information value using the value of the variable node extrinsic information value by employing min* processing;

a variable node processing functional block that computes a variable node extrinsic information value using the value of the variable node extrinsic information value and the check node extrinsic information value;

wherein the variable node processing functional block provides the variable node extrinsic information value as feedback to the check node processing functional block to perform a plurality of decoding iterations;

a variable bit estimation functional block that estimates a value of the bit within the signal using the variable node extrinsic information value;

wherein the check node processing functional block is operable to update the check node extrinsic information value by directing a min* functional block to perform min* processing on a first value and a second value;

wherein the min* functional block determines a first sign function value using the first value;

wherein the min* functional block determines a second sign function value using the second value;

wherein the min* functional block determines a minimum value from among the first value and the second value;

wherein the min* functional block retrieves from a ROM (Read Only Memory) a predetermined logarithmic correction factor that is an absolute value of a difference between the first value and the second value;

wherein the min* functional block subtracts the predetermined logarithmic correction factor from the minimum value thereby generating a min* resultant; and wherein the min* functional block multiplies the first sign function value by the second sign function value and by the min* resultant.

126. The decoder of claim 125, wherein:

the decoder is contained within at least one of a satellite receiver, a High Definition Television (HDTV) set top box receiver, a base station receiver, a mobile receiver, a receiver, a mobile unit, a transceiver, an advanced modulation satellite receiver, and a Dense Wavelength Division Multiplexing (DWDM) line card.

127. The decoder of claim 125, wherein:

the decoder is implemented within a communication receiver; and the communication receiver is contained within at least one of a satellite communication system, a High Definition Television (HDTV) communication system, a cellular communication system, a microwave communication system, a point-to-point communication system, a uni-directional communication system, a bi-directional communication system, a one to many communication system, and a fiber-optic communication system.

128. A method for updating a check node extrinsic information value by performing min* check node processing, the method comprising:

receiving a first value and a second value;

determining a first sign function value using the first value;

determining a second sign function value using the second value;

determining a minimum value from among the first value and the second value;

retrieving from a ROM (Read Only Memory) a predetermined logarithmic correction factor that is an absolute value of a difference between the first value and the second value;

subtracting the predetermined logarithmic correction factor from the minimum value thereby generating a min* resultant; and multiplying the first sign function value by the second sign function value and by the min* resultant.

129. The method of claim 128, wherein:

the method is performed within a decoder; and the decoder is contained within at least one of a satellite receiver, a High Definition Television (HDTV) set top box receiver, a base station receiver, a mobile receiver, a receiver, a mobile unit, a transceiver, an advanced modulation satellite receiver, and a Dense Wavelength Division Multiplexing (DWDM) line card.

130. The method of claim 128, wherein:

the method is performed within a decoder;

the decoder is implemented within a communication receiver; and the communication receiver is contained within at least one of a satellite communication system, a High Definition Television (HDTV) communication system, a cellular communication system, a microwave communication system, a point-to-point communication system, a uni-directional communication system, a bi-directional communication system, a one to many communication system, and a fiber-optic communication system.

131. A method for updating a check node extrinsic information value by performing min* check node processing, the method comprising:

receiving a first value and a second value;

determining a first sign function value using the first value;

determining a second sign function value using the second value;

determining a minimum value from among the first value and the second value;

retrieving from memory a predetermined logarithmic correction factor that corresponds to the first value and the second value; and calculating the updated check node extrinsic information value using the first sign function value, the second sign function value, the minimum value, and the predetermined logarithmic correction factor that is retrieved from memory.

132. The method of claim 131, wherein:

the predetermined logarithmic correction factor is an absolute value of a difference between the first value and the second value.

133. The method of claim 131, wherein:

the memory from which the predetermined logarithmic correction factor is retrieved is ROM (Read Only Memory).

134. The method of claim 131, further comprising:

multiplying the first sign function value by the second sign function value.

135. The method of claim 131, further comprising:

subtracting the predetermined logarithmic correction factor from the minimum value.

136. The method of claim 131, further comprising:

subtracting the predetermined logarithmic correction factor from the minimum value thereby generating a min* resultant; and multiplying the first sign function value by the second sign function value and by the min* resultant.

137. The method of claim 131, wherein:

the method is performed within a decoder; and the decoder is contained within at least one of a satellite receiver, a High Definition Television (HDTV) set top box receiver, a base station receiver, a mobile receiver, a receiver, a mobile unit, a transceiver, an advanced modulation satellite receiver, and a Dense Wavelength Division Multiplexing (DWDM) line card.

138. The method of claim 131, wherein:

the method is performed within a decoder;

the decoder is implemented within a communication receiver; and the communication receiver is contained within at least one of a satellite communication system, a High Definition Television (HDTV) communication system, a cellular communication system, a microwave communication system, a point-to-point communication system, a uni-directional communication system, a bi-directional communication system, a one to many communication system, and a fiber-optic communication system.

* * * * *